United States Patent
Donat et al.

(10) Patent No.: US 11,686,740 B2
(45) Date of Patent: Jun. 27, 2023

(54) OPPOSABLES INCORPORATING ONBOARD REAGENTS AND AUTOMATED SPECIMEN PROCESSING SYSTEMS

(71) Applicant: Ventana Medical Systems, Inc., Tucson, AZ (US)

(72) Inventors: Christopher Lawrence Donat, Tucson, AZ (US); Timothy James Keller, Oro Valley, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 1187 days.

(21) Appl. No.: 16/020,962

(22) Filed: Jun. 27, 2018

(65) Prior Publication Data

US 2018/0313863 A1    Nov. 1, 2018

Related U.S. Application Data

(63) Continuation of application No. PCT/EP2016/082378, filed on Dec. 22, 2016.
(Continued)

(51) Int. Cl.
*G01N 1/00* (2006.01)
*G01N 35/10* (2006.01)
(Continued)

(52) U.S. Cl.
CPC ............ *G01N 35/1002* (2013.01); *B01L 7/52* (2013.01); *B05C 11/02* (2013.01); *G01N 1/312* (2013.01); *G01N 35/00029* (2013.01); *G02B 21/34* (2013.01); *B01F 33/3035* (2022.01); *B01L 3/0293* (2013.01); *B01L 3/502* (2013.01); *B01L 2300/0822* (2013.01); *B01L 2300/0861* (2013.01); *B01L 2300/1827* (2013.01); *B01L 2300/1894* (2013.01);
(Continued)

(58) Field of Classification Search
None
See application file for complete search history.

(56) References Cited

U.S. PATENT DOCUMENTS

| 3,495,926 A | 2/1970 | Naz |
| 7,468,161 B2 | 12/2008 | Reinhardt et al. |

(Continued)

FOREIGN PATENT DOCUMENTS

| WO | 2011060387 A1 | 5/2011 |
| WO | 2012015484 A1 | 2/2012 |
| WO | 2013127990 A1 | 9/2013 |

OTHER PUBLICATIONS

International Search Report and Written Opinion dated Mar. 8, 2017 in corresponding PCT/EP2016/082378 filed Dec. 22, 2016, pp. 1-14.

*Primary Examiner* — Jyoti Nagpaul
(74) *Attorney, Agent, or Firm* — Charney IP Law LLC; Thomas M. Finetti

(57) ABSTRACT

The present disclosure is directed to opposables including a body having a plurality of cavities disposed therein. Each cavity can be designed to contain one or more reagents, liquids, or fluids which may be applied to a specimen-bearing surface. In some embodiments, the cavities include one or more reagent chambers, the reagent chambers can have one or more seals such that the reagents, liquids, or fluids contained therein may be stored and released to the specimen-bearing surface.

19 Claims, 27 Drawing Sheets

Related U.S. Application Data

(60) Provisional application No. 62/271,817, filed on Dec. 28, 2015.

(51) Int. Cl.
*G01N 1/31* (2006.01)
*G02B 21/34* (2006.01)
*B01L 7/00* (2006.01)
*B05C 11/02* (2006.01)
*G01N 35/00* (2006.01)
*B01F 33/30* (2022.01)
*B01L 3/02* (2006.01)
*B01L 3/00* (2006.01)

(52) U.S. Cl.
CPC ............... *B01L 2400/0406* (2013.01); *G01N 2035/00138* (2013.01); *G01N 2035/1034* (2013.01)

(56) References Cited

U.S. PATENT DOCUMENTS

| | | |
|---|---|---|
| 8,911,815 B2 | 12/2014 | Kram et al. |
| 9,618,430 B2 | 4/2017 | Kram et al. |
| 2011/0305842 A1 | 12/2011 | Kram |
| 2013/0052331 A1 | 2/2013 | Kram et al. |
| 2013/0071858 A1* | 3/2013 | Bui ..................... G01N 35/02 435/7.21 |
| 2013/0203100 A1 | 8/2013 | Otter et al. |

\* cited by examiner

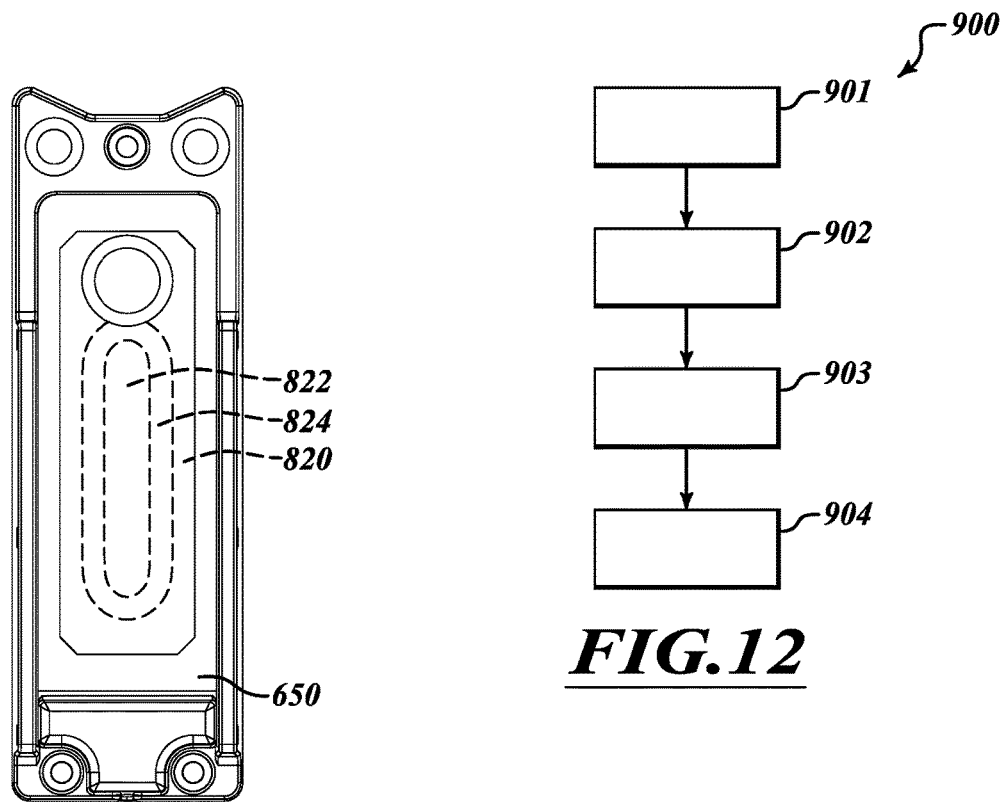
*FIG.11*
*FIG.12*
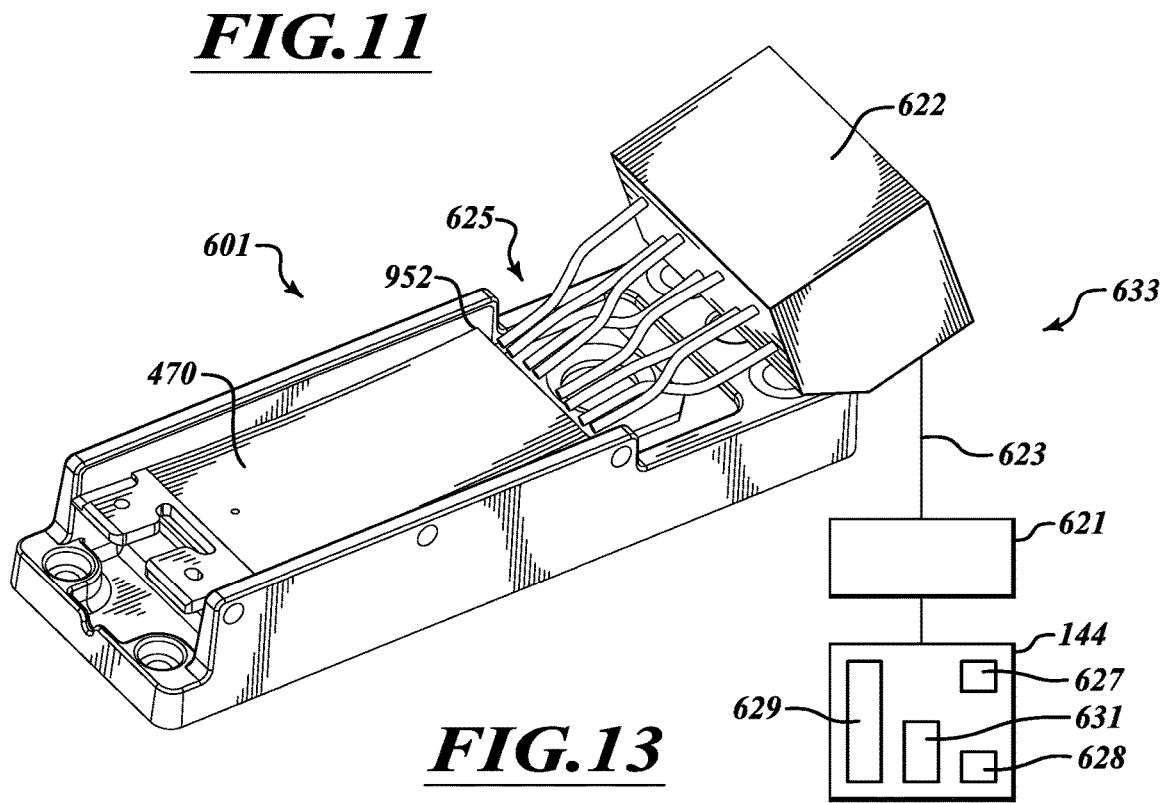
*FIG.13*

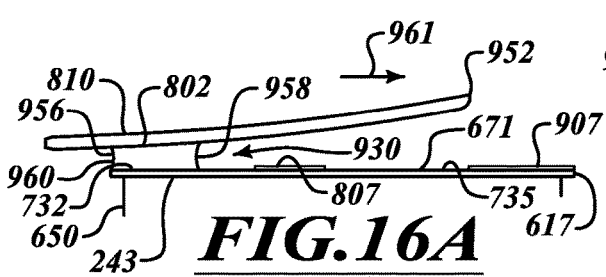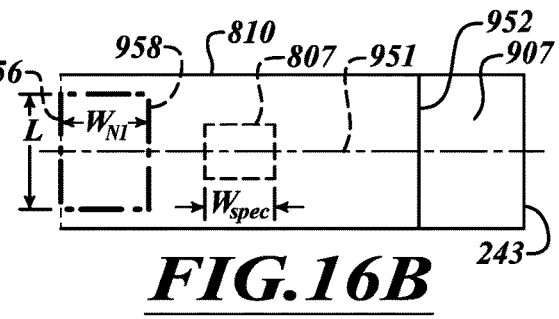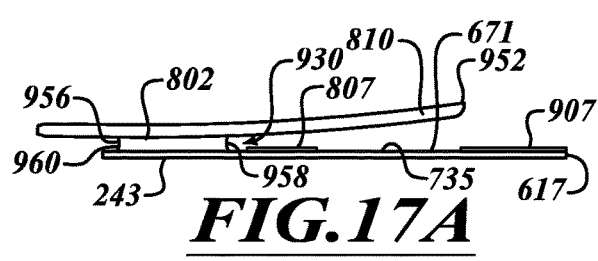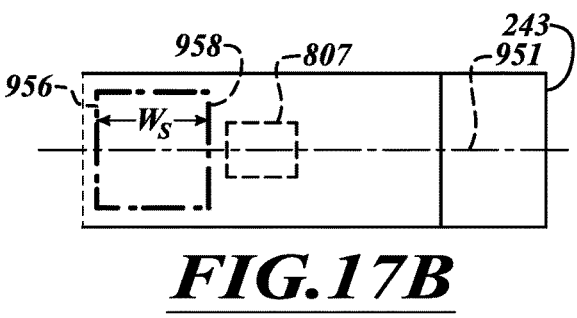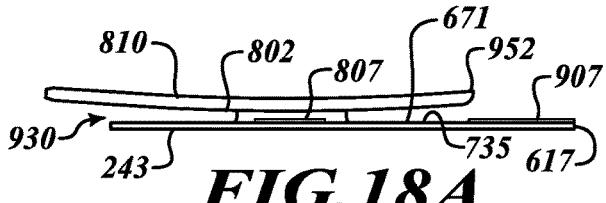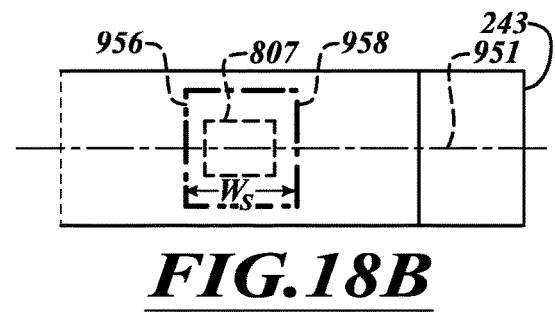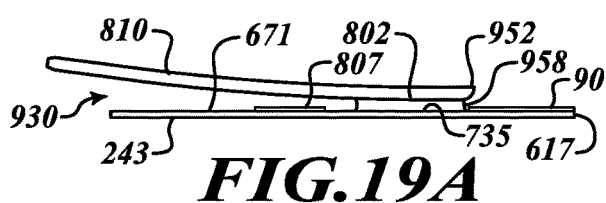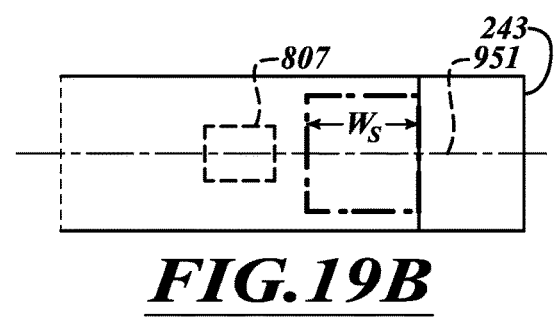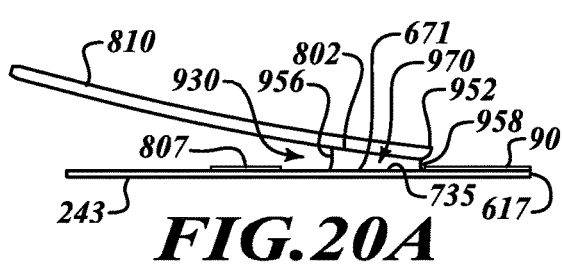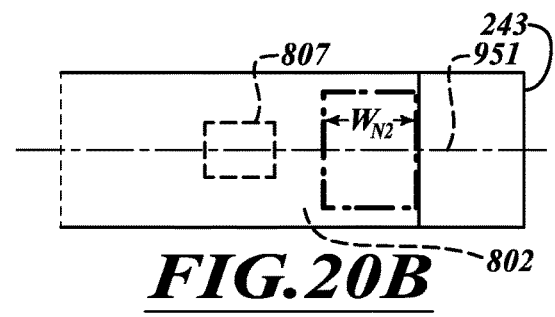

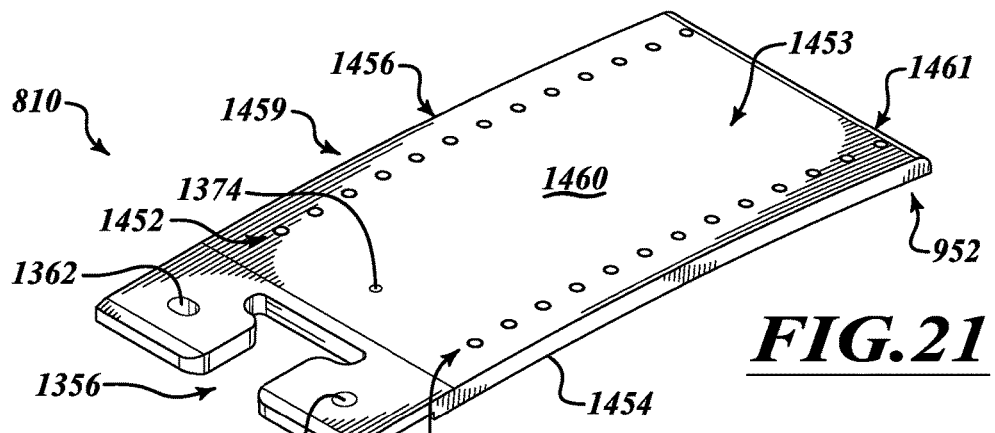
*FIG.21*
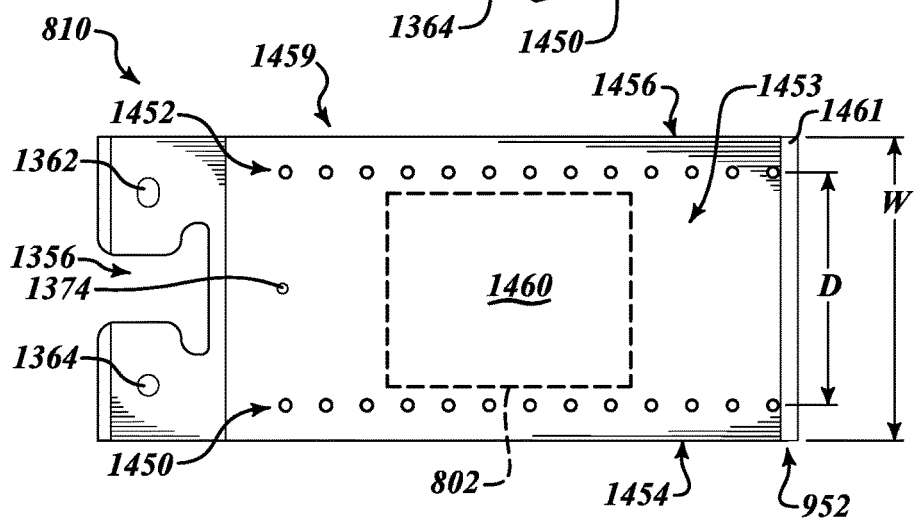
*FIG.22*
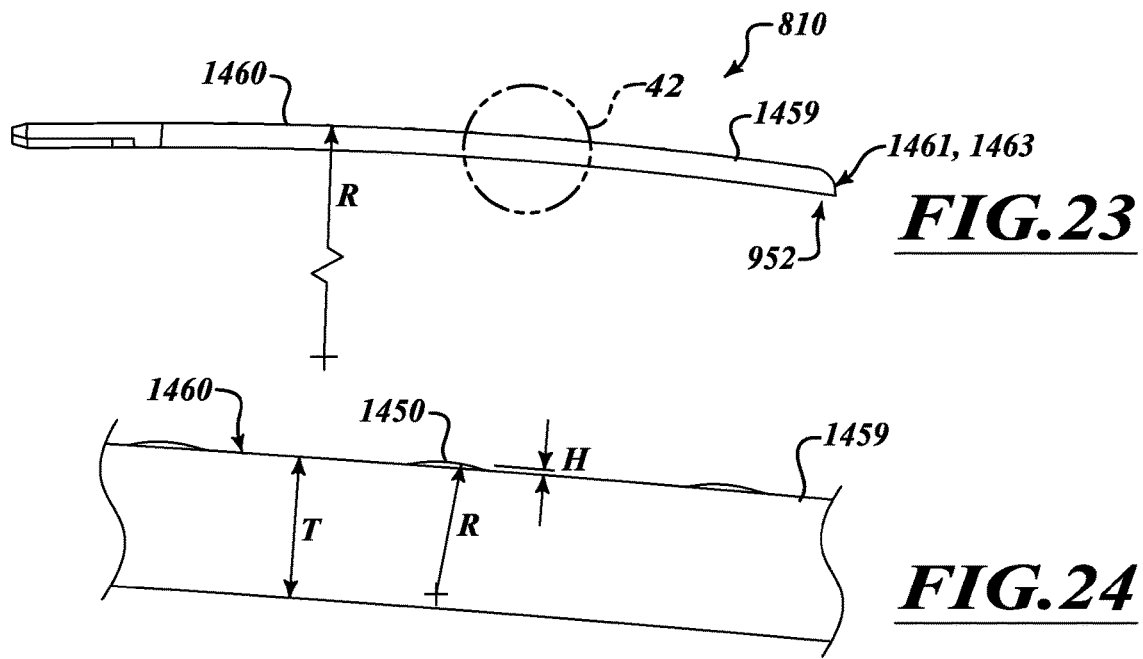
*FIG.23*
*FIG.24*

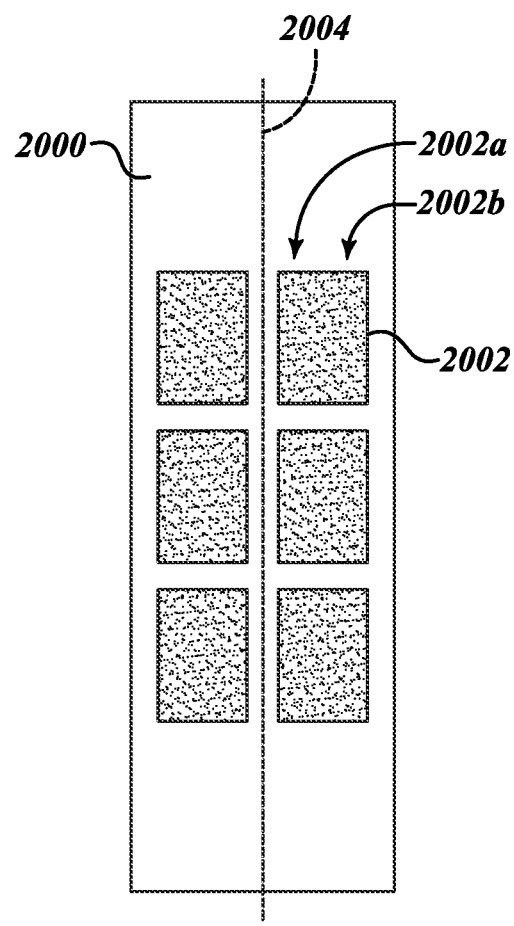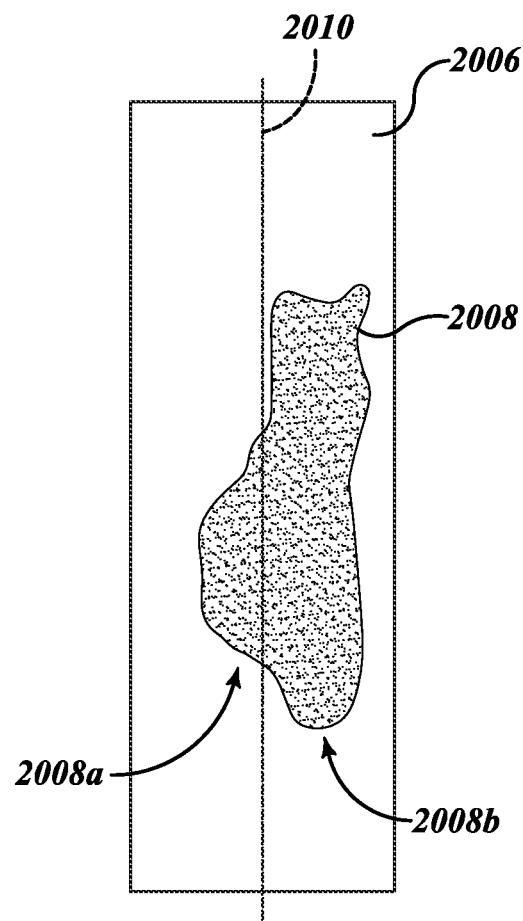
FIG.37          FIG.38

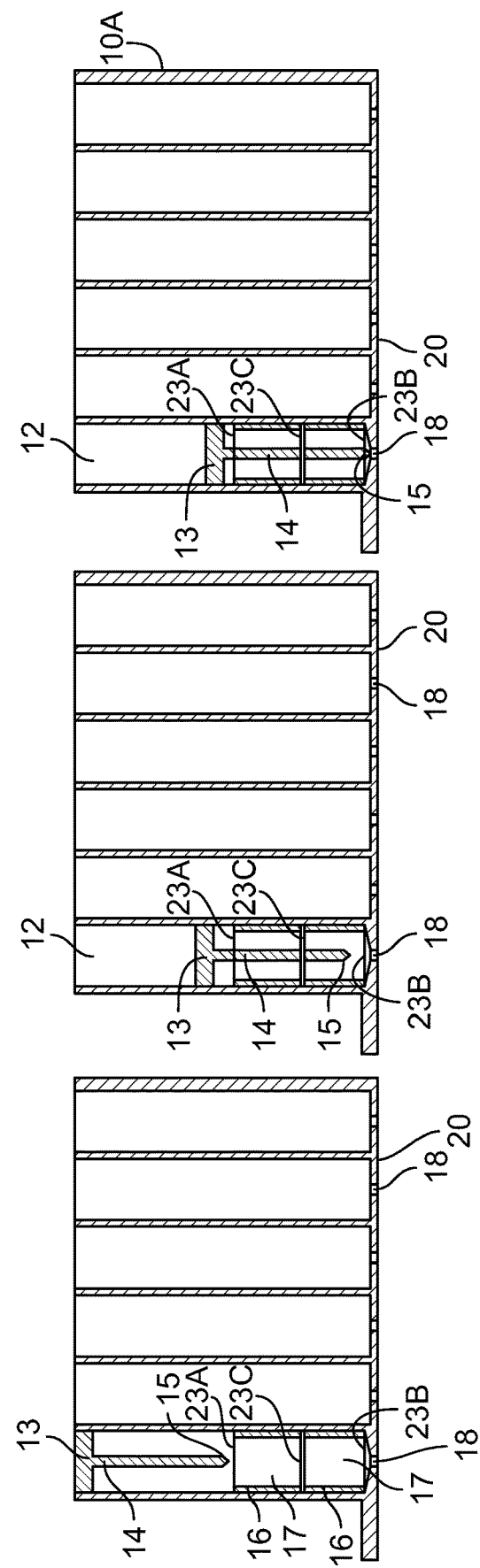

OPPOSABLES INCORPORATING ONBOARD REAGENTS AND AUTOMATED SPECIMEN PROCESSING SYSTEMS

RELATED APPLICATION DATA

This is a continuation of International Patent Application No. PCT/EP2016/082378, filed Dec. 22, 2016, which claims priority to and the benefit of U.S. Provisional Application No. 62/271,817, filed Dec. 28, 2015. These prior patent applications are incorporated by reference herein.

BACKGROUND

A wide variety of techniques have been developed to prepare and analyze biological specimens. Example techniques include microscopy, microarray analyses (e.g., protein and nucleic acid microarray analyses), and mass spectrometric methods. Specimens are prepared for analysis by applying one or more liquids to the specimens and it is important to control any fluid throughout the assay process.

Microscope slides bearing biological specimens, e.g., tissue sections or cells, are often treated with one or more dyes or reagents to add color and contrast to otherwise transparent or invisible cells or cell components. Specimens can be prepared for analysis by manually applying dyes or other reagents to specimen-bearing slides. "Dip and dunk" automated machines immerse specimens in liquids by a technique similar to manual immersing techniques. These automated machines can process specimens in batches by submerging racks carrying microscope slides in open baths.

BRIEF SUMMARY OF THE INVENTION

At least some aspects of the present disclosure are directed to opposables including onboard reagents, liquids, and/or fluids (collectively referred to as "reagents"). The opposables, in general, comprise a body having a plurality of cavities disposed therein. Each cavity is designed to contain one or more reagents which may be applied to a specimen-bearing surface. In some embodiments, the cavities comprise one or more reagent chambers, the reagent chambers having one or more sealing means such that the reagents provided therein may be stored and released on-demand.

In another aspect of the present disclosure is an opposable for specimen processing, comprising: a body having a fluid-manipulating surface, the body being configured to form a fluid-carrying gap between a portion of a central region of the fluid-manipulating surface and a corresponding portion of a central region of a specimen-bearing surface of a slide proximate the body; a plurality of first spacing or gapping elements arranged along a first side portion of the fluid-manipulating surface, the first plurality of spacing or gapping elements being configured to contact the slide at a corresponding first side portion of the specimen-bearing surface; a plurality of second spacing or gapping elements arranged along a second side portion of the fluid-manipulating surface, the second plurality of spacing or gapping elements being configured to contact the slide at a corresponding second side portion of the specimen-bearing surface; and wherein the opposable comprises a plurality of cavities disposed within the body of the opposable, each cavity having at least one reagent chamber.

In some embodiments, a first edge portion of the opposable can extend to or beyond the first edge of the slide and a second edge portion of the opposable can extend to or beyond the opposite edge of the slide. In some embodiments, the opposable can optionally include a mounting end optionally having at least one slot dimensioned to be received and retained by at least a portion of the opposable actuator. In some embodiments, the opposable has a captivation end and an arcuate main body extending from the captivation end. In those embodiments employing an opposable where the body is arcuate, the arcuate main body is configured to roll along or above the slide to move a liquid across the surface of the slide. In some embodiments, the captivation end has a radius of curvature equal to or less than about 0.08 inch. In some embodiments, the opposable includes a first and a second slide contact surface located proximate to each opposable element edge portion respectively. In some embodiments, such slide contact surfaces can comprise intermittent slide contact surfaces with spaces there between to enable fluid to pass there through.

In some embodiments, the at least one reagent chamber in each cavity comprises a first seal at a first end of the reagent chamber and a second seal at a second end of the reagent chamber. In some embodiments, a portion of the plurality of cavities comprise two reagent chambers, wherein the two reagent chambers are separated by an inter-chamber seal positioned between a bottom of a first of the two reagent chambers and a top of a second of the two reagent chambers. In some embodiments, a top of the first of the two reagent chambers comprises a first seal; and a bottom of the second of the two reagent chambers comprises a second seal. In some embodiments, each of the first, second, and inter-chamber seals are comprised of the same material. In some embodiments, each of the two reagent chambers comprise the same interior volume. In some embodiments, each of the two reagent chambers comprises different interior volumes.

In some embodiments, the plurality of cavities are arranged in parallel rows within the body of the cavity. In some embodiments, the opposable comprises between about 10 and about 24 cavities. In some embodiments, a first portion of the plurality of cavities have a first size and a second portion of the plurality of cavities have a second size.

In some embodiments, a portion of the plurality of cavities each comprise two reagent chambers. When a cavity comprises two reagent chambers, each of the two reagent chambers may comprise the same reagents or may comprise different reagents.

In some embodiments, a first portion of the plurality of cavities comprise one or more reagent chambers having reagents (e.g. agents utilized IHC and ISH assays) for a first assay; and a second portion of the plurality of cavities comprise one or more reagent chambers having reagents for a second assay. In alternative embodiments, a first portion of the plurality of cavities comprise one or more reagent chambers having reagents for a first primary stain (e.g. one of hematoxylin or eosin); and a second portion of the plurality of cavities comprise one or more reagent chambers having reagents for a second primary stain (e.g. the other of hematoxylin or eosin). In some embodiments, a third portion of the plurality of cavities may comprise one or more reagent chambers including reagents to wash the specimen bearing surface (e.g. buffers or other liquids that will not alter the interaction between the applied reagents and the sample). In some embodiments, a fourth portion of the plurality of cavities may comprise one or more reagent chambers including reagents to enable the detection of the agents used in IHC and ISH assays.

In some embodiments, a plunger is associated with at least a portion of the plurality of cavities. In some embodiments, the plunger is positioned above a first seal of a reagent chamber (e.g. the plunger may be positioned over the cavity, or placed partially within the cavity but not piercing the first seal when in a "rest" position). In some embodiments, the plunger comprises a piercing means for puncturing one or more seals of a reagent chamber. In some embodiments, the piercing means is a pointed tip of the plunger or syringe.

In some embodiments, the opposable further comprises a series of fluidic openings embedded within the fluid-manipulating surface, each fluidic opening being in fluidic communication with an interior compartment of a reagent chamber (or more than one interior compartment if two reagent chambers are within a single cavity).

In another aspect of the present disclosure is a specimen-processing assembly, comprising (i) an opposable including a body having a fluid-manipulating surface, the opposable including a plurality of cavities, each cavity configured to house at least one reagent chamber; (ii) an actuator configured to change a position of the opposable relative to a slide or to change the position of the slide relative to the opposable to move a volume of the reagent in a first and second direction along the slide while the spacer element contacts the slide to vary a cross section of the fluid-carrying gap in a plane that is substantially perpendicular to the first and second directions; and (iii) means for dispensing a reagent, liquid, or fluid from the reagent chamber of the opposable through a fluidic opening on the fluid-manipulating surface to the fluid-carrying gap. In some embodiments, the opposable includes at least one spacer or gapping element coupled to the body (or a surface thereof) and configured to space the fluid-manipulating surface from the slide to define a fluid-carrying gap between the fluid-manipulating surface and the slide. In some embodiments, the spacer element has a height that varies relative to a length of the opposable. In some embodiments, the spacer element includes a plurality of first gapping elements at a first side portion of the fluid-manipulating surface and a plurality of second gapping elements at a second side portion of the fluid-manipulating surface. In some embodiments, the the fluid-manipulation surface is arcuate.

In some embodiments, the means for dispensing the reagent, liquid, or fluid from the reagent chamber is selected from the group consisting of a plunger, a syringe, a needle, or a jet of compressed air. In some embodiments, the means for dispensing the reagent, liquid, or fluid from the reagent chamber pierces at least one seal of a reagent chamber. In some embodiments, the means for dispensing the reagent, liquid, or fluid from the reagent chamber is a plunger at least partially disposed within a cavity of the opposable.

In some embodiments, a portion of the plurality of cavities each comprise two reagent chambers. In some embodiments, the two reagent chambers each comprise different reagents. In some embodiments, a first portion of the plurality of cavities comprise reagent chambers having reagents for a first assay in a multiplex assay; and wherein a second portion of the plurality of cavities comprise reagent chambers having reagents for a second assay in the multiplex assay. In some embodiments, a third portion of the plurality of cavities comprise reagent chambers housing water, washes, preservatives and/or buffers.

In another aspect of the present disclosure are biological specimen processing systems capable of processing specimens carried on slides. The specimen processing systems can sequentially deliver slides and opposing surfaces (opposables) to specimen processing stations. The specimen processing stations can use opposables to manipulate and direct a series of reagents, liquids, or fluids. The reagents may be supplied to the specimens either from an external source or from onboard reagents incorporated within the opposable itself. The reagents can be manipulated over or across the slide surfaces in conjunction with capillary action while the specimen processing stations control the movement of the opposables and the processing temperatures for histology staining, IHC staining, ISH staining, or other specimen processing protocols. In some embodiments, the opposables are surfaces capable of manipulating one or more substances on a slide. Manipulating a substance in the form of a fluid can include spreading the fluid, displacing a thin film of fluid, or otherwise altering a packet of fluid, a band of fluid, or a thin film. In some embodiments, the opposable incorporates one or more onboard reagents, liquids, or fluids.

In another aspect of the present disclosure is a system comprising: (a) an opposable for specimen processing, comprising: a body having a fluid-manipulating surface, the body being configured to form a fluid-carrying gap between a portion of a central region of the fluid-manipulating surface and a corresponding portion of a central region of a specimen-bearing surface of a slide proximate the body; a plurality of first spacing or gapping elements arranged along a first side portion of the fluid-manipulating surface, the first plurality of spacing or gapping elements being configured to contact the slide at a corresponding first side portion of the specimen-bearing surface; a plurality of second spacing or gapping elements arranged along a second side portion of the fluid-manipulating surface, the second plurality of spacing or gapping elements being configured to contact the slide at a corresponding second side portion of the specimen-bearing surface; and a plurality of cavities disposed within the body of the opposable, each cavity having at least one reagent chamber; (b) a slide; (c) a platen configured to support the slide; and (d) an actuator configured to rotate the opposable relative to the platen, to translate or rotate the platen relative to the opposable, or both from a first end state to a second end state and through a range of intermediate states between the first and second end states in an axis of translation or rotation, wherein in the first end state, the first and second spacers or gapping elements are configured to differentially space apart the first and second side portions of the fluid-manipulating surface from the first and second side portions of the specimen-bearing surface, respectively, so as to cause the fluid-carrying gap to volumetrically taper in a second direction, and in the second end state, the first and second spacers are configured to differentially space apart the first and second side portions of the fluid-manipulating surface from the first and second side portions of the specimen-bearing surface, respectively, so as to cause the fluid-carrying gap to volumetrically taper in a third direction different than the first direction. In some embodiments, the second direction and the third direction are generally perpendicular to the axis of translation or rotation; and the second direction is generally opposite to the third direction.

In some embodiments, the system further comprises means for dispensing a reagent from the reagent chambers of the opposable ("onboard dispensing means"). In some embodiments, the onboard dispensing means is a plunger associated a cavity, the plunger actuated upon by an external source such that upon actuation the plunger pierces one or more seals of the reagent chambers. Alternatively, the onboard dispensing means may be an externally sourced jet of compressed air or fluid that may be used to pierce the seals of the reagent chambers.

In another aspect of the present disclosure is a method for processing a specimen, comprising: forming a fluid-carrying gap between a fluid-manipulating surface of a body of an opposable and a specimen-bearing surface of a slide proximate the opposable, wherein the opposable body comprises a plurality of cavities, each cavity configured to house at least one reagent chamber, the at least one reagent chamber comprising a reagent for dispensing into the fluid-carrying gap; changing a relative position of the opposable relative to the slide in an axis of rotation to advance a volume of fluid within the fluid-carrying gap over a processing path extending over a specimen at the specimen-bearing surface and to change a volumetric asymmetry of the fluid-carrying gap relative to a bisecting plane parallel to the axis of rotation. In some embodiments, the fluid-carrying gap has a volume ranging from about 50 microliters to about 500 microliters. In some embodiments, the fluid-carrying gap has a volume ranging from about 100 microliters to about 400 microliters. In some embodiments, the fluid-carrying gap has a volume ranging from about 50 microliters to about 250 microliters.

In some embodiments, the method further comprises inducing mixing of the fluid in a lateral direction generally perpendicular to the processing path by changing the volumetric asymmetry of the fluid-carrying gap. In some embodiments, changing the volumetric asymmetry of the fluid-carrying gap includes changing a volumetric taper of the fluid-carrying gap in a direction generally perpendicular to the processing path. In some embodiments, the processing path includes a first end portion, a second end portion, and a middle portion between the first and second end portions; the fluid-carrying gap has a first volumetric asymmetry relative to the bisecting plane when the fluid is at the first end portion of the processing path; the fluid-carrying gap has a second volumetric asymmetry relative to the bisecting plane when the fluid is at the second end portion of the processing path; and the first volumetric asymmetry is generally opposite to the second volumetric asymmetry.

Applicants have developed an improved opposable that incorporates one or more onboard reagents, liquids, or fluids into the structure of the opposable. Applicants believe that by incorporating such onboard reagents, specimen processing efficiency may surprisingly be increased and cross-contamination may be lessened, as compared opposables that do not include onboard reagents. Applicants also believe that any specimen processing system incorporating such an opposable may require less mechanical components, e.g. dispensing means, including pipettes or other fluid delivery mechanisms, to deliver reagents to an opposable surface may be eliminated.

BRIEF DESCRIPTION OF THE DRAWINGS

Non-limiting and non-exhaustive embodiments are described with reference to the following drawings. The same reference numerals refer to like parts or acts throughout the various views, unless otherwise specified.

FIG. 11 is a top plan view of heating zones produced on a slide support surface of the support element in accordance with an embodiment of the disclosed technology.

FIG. 12 is a flow chart illustrating a method for heating a slide in accordance with an embodiment of the disclosed technology.

FIG. 13 illustrates a slide holder platen and a dispenser assembly in accordance with an embodiment of the disclosed technology.

FIGS. 16A and 16B are side and top views of a narrowed band of liquid at an end of a gap between an opposable and a slide.

FIGS. 17A and 17B are side and top views of the spread band of liquid.

FIGS. 18A and 18B are side and top views of the band of liquid contacting a biological specimen.

FIGS. 19A and 19B are side and top views of the band of liquid between the opposable and a region of the slide adjacent to a label.

FIGS. 20A and 20B are side and top views of the narrowed band of liquid at an end of a gap adjacent to a label of the slide.

FIG. 21 is an isometric view of an opposable in accordance with one embodiment of the disclosed technology. In some embodiments, one or more fluid control elements are incorporated into the opposable such that fluid is maintained within the fluid-carrying gap or on the fluid-manipulation surface.

FIG. 22 is a top plan view of the opposable of FIG. 21. In some embodiments, one or more fluid control elements are incorporated into the opposable such that fluid is maintained within the fluid-carrying gap or on the fluid-manipulation surface.

FIG. 23 is a side elevation view of the opposable of FIG. 21.

FIG. 24 is a detailed view of a portion of the opposable of FIG. 23.

FIG. 37 is a plan view of a specimen-bearing slide illustrating an example of relatively uniform staining in accordance with an embodiment of the disclosed technology.

FIG. 38 is a plan view of a specimen-bearing slide illustrating another example of relatively uniform staining in accordance with an embodiment of the disclosed technology.

FIGS. 42A, 42B and 42C provide cross-sections of an opposable incorporating onboard reagents, where a plunger is moved from a stored position to a deployed position in a two reagent chambers.

DETAILED DESCRIPTION OF TECHNOLOGY

Figure 1:
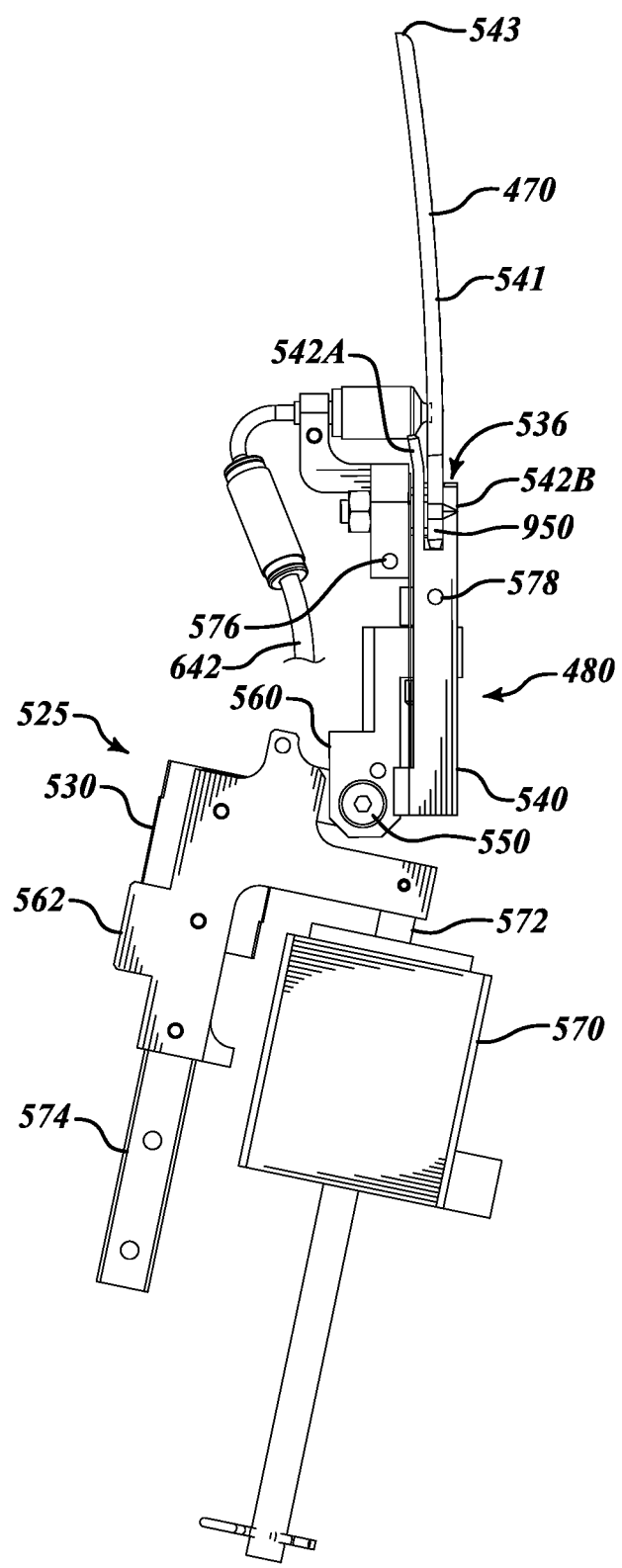
FIG. 1 is a side view of an opposable actuator holding an opposable in accordance with an embodiment of the disclosed technology.

The present disclosure is directed to novel opposables which, in some embodiments, may comprise on-board reagents, liquids, or fluids.

As used herein, the singular terms "a," "an," and "the" include plural referents unless the context clearly indicates otherwise. Similarly, the word "or" is intended to include "and" unless the context clearly indicates otherwise.

As used herein, the terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein, "biological sample" or "tissue sample" can be any solid or fluid sample obtained from, excreted by or secreted by any living organism, including without limitation, single celled organisms, such as bacteria, yeast, protozoans, and amoebas among others, multicellular organisms (such as plants or animals, including samples from a healthy or apparently healthy human subject or a human patient affected by a condition or disease to be diagnosed or investigated, such as cancer). For example, a biological sample can be a biological fluid obtained from, for example, blood, plasma, serum, urine, bile, ascites, saliva, cerebrospinal fluid, aqueous or vitreous humor, or any bodily secretion, a transudate, an exudate (for example, fluid obtained from an abscess or any other site of infection or inflammation), or fluid obtained from a joint (for example, a normal joint or a joint affected by disease). A biological sample can also be a sample obtained from any organ or tissue (including a biopsy or autopsy specimen, such as a tumor biopsy) or can include a cell (whether a primary cell or cultured cell) or medium conditioned by any cell, tissue or organ. The samples may be tumor samples, including those from melanoma, renal cell carcinoma, and non-small-cell lung cancers. In some embodiments, the samples are analyzed for the of cancer by detecting targets, including biomarkers (e.g. proteins or nucleic acid sequences), within the tissue sample. The described embodiments of the disclosed method can also be applied to samples that do not have abnormalities, diseases, disorders, etc., referred to as "normal" samples or "control" samples. For example, it may be useful to test a subject for cancer by taking tissue samples from multiple locations, and these samples may be used as controls and compared to later samples to determine whether a particular cancer has spread beyond its primary origin.

As used herein, the term "opposable" or "opposable element" is a broad term and refers to, without limitation, a surface, a tile, a strip, or another structure (e.g. a generally cylindrical opposable such as in FIG. 47) capable of manipulating one or more reagents, fluids or other substances to process a specimen in on a slide, as described herein. In some embodiments, the opposable element can include one or more spacers, gapping elements or other features for positioning the opposable element relative to a slide. In some embodiments, the opposable may include onboard reagents, liquids, or fluids in one or more cavities, as further described in more detail herein. Thus, when the term "opposable" is used herein, it may refer to any opposable, including those incorporating onboard reagents (i.e. opposables with and without onboard reagents are envisioned to be encompassed within all embodiments of the present disclosure).

The term "reagent" means any liquid or fluid, including those that are designed to cause a chemical reaction with moieties in a biological sample or those that are "inert" and do not cause any chemical reaction with moieties in a biological sample. The terms "reagent," "liquid," and "fluid" are used interchangeably herein.

FIG. 1 shows an opposable actuator 525 that includes an opposable receiver 480 and a drive mechanism 530. The opposable receiver 480 holds an opposable 470 (including an opposable incorporating onboard reagents) that can be used to manipulate and direct a series of liquids to a specimen. The opposable receiver 480 can include a clamp 536 and a main body 540. The clamp 536 includes a pair of jaws 542A, 542B that cooperate to hold a mounting end 950 of the opposable 470. The opposable 470 includes a main body 541 extending to a captivating end 543. The main body 541 is pivotally coupled to the drive mechanism 530 by a pivot 550. The drive mechanism 530 can include a linkage assembly 560 and a linear actuator assembly 562. The linkage assembly 560 includes the pivot 550, which allows rotation about one or more axes of rotation (e.g., two axes of rotation) and can include one or more roller ball bearings, pivots, hinges, or other features that provide desired motion. The linear actuator assembly 562 can include an energizable drive device 570 (e.g., a stepper motor, a drive motor, a solenoid, etc.), a moveable element 572 (e.g., a lead screw, a drive rod, etc.), and a rail assembly 574 (e.g., a carriage/rail assembly, a caged ball bearing linear rail assembly, etc.).

The opposable receiver 480 can be actuated by the linear actuator assembly 562 via the linkage assembly 560. The linear actuator assembly 562 can retract, and stationary cam(s) (e.g., cam 575 of FIG. 2) can engage, pins 576, 578 and drive the opposable receiver 480 to an open configuration. In some embodiments, including the illustrated embodiment of FIG. 1, the opposable receiver 480 in the open configuration can loosely hold the opposable 470. The opposable receiver 480 can be moved to a closed configuration by one or more biasing members (e.g., springs, pneumatic actuators, etc.). As the linear actuator assembly 562 extends, the pins 576, 578 can move upwardly and towards one another such that the biasing members close the opposable receiver 480.

The opposable actuator 525 can also include, without limitation, one or more sensors to detect the presence of the opposable 470, the position of the opposable 470, one or more characteristics of a processing liquid covered by the opposable 470, or the like. The sensors can include, without limitation, contact sensors, electromechanical sensors, optical sensors, or chemical sensors that can be coupled to or incorporated into the opposable receiver 480 or other suitable component. The number, positions, and configurations of the sensors can be selected to achieve the desired monitoring functionality.

Figure 2:
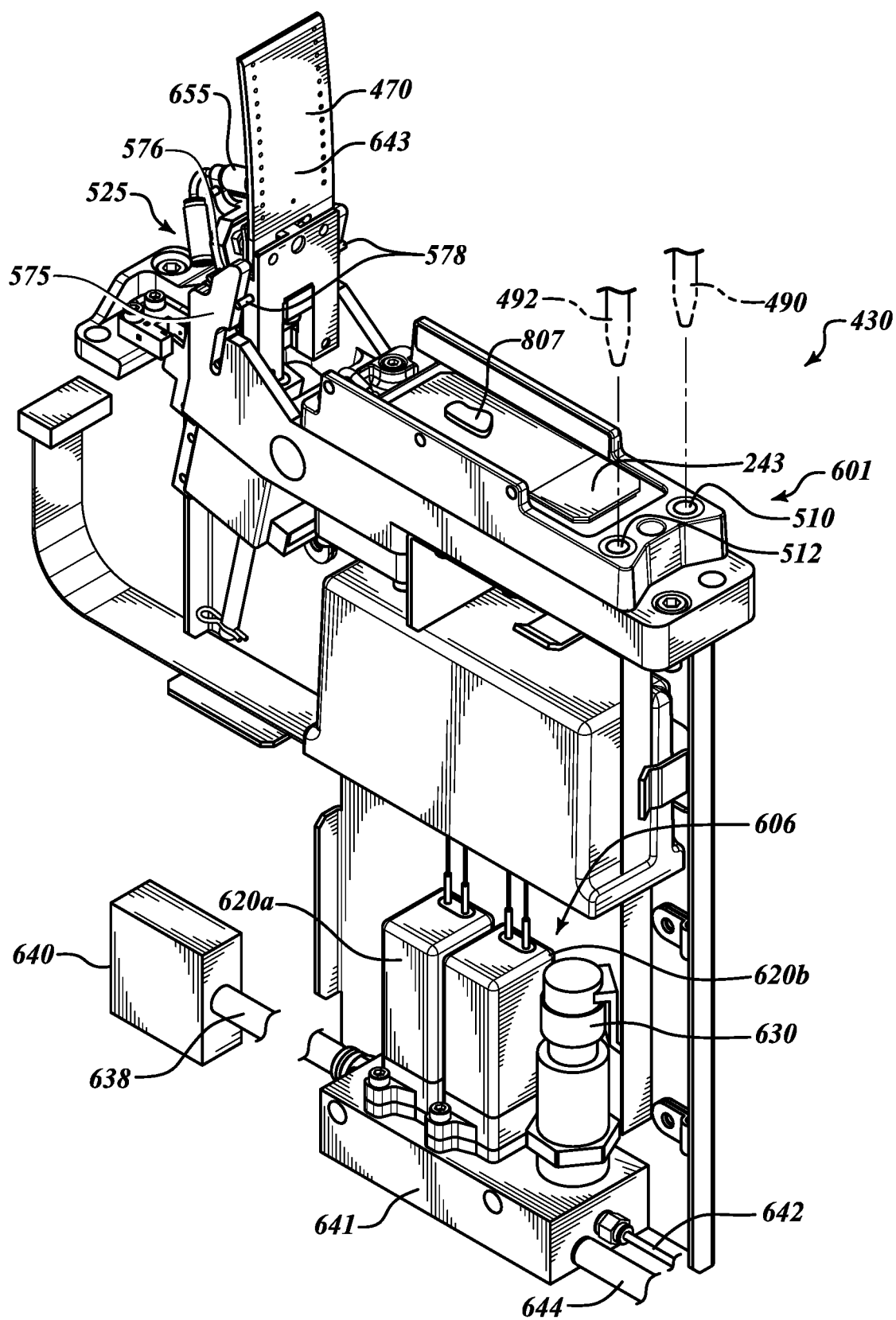
FIG. 2 is an isometric view of a specimen processing station ready to process a specimen on a slide in accordance with an embodiment of the disclosed technology.

FIG. 2 is an isometric view of a wetting module 430 holding a slide 243 in accordance with an embodiment of the present technology. The wetting module 430 includes the opposable actuator 525, a slide holder platen 601, and a manifold assembly 606. The opposable actuator 525 in a rolling state of operation can be extended or retracted to roll the opposable 470 back and forth along the slide 243. The motion of the rotary joints of the linkage assembly 560 (FIG. 1), gravity, and/or liquid capillary forces can help maintain the desired motion of the opposable 470. In some embodiments, the opposable actuator 525 can continuously or periodically roll (e.g., longitudinally roll, laterally roll, or both) the opposable 470 to agitate the volume of liquid, move (e.g., translate, spread, narrow, etc.) a band of liquid (e.g., a fluidic layer of liquid), control evaporation (e.g., to moderate evaporation), and/or otherwise manage the processing liquid.

The manifold assembly 606 includes a pair of sensors 620a, 620b (collectively "620") and a one or more valves 630. The sensors 620 can detect the pressures of working fluids and can send one or more signals indicative of detected pressures. A fluid line 638 can fluidically couple a pressurization source 640 to a manifold 641. Fluid lines 642, 644 fluidically couple the manifold 641 to a liquid removal device 655 and the slide holder platen 601. The liquid removal device 655 can remove liquid between the opposable 470 and the slide 243 via a waste port 643. The line 644 can be used to draw a vacuum to hold the slide 243 on the slide holder platen 601.

Figure 3A:
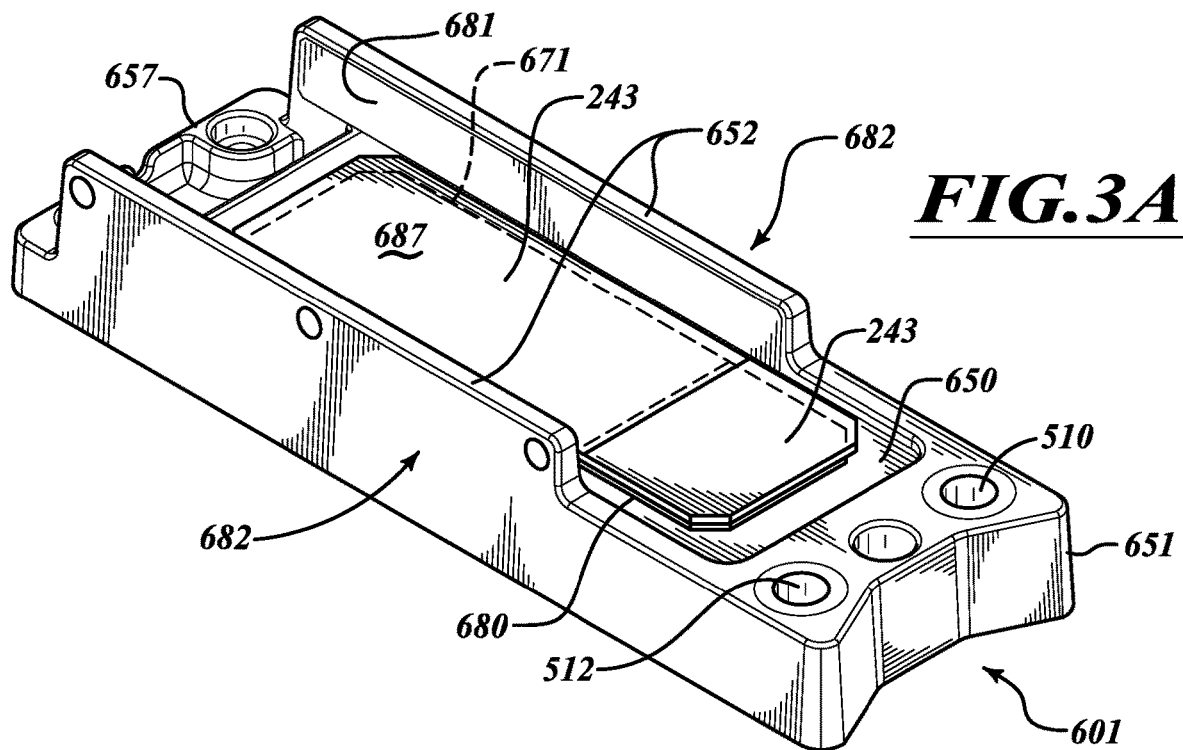
FIG. 3A is a front, top, left side isometric view of a slide holder platen holding a slide in accordance with an embodiment of the disclosed technology.
Figure 3B:
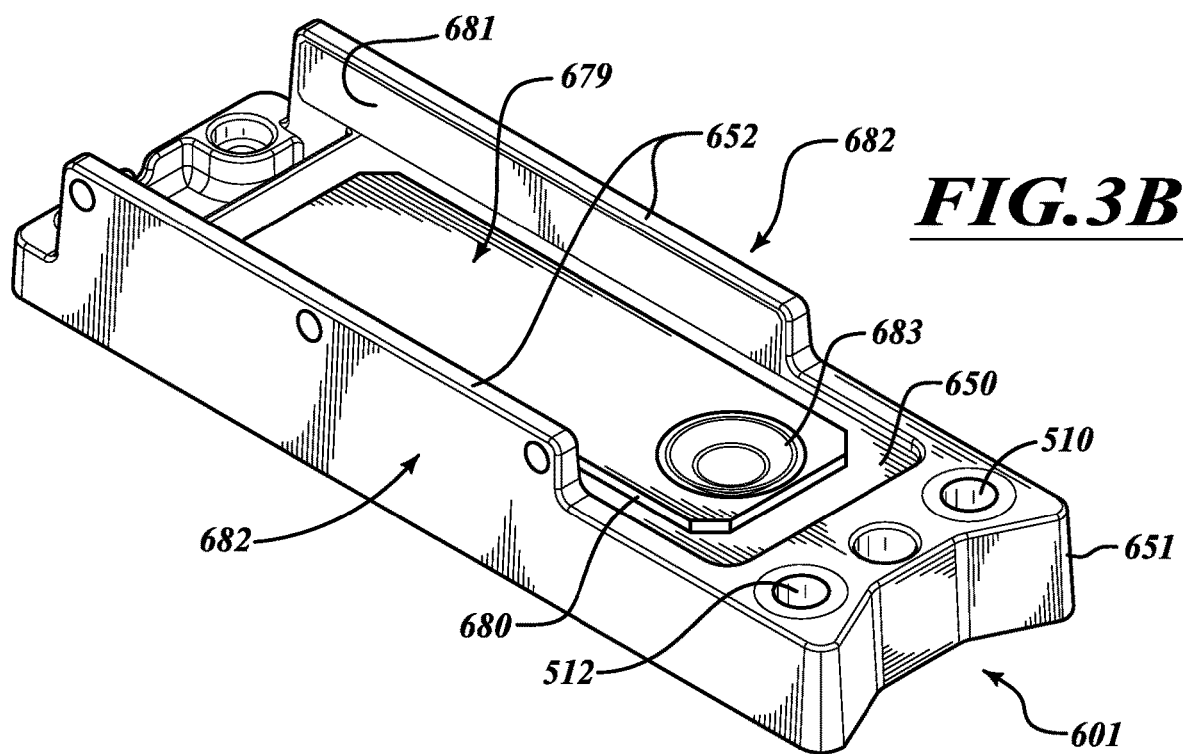
FIG. 3B is a front, top, left side isometric view of the slide holder platen of FIG. 3A ready to hold a slide in accordance with an embodiment of the disclosed technology.

FIGS. 3A and 3B are isometric views of the slide holder platen 601 in accordance with an embodiment of the present technology. The slide holder platen 601 of FIG. 3A supports the slide 243. The slide holder platen 601 of FIG. 3B is empty. The slide holder platen 601 can include a support element 650 and a mounting base 651. The support element 650 includes a raised slide receiving region 680 having a contact or contact surface 679 (FIG. 3B). A port 683 (FIG. 3B) is positioned to draw a vacuum to hold the slide 243 against the contact surface 679. The port 683 can be a suction cup or other feature configured to facilitate drawing a strong vacuum between the slide 243 against the contact surface 679.

The support element 650 includes inner walls 681 positioned in outer walls 652 of the mounting base 651. The inner and outer walls 681, 652 form heatable sidewalls 682. In some embodiments, the sidewalls 682 can be positioned on both sides of the contact surface 679 and can output heat energy to the surrounding air to control the temperature of the slide 243, processing fluid, and/or specimen(s). In some embodiments, the sidewalls 682 can also be positioned to laterally surround the entire slide 243. The mounting base 651 can be made of an insulating material (e.g., plastic, rubber, polymers, or the like) that can insulate the support element 650 from other components. In some embodiments, the mounting base 651 is made of a material with a thermal conductivity that is substantially less than the thermal conductivity of the material of the support element 650. The mounting base 651 can surround and protect the support element 650 and includes a coupling region 657 to which the opposable actuator 525 can be coupled.

The support element 650 can be an uncoated element comprising one or more low heat transfer material(s) with a low thermal conductivity. Low heat transfer materials can include, without limitation, steel, stainless steel, or other materials with a thermal conductivity in a range of about 10 W/(m*K) at 25° C. to about 25 W/(m*K) at 25° C. In one embodiment, the low heat transfer material comprises stainless steel with a thermal conductivity of 16 W/(m*K) at 25° C. In some embodiments, the support element 650 comprises mostly stainless steel by weight. In certain embodiments, at least most of the material of the support element 650 directly between a heating element 653 (FIG. 4) and the slide 243 comprises stainless steel by weight. The stainless steel support element 650 can be corrosion-resistant to the liquids used to process the specimens to provide a relatively long working life. In some embodiments, support element 650 comprises antimony (k=18.5 W/(m*K) at 25° C.) or chrome nickel steel (e.g., 18% Cr and 8% Ni by weight and with a thermal conductivity of about 16.3 W/(m*K) at 25° C.). In other embodiments, the support element 650 can comprise lead with a thermal conductivity of about 35 W/(m*K) at 25° C.) or other metal with a similar thermal conductivity. In some embodiments, the support element 650 can be made of a material with thermal conductivity less than copper or brass. The mounting base 651 can be made of an insulating material with a thermal conductivity that is less than the thermal conductivity of the support element 650. As such, the mounting base 651 can thermally insulate the support element 650.

Figure 4:
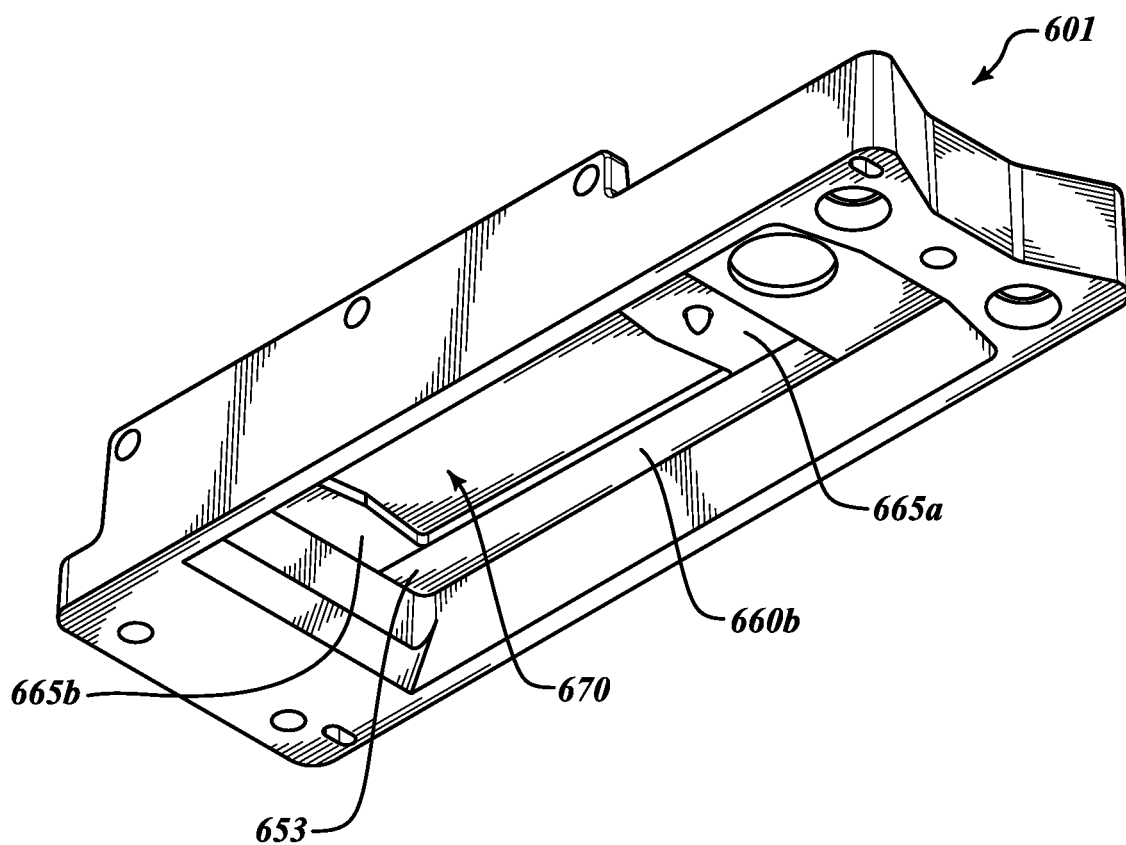
FIG. 4 is a front, bottom, left side isometric view of the slide holder platen of FIG. 3A.
Figure 5:
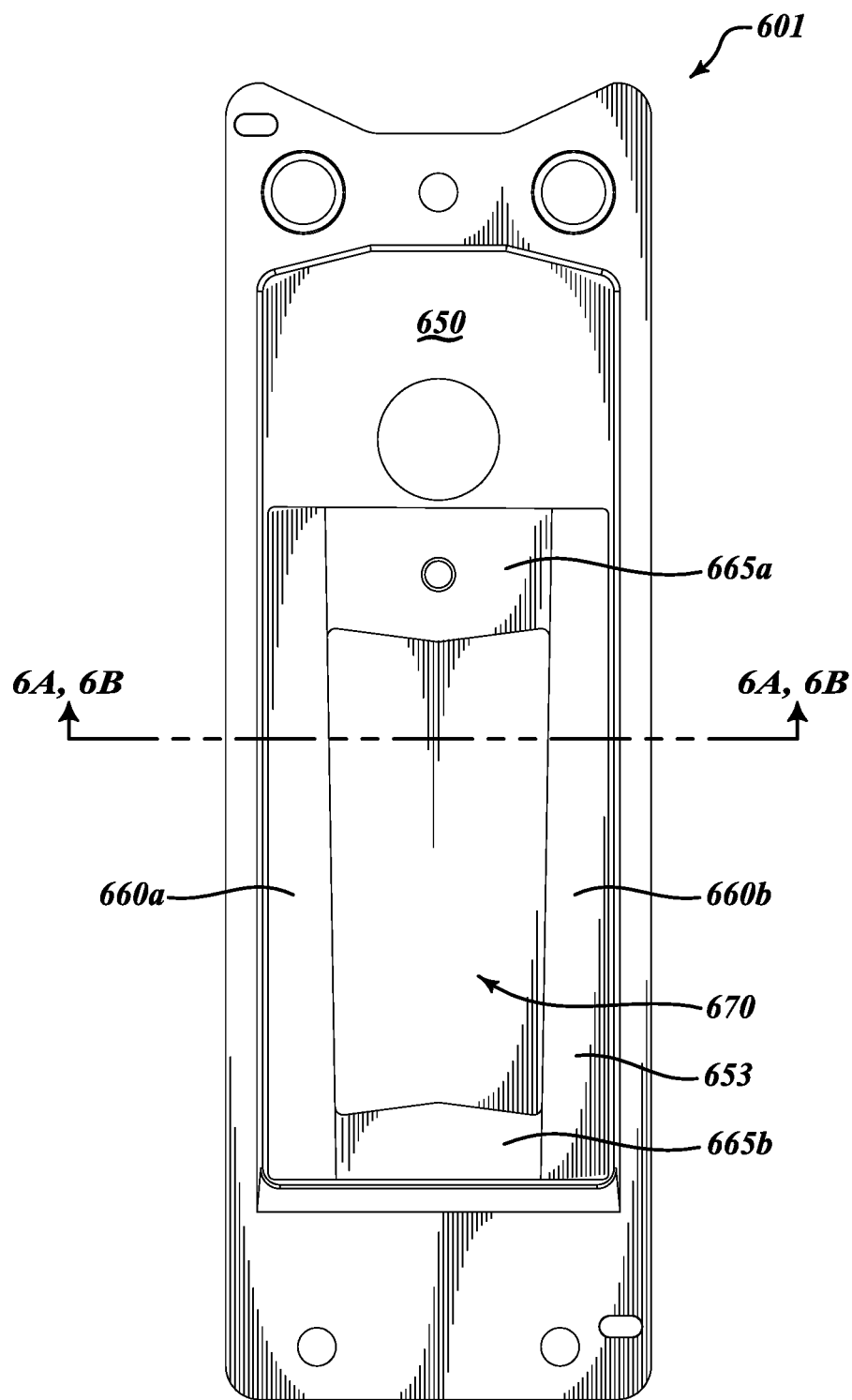
FIG. 5 is a bottom view of the slide holder platen of FIG. 3A.

FIG. 4 is a front, bottom, left side view of the slide holder platen 601. FIG. 5 is a bottom view of the slide holder platen 601. The slide holder platen 601 can include the heating element 653, which can convert electrical energy to thermal energy and can include, without limitation, one or more traces, leads, resistive elements (e.g., active elements that produce thermal energy), fuses, or the like. In some embodiments, the heating element 653 can be a resistive heater. Other types of heaters can also be used, if needed or desired. In some embodiments, the heating element 653 can output thermal energy to the support element 650 to achieve a desired heat transfer pattern. Heat can be transferred non-uniformly to the slide 243 via the support element 650 to compensate for evaporative heat losses. Non-uniform heat transfer along the contact surface 679 may produce a non-uniform temperature profile along the contact surface 679. A generally uniform temperature profile can be produced across a processing zone 671 (FIG. 3A) of slide 243. The processing zone 671 can be a staining region, a mounting region, or area of an upper or specimen-bearing surface 687 (FIG. 3A) of the slide 243 suitable for carrying one or more specimen(s).

The heating element 653 of FIG. 5 can include two elongate slide heating portions 660a, 660b (collectively 660) and two end heating portions 665a, 665b (collectively "665"). The elongate portions 660 deliver thermal energy to the longitudinally extending edge portions of the slide 243. The end heating portions 665 deliver thermal energy to the ends of the processing zone 671. The elongate portions 660 and the end heating portions 665 can be coupled together to form a multi-piece heating element 653. The elongate portions 660 and the end heating portions 665 can be made of materials with the same conductivity or different thermal conductivities. Each portion 660, 665 can be independently operated to output different amounts of thermal energy. In other embodiments, the heating element 653 can have a one-piece construction with a uniform thickness or a variable thickness. The one-piece heating element 653 can be made of one material.

The elongate portions 660 and end heating portions 665 together define a convection cooling feature in the form of a pocket 670. The pocket 670 can help isolate heat in the support element 650 to help keep thermal energy at the location it is applied and can also help reduce or limit the thermal mass of the slide holder platen 601. The pocket 670 can be an opening with a substantially rectangular shape, as shown in FIG. 5. However, the pocket 670 can have other shapes based on the desired heat distribution along the contact surface 679 of the support element 650.

Figure 6A:
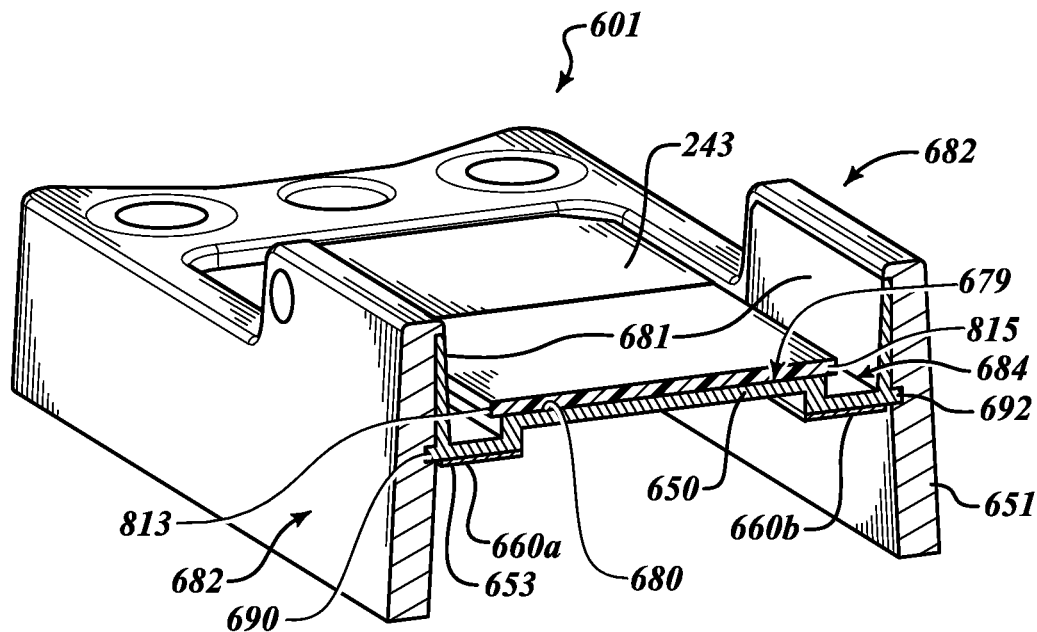
FIG. 6A is a cross-sectional isometric view of the slide holder platen taken along a line 6A-6A of FIG. 5.

FIG. 6A is a cross-sectional isometric view of the slide holder platen 601. The support element 650 includes the receiving region 680, sidewalls 682, and a channel 684. The receiving region 680 keeps the slide 243 spaced apart from fluids that can collect in the channel 684 during operation. The channel 684 can collect liquid that falls from edges 813, 815 of the slide 243. In some embodiments, the slide 243 can extend outwardly from the receiving region 680 a sufficient distance (e.g., 0.5 mm, 0.75 mm, 1 mm, 2 mm, 4 mm, or 6 mm) to prevent liquid from wicking between the slide 243 and the contact surface 679.

The slide holder platen 601 can be made in a multi-step manufacturing process. The support element 650 can be formed by a machining process, stamping process, or the like. The support element 650 can be over-molded to form the mounting base 651, which can be made of an insulating material molded using an injection molding process, compressing molding processes, or other suitable manufacturing processes. Exemplary non-limiting insulating materials include, without limitation, plastics, polymers, ceramics, or the like. The support element 650 and mounting base 651 can remain securely coupled together to inhibit or prevent liquids from traveling between the support element 650 and mounting base 651. For example, the interface between the supporting element 650 and the mounting base 651 can form a fluid-tight seal with or without utilizing any sealants. However, sealants, adhesives, and/or fasteners can be used to securely couple the support element 650 to the mounting base 651. The illustrated support element 650 includes locking features 690, 692 to help minimize, limit, or substantially prevent movement of the support element 650 relative to the mounting base 651.

Figure 6B:
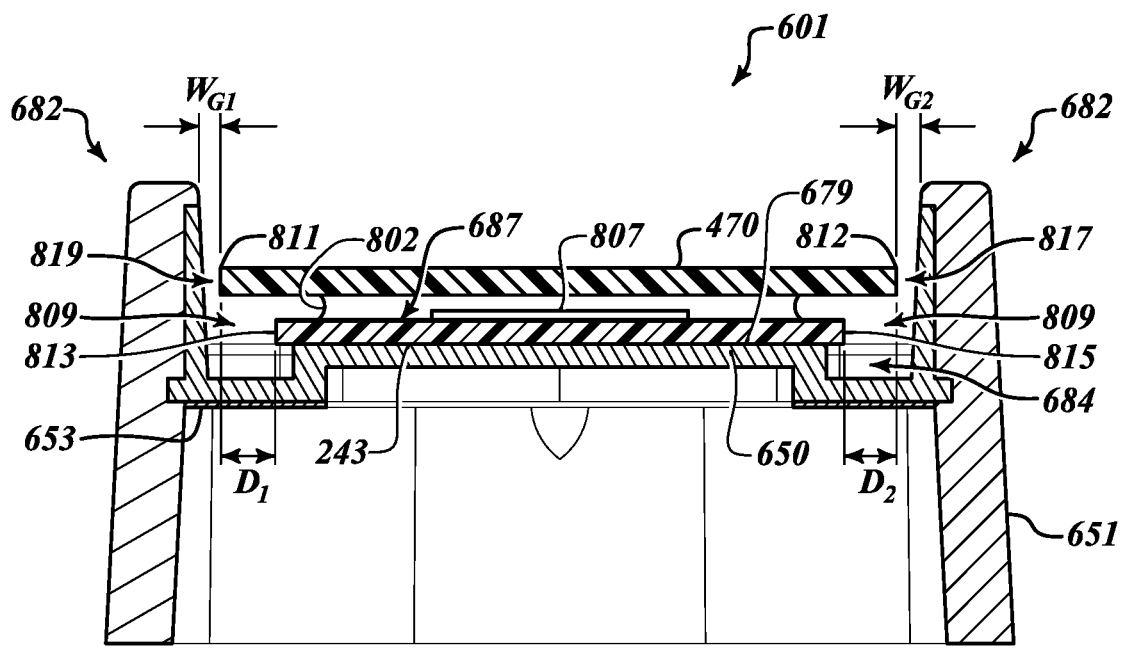
FIG. 6B is a cross-sectional view of the slide holder platen taken along a line 6B-6B of FIG. 5.

FIG. 6B is a cross-sectional view of the slide holder platen 601. The opposable 470 engages a liquid 802 which engages a specimen 807. The sidewalls 682 can extend vertically above the slide 243. The distance that the sidewalls 682 extend vertically past the slide 243 can be selected to manage (e.g., limit, minimize, substantially prevent, etc.) air currents that can cause heat losses via convection (e.g., convection via the surrounding air), evaporation, or the like. For example, the slide holder platen 601 and opposable 470 can moderate evaporation by keeping the evaporation rate of the liquid 802 at or below about 7 microliters per minute, 5 microliters per minute, 3 microliters per minute or other maximum evaporation rates. In some embodiments, the slide holder platen 601 and opposable 470 can keep the evaporation rate of the liquid 802 within a range of about 7 microliters per minute to about 1 microliters per minute. Such embodiments can moderate evaporative losses. The sidewalls 682 and the opposable 470 can also cooperate to help thermally isolate the fluid 802 from the surrounding environment.

A side portion 811 of the opposable 470 (including those opposables incorporating onboard reagents) extends outwardly past the edge 813 of the slide 243 such that the side portion 811 is closer to the sidewall 682 than the edge 813 of the slide 243. A width $W_{G1}$ of a gap 819 can be smaller than a distance $D_1$ from the side portion 811 to the slide edge 813. A side portion 812 of the opposable 470 extends outwardly past the edge 815. A width $W_{G2}$ of a gap 817 can be smaller than a distance $D_2$ from the side portion 812 to the slide edge 815. In some embodiments, width $W_{G1}$ can be equal to or less than about 10%, 25%, or 50% of a distance between the left sidewall 682 and the edge 813. Similarly, width $W_{G2}$ can be equal to or less than about 10%, 25%, or 50% of a distance between the right sidewall 682 and the slide edge 815. The widths $W_{G1}$, $W_{G2}$ can be sufficiently small to inhibit or limit evaporative losses while allowing slight side-to-side movement of the opposable 470 to facilitate convenient handling. In some embodiments, the widths $W_{G1}$, $W_{G2}$ are equal to or less than about 1 mm, 2 mm, 4 mm, or other suitable widths.

Figure 7:
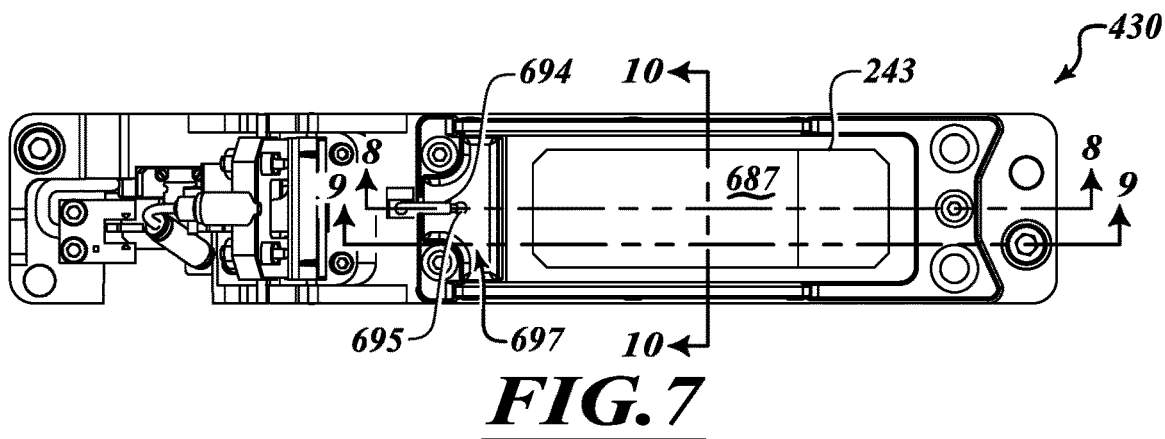
FIG. 7 is a top plan view of a specimen processing station holding a specimen-bearing slide in accordance with an embodiment of the disclosed technology.
Figure 8:
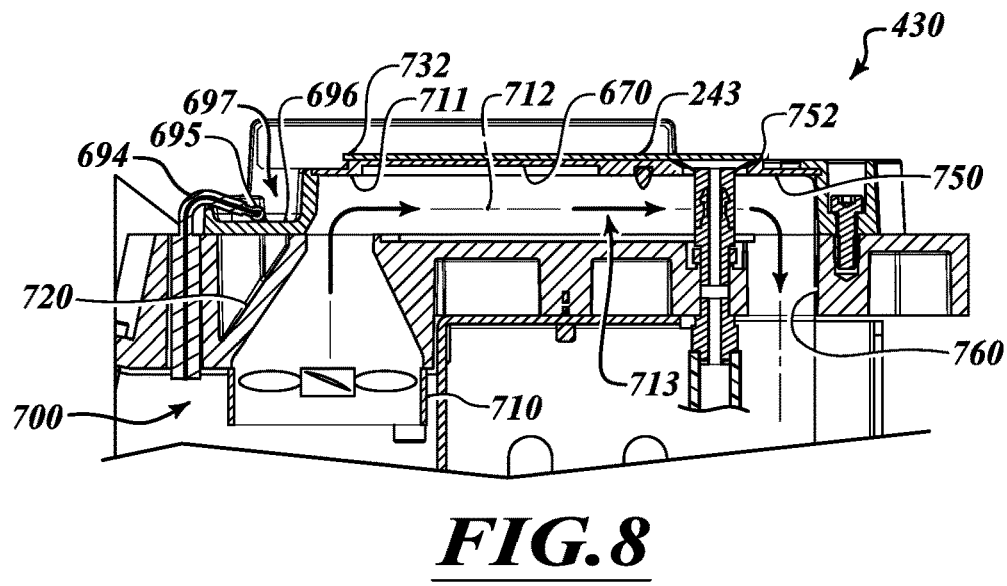
FIG. 8 is a cross-sectional view of a portion of the specimen processing station taken along a line 8-8 of FIG. 7.
Figure 9:
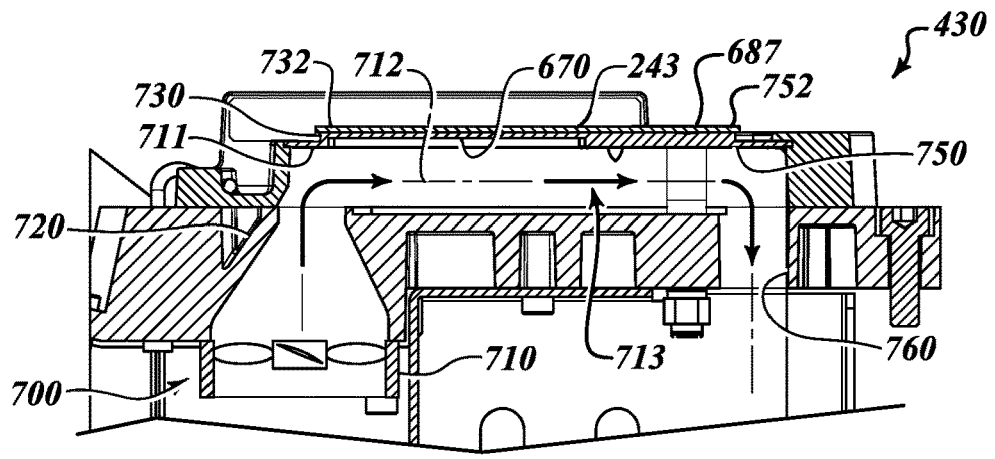
FIG. 9 is a cross-sectional view of a portion of the specimen processing station taken along a line 9-9 of FIG. 7.

FIG. 7 is a top plan view of the wetting module 430. FIG. 8 is a cross-sectional view of a portion of the wetting module 430 taken along a line 8-8 of FIG. 7. FIG. 9 is a cross-sectional view of a portion of the wetting module 430 taken along a line 9-9 of FIG. 7. Referring to FIGS. 7 and 8, a sensor 694 is positioned to detect liquid in a reservoir 697. The sensor 694 can include a thermistor element 695 positioned near a bottom 696 of the reservoir 697. When a sufficient volume of liquid is collected to contact the thermistor element 695, the sensor 694 sends a signal to another component, such as a controller. The detection of a threshold volume of liquid in the reservoir 697 can indicate a failure in the wetting module 430. Upon detection of a failure, the wetting module 430 can be disabled until the wetting module 430 can be, for example, inspected, cleaned, or otherwise maintained.

Referring to FIGS. 8 and 9, the wetting module 430 includes a convection system 700 that includes a flow generator 710, a duct 711, and a flow path 712 (illustrated in phantom line) defined by a passageway 713 of the duct 711. The flow generator 710 can include, without limitation, one or more fans, blowers, or other suitable components capable of generating a sufficient flow of a convection fluid (e.g., air, a refrigerant, etc.) along the flow path 712 to cool the back side of the support element 650, the slide 243, and/or items (e.g., specimens, reagents, or the like) carried on the slide 243.

The flow generator 710 can deliver the convection fluid towards an end 730 of the support element 650 located under a first end 732 of the slide 243. The convection fluid can travel vertically through a tapered section 720 that can accelerate the flow of convection fluid. The accelerated flow is directed horizontally and flows under the slide platen 601. The convection fluid can directly contact the support element 650 to facilitate and expedite cooling of the slide 243. For example, the convection fluid can flow into and along the pocket 670 to absorb thermal energy from the support element 650. The support element 650 absorbs thermal energy from the slide 243 to cool the upper surface 687 and to ultimately cool a liquid, specimen(s), or any other items or substances on the upper surface 687. The warmed fluid flows past the pocket 670 and proceeds under an end 750 of the support element 650 positioned underneath a label end 752 of the slide 243. The air flows downwardly through an outlet 760 to the surrounding environment.

The convection system 700 can be used to rapidly cool the slide 243. For example, the convection system 700 can help cool the liquid and/or specimen at a rate equal to or greater than about 2.5° C./sec. In one embodiment, the temperature of a specimen can be at about 95° C. and can be cooled to a temperature equal to or less than about 30° C. in about four minutes or less. Other cooling rates can be achieved by increasing or decreasing the flow rate of the convection fluid, temperature of the convection fluid, or the like. During a heating cycle, the convention system 700 can be OFF, if desired.

Figure 10:
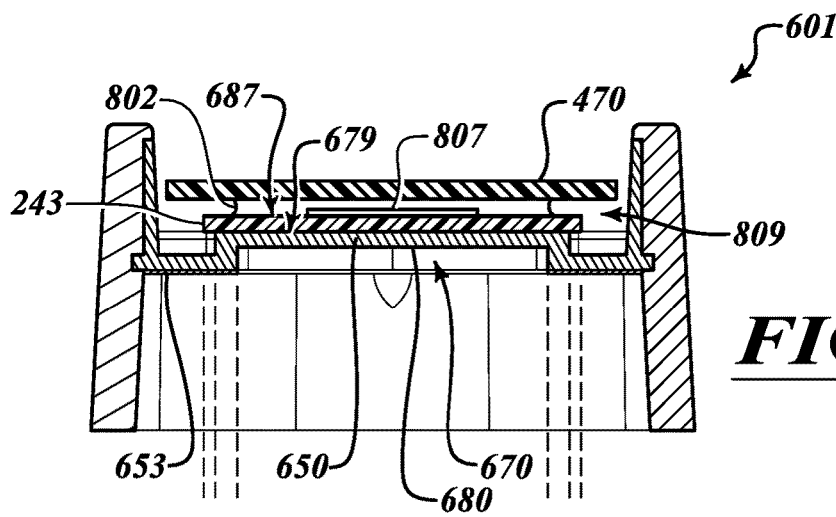
FIG. 10 is a cross-sectional view of a slide holder platen taken along a line 10-10 of FIG. 7.

FIG. 10 is a cross-sectional view of a portion of the slide holder platen 601 taken along a line 10-10 of FIG. 7. The temperature of the liquid 802 can be maintained within a target temperature range selected based on the characteristics of the liquid 802, characteristics of a specimen (e.g., a thickness of the specimen, composition of the specimen, etc.), and the process to be performed. Because the regions of the liquid 802 nearest the edges of the slide 243 evaporate more than the central region of the liquid 802, the periphery of the slide 243 and the periphery of the liquid 802 tend to be at a lower temperature without compensation. The evaporative heat losses for high temperature processes (e.g., antigen retrieval) may be greater than the evaporative losses for low temperature processes (e.g., rinsing). Because significant temperature variations along the specimen 807 and/or the liquid 802 can lead to variations in processing, the wetting module 430 can maintain a desired temperature profile of the slide 243 by compensating for evaporative heat losses, including evaporative heat losses in high temperature and low temperature processes. The wetting module 430 can produce a substantially uniform temperature profile along the surface 687 to substantially uniformly heat the band of liquid 802 and/or the specimen 807. The uniform temperature profile can be maintained independently of changes in the surrounding environment to consistently process the entire specimen 807.

Figure 10A:
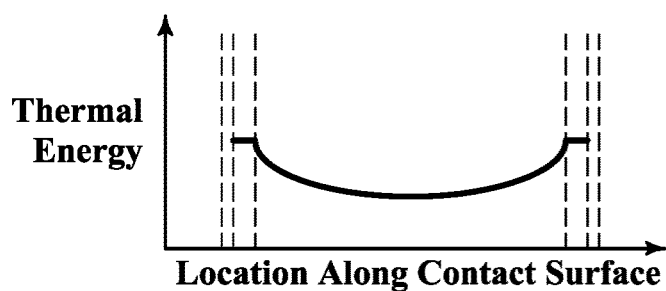
FIG. 10A is a plot of location along a contact surface of a slide support versus thermal energy conducted to a slide in accordance with an embodiment of the disclosed technology.
Figure 10B:
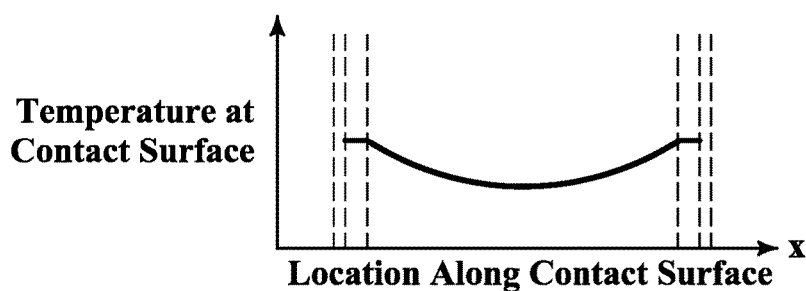
FIG. 10B is a plot of location along the contact surface of the slide support versus temperature of the contact surface in accordance with an embodiment of the disclosed technology.
Figure 10C:
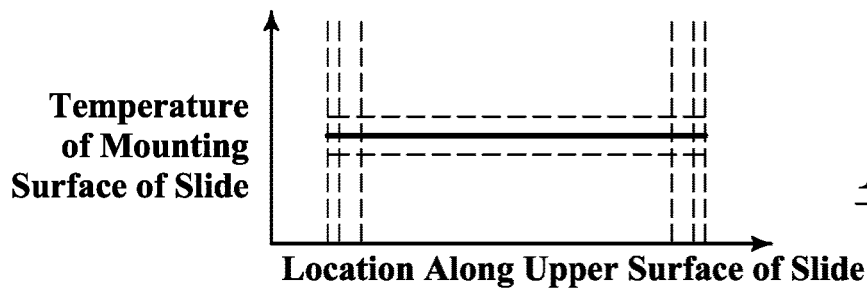
FIG. 10C is a plot of location along an upper surface of a slide versus temperature of the upper surface of the slide in accordance with an embodiment of the disclosed technology.

FIG. 10A is a plot of the location along the width of the receiving region 680 versus thermal energy conducted to the slide 243. FIG. 10B is a plot of the location along the width of the receiving region 680 versus a temperature of the contact surface 679 of the support element 650. FIG. 10C is a plot of a location along the upper surface 687 of the slide 243. A comparison of FIGS. 10B and 10C shows that the temperature profile along the contact surface 679 of the support element 650 is different from the temperature profile along the upper surface 687 of the slide 243.

Referring to FIG. 10A, the heating element 653 can non-uniformly transfer heat energy via conduction to the slide 243. The heat remains concentrated at the perimeter of the staining region where evaporative heat losses are relatively high. Because no heat energy is directly transferred via conduction to the portion of the support element 650 above the pocket 670, a non-uniform temperature profile is produced along the contact surface 679 of the support element 650 and can compensate for non-uniform heat losses associated with evaporation of the liquid 802. The compensation can produce a substantially uniform temperature profile along the upper slide surface 687. As shown in FIG. 10C, a temperature along the upper slide surface 687 can be kept within a target temperature range (represented by two horizontal dashed lines). In an embodiment for antigen retrieval, the substantially uniform temperature profile can have a temperature variation that is equal to or less than 5% of the desired temperature and can be across most of the upper slide surface 687. The upper slide surface 687 can be kept at, for example, an average temperature or target temperature of about 95° C. and within a range of about 90.25° C. and about 99.75° C. In some embodiments, the heater element 653 produces less than about a 4% temperature variation across most of the upper slide surface 687. In other embodiments, there can be less than 5% temperature variation across most of the upper slide surface 687. The upper slide surface 687 can be kept at, for example, an average temperature of about 95° C. and within a range of about 92.63° C. and about 97.38° C. In some embodiments, an allowable temperature variation can be inputted by a user.

FIG. 11 is a top view of heating zones in accordance with an embodiment of the present technology. A high heating zone 820 surrounds an intermediate heating zone 824. The intermediate heating zone 824 surrounds a low heating zone 822. Heat from the heating element 653 primarily travels upwardly to define the high heating zone 820. The high heating zone 820 can be located underneath a perimeter of a staining area of the slide 243. The low heating zone 822 can generally correspond to the pocket 670 and the central processing area (e.g., a staining area) where one or more specimens are typically positioned. The temperature of the heating zones 820, 822, 824 can be generally inversely proportional to the rates of evaporation along the slide directly above that heating zone. For example, the low heating zone 822 can be positioned generally below the middle of the band of liquid 802 in which there is substantially no evaporative losses. The high heating zone 820 is positioned generally below the periphery of the band of liquid 802 that experiences relatively high evaporative losses.

FIG. 12 is a flow chart illustrating a method 900 for heating the slide in accordance with an embodiment of the present technology. At 901, the specimen-bearing slide 243 (FIG. 3A) can be positioned on the contact surface 679 of the support element 650 (FIG. 3B). The slide 243 can be preheated by the slide holder platen 601. A liquid can be delivered onto the heated slide 243. Alternatively, the slide holder platen 601 can heat the slide 243 after delivering the liquid.

The specimen or slide processing apparatus, in some embodiments, includes one or more dispensers or onboard dispensing means (e.g. actuators) positioned to deliver a supplemental liquid between the opposable element (e.g. opposable 100) and the slide while a liquid is held in the gap there between. Additionally, the slide processing apparatus can include a controller communicatively coupled to the dispenser(s) or onboard dispensing means and programmed to command the dispenser or onboard dispensing means such that the dispenser or onboard dispensing means delivers the supplemental liquid (such as from the reagent chambers) to keep or maintain a volume of liquid between the opposable element and the slide within an equilibrium volume range.

At 902, the opposable 470 (including those opposables incorporating onboard reagents) is used to manipulate the liquid and can mitigate and control evaporation, which in turn can affect temperature, concentration, and capillary volume. In some embodiments, the liquid is allowed to evaporate, resulting in heat losses and, in some embodiments, changes in concentration of the liquid 802. A dispenser can deliver supplemental liquid at desired times to keep the volume of the liquid in a desired range, maintain a desired concentration of the liquid, or the like. Likewise, in embodiments where an opposable incorporating onboard reagents is utilized, additional reagent, liquid, or fluid may be dispensed from the reagent chambers of the opposable to maintain the desired volume or concentrate of liquid. If the current volume of the liquid is lower than the target equilibrium volume, the controller can instruct the dispenser (or, for opposables incorporating onboard reagents, the onboard dispensing means, respectively) to deliver liquid until the current volume of the liquid reaches the equilibrium volume. If the current volume of the liquid is higher than the target equilibrium volume, the controller can instruct the dispenser (or, for opposables incorporating onboard reagents, the onboard dispensing means, respectively) to stop delivering liquid until the current volume of the liquid reaches the equilibrium volume. Once the liquid reaches the target equilibrium volume, the controller can instruct the dispenser (or, for opposables incorporating onboard reagents, the onboard dispensing means, respectively) to provide the supplemental fluid to the liquid at a desired rate (e.g., a fixed rate or a variable rate; or, in embodiments where an opposable incorporating onboard reagents is used, the contents of any one or more reagent chambers having predetermined volumes of reagent, liquid, or fluid), so as to maintain the liquid at the equilibrium volume. The delivery rate can be selected based on the evaporation rate of the liquid.

At 903, the contact surface 679 can have a non-uniform temperature profile such that the upper surface 687 of the slide 243 has a temperature profile that is more uniform than the non-uniform profile of the contact surface 679. Substantially the entire mounting area of the slide 243 can have a substantially uniform profile. This ensures that any portion of a specimen contacting the mounting surface is maintained at a generally uniform temperature for consistent processing. Even if specimens move slightly along the mounting surface, the specimens can be consistently processed.

At 904, heat losses associated with evaporation of the liquid 802 can be compensated for by producing the non-uniform temperature profile along the contact surface 679. The support element 650 and the heating sidewalls 682 can be used to control the temperature of the slide 243.

Fluid manipulated repeatedly across the staining surface results in fluid mixing between different regions within the body of fluid in contact with the slide surface in the sense of both mass as well as thermal energy mixing. Temperature uniformity control across the surface of the slide, therefore, is influenced by the interaction of 1) the conducting heating element under the slide, 2) thermal mixing resulting from fluid manipulation, and 3) evaporative heat loss with respect to the ambient environment. Fluid manipulation is controlled by such factors as manipulation speed and distance with respect to specified volumes. The thermal profile of the conducting element under the slide therefore must be designed appropriately for optimal on-slide temperature uniformity with respect to fluid manipulation factors.

FIG. 13 shows the slide holder platen 601, a dispenser assembly 633, and a controller 144 of an evaporation moderated specimen process station. The dispenser assembly 633 includes a fluid source 621 fluidically coupled to a dispenser 622 via a fluid line 623. The fluid source 621 can include, without limitation, one or more containers (e.g., a container taken from a parking or holding station, a container taken from a parking or holding station, etc.), reservoirs, or other suitable fluid sources (e.g., a bulk reagent reservoir) and can include one more valves, pumps, or the like. The dispenser 622 can output liquid via an array of conduits 625. In some embodiments, including the illustrated embodiment of FIG. 13, the dispenser 622 includes eight conduits 625, but any number of conduits can be used. Additionally, the dispenser assembly 633 can include more than one dispenser depending on the design of the slide holder platen 601. Additionally, or alternatively, dispensers can deliver liquid onto the slides and can be fluidly coupled to the fluid source 621 or another fluid source. The opposable 470 can be positioned to allow one or both of the dispensers 160, 162 to deliver a liquid onto the slide. In some embodiments, the dispenser 622 delivers a bulk liquid from the containers at the parking station 142 and the dispensers 160, 162 deliver liquid from containers at the parking station 140.

In some embodiments, such as where an opposable incorporating onboard reagents is utilized, the dispenser 622 may be eliminated. In its place, an actuator, incorporating onboard reagent dispensing means, may be positioned above the opposable such that the actuator may act upon any plunger positioned within a cavity of the opposable (namely, a top surface 10C), i.e. the actuator may actuate the plungers contained within the cavities, and as described further herein, moving them from a "stored" position to a "deployed" position, such that the plungers may pierce one or more seals of any reagent chambers housed within the cavities. Alternatively, an actuator may be positioned above the opposable, and the actuator itself may house one or more plungers or syringes, i.e. the plungers or syringes are housed externally to the opposable incorporating onboard reagents. In this manner, the actuator may actuate the external plunger or syringe, and cause the external plunger or syringe to enter a cavity, and pierce one or more seals of any reagent chambers housed within the cavity. In some embodiments, an actuator positioned above the opposable incorporating onboard reagents may comprise a system whereby a jet of air or another fluid (e.g. compressed air or a compressed fluid) is directed into a cavity, where the jet of air or fluid acts to pierce one or more seals of any reagent chamber housed in the cavity.

The controller 144 is capable of controlling an array of specimen processing stations and/or the onboard reagent dispensing means to maintain a volume of a processing liquid within an equilibrium volume range. If the volume of the liquid is above the equilibrium volume range, the liquid can evaporate at a relatively high rate and may significantly change the concentration of the liquid. If the volume of the liquid is below the equilibrium volume range, there may be an insufficient volume of liquid to adequately process the specimen. Additionally, an insufficient volume of liquid can result in an undesirably low amount of liquid agitation during processing. The equilibrium volume range can be selected based on the composition of the liquid, desired processing temperature, or desired agitation of the liquid 802. An equilibrium volume of the liquid 802 can correspond to a fluid volume (at a certain temperature or range of temperatures) that provides full coverage of the specimen while keeping evaporative losses below a target level. The dispenser 622 or other onboard reagent dispensing means (coupled with the onboard reagent), in the case of opposables incorporating onboard reagents, may function as a replenishment device that periodically supplements the liquid at a fixed rate (e.g., a rate based on the evaporation rate) to keep the volume of the liquid within the equilibrium volume range, replenish depleted reagent, or the like.

With the target processing temperature or target processing temperature range and a total evaporation rate, the controller 144 can determine a target range of equilibrium volumes. In some embodiments, the controller 144 can receive the total evaporation rate information from a memory 629 and/or an input device 628. The input device 628 can include a data server or other similar device that can provide information from a database upon request or periodically. The total evaporation rate information can be obtained from an empirical study and stored in the database. In other embodiments, the input device 628 can be a reader that obtains information (e.g., a target processing temperature, a target processing temperature range, replenishing rate, etc.) from a label of a slide.

The controller 144 can receive information (e.g., look-up tables, temperature set points, duty cycles, power settings, environmental information such as ambient temperatures and/or humidity, processing protocols, etc.) from the memory 629. The input device 628 can be a manual input device (e.g., a keyboard, a touch screen, or the like) or an automated input device (e.g., a computer, a data storage device, servers, network, etc.) that can provide information automatically upon request from the controller 144. The memory 629 can store different instructions for different processes. One stored sequence of program instructions can be used to contact the specimen 807 with a wash and another sequence of program instructions can be used to apply a reagent (e.g., a stain) to the specimen. The controller 144 can include a programmable processor 631 that executes the sequence of program instructions in order to sequentially process the specimen with the wash and reagent. The slide holder platen 601 can heat the slide to a first target temperature when executing the first sequence of program instructions and can cool the slide to a second target temperature when executing the second sequence of program instructions. Any number of sequences of program instructions can be executed to perform different stages of a protocol.

The controller 144 can also be programmed to control the wetting module 430 such that the dispenser 622 delivers the supplemental liquid onto the slide. The rate of fluid delivery can be based on, for example, processing information (e.g., protocol, agitation information, processing time(s), etc.), total evaporation rate information (e.g., evaporation rates under certain conditions, the actual evaporation rate for a certain type of liquid, etc.), or the like. The current volume of the liquid can be determined based on an initial volume of liquid on the slide and stored evaporation rate(s). The stored evaporation rates can be input into the system 100 or determined by the system 100. The controller 144 can calculate the equilibrium volume in advance (e.g., a pilot run), and the system 100 can use the determined equilibrium volume as the initial volume for the same kind of liquids. Then the controller 144 can instruct the dispenser 622 to provide the supplemental liquid at a rate (e.g., a rate determined by the pilot run). The rolling direction, the rolling speed, and the rolling frequency can be adjusted depending on the type of liquids. The rolling speed can have a direct impact on the total evaporation rate. A faster rolling speed can lead to higher evaporation rates. When collecting empirical total evaporation volume information to generate protocols, this can be a factor that is considered.

A power source 627 of the controller 144 can be electrically coupled to a heating element (e.g., heating element 653 of FIGS. 6A and 6B). The power source 627 can be one or more batteries, fuel cells, or the like. The power source 627 can also deliver electrical energy to other components of the system. In other embodiments, the power source 627 can be an AC power supply.

Figure 14:
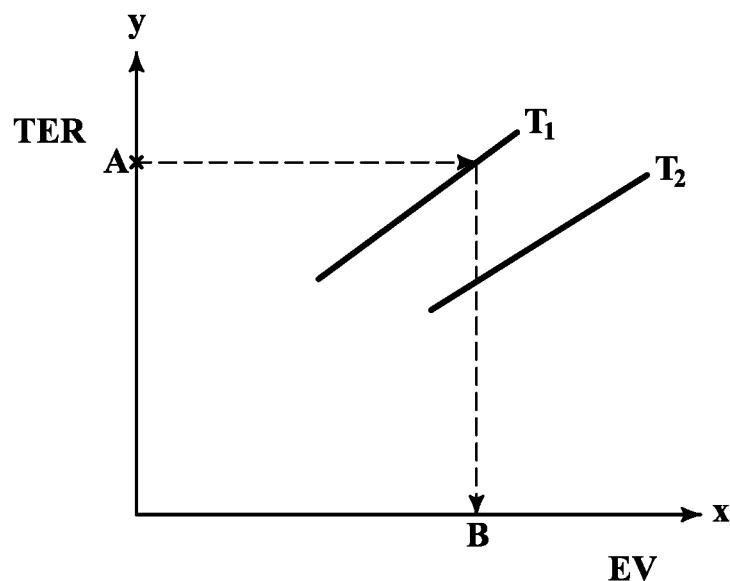
FIG. 14 is a plot of equilibrium volume of a liquid on a slide versus total evaporation rate of the liquid in accordance with an embodiment of the disclosed technology.

FIG. 14 is a plot of equilibrium volume versus total evaporation rate of a processing liquid in accordance with an embodiment of the present technology. The x-axis represents the equilibrium volume (EV, unit: µL), and the y-axis represents the total evaporation rate (TER, unit: µL/s). Lines T1 and T2 represent the relationships between the TER and the EV at temperature T1 and temperature T2, respectively. In the illustrated embodiment, T1 is higher than T2. The controller 144 can receive the total evaporation rate information from the memory 629, the input device 628, or the like. The total evaporation rate information can be measured and stored in the memory 629. The total evaporation rate information can include evaporation rates for liquids at different concentrations. After the controller 144 receives the predetermined temperature (e.g., T1) and the total evaporation rate information (e.g., "A" μL/s), the controller 144 can determine the EV value (e.g., "B" μL) of the liquid based on the graph of FIG. 14. Equation 1 corresponds to the relationships described in FIG. 14. The slope of the lines T1 and T2 represent the temperature-dependent evaporation constant (K) below.

$$TER = K \times EV \qquad \text{Equation 1}$$

Once the equilibrium volume of the liquid is determined, the controller 144 can compare it with an estimated volume of the slide and can instruct the dispenser 622 to supply supplemental fluid if needed. If the current volume of the liquid is lower than the target equilibrium volume, the controller 144 can instruct the dispenser 622 to provide more supplemental liquid.

Figure 15:
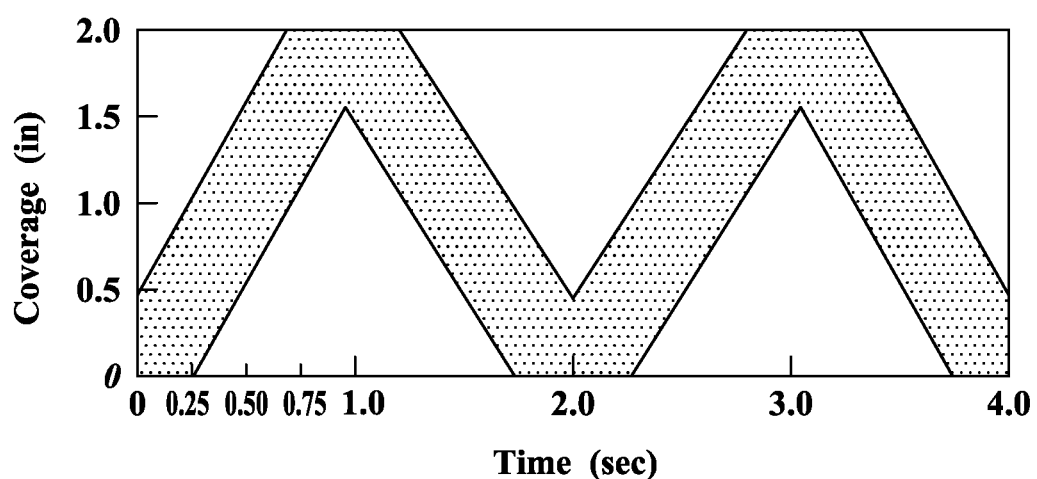
FIG. 15 is a plot of time versus liquid coverage in accordance with an embodiment of the disclosed technology.

FIG. 15 is a plot of time versus coverage of a slide in accordance with an embodiment of the disclosed technology. FIGS. 16A-20B illustrate one method of achieving the coverage depicted in FIG. 15 by moving the liquid 802 along the entire staining area 671 (excluding a label 907 and some margin, if desired) to provide full coverage by being alternatingly moved between opposing ends 732, 735 of the mounting area 671. The full coverage can help minimize, limit, or substantially prevent problems associated with under-wetting and over-wetting. In under-wetting, the liquid 802 contacts less than the entire staining area 671 such that the specimen 807 may be at risk of not being contacted and thus not being treated/stained. In over-wetting, the liquid 802 contacts more than the entire staining area 671 and may tend to drain from the slide 243. The liquid 802 may be at risk of ineffective liquid removal in subsequent processes, resulting in reagent carryover and associated stain quality degradation. If the liquid 802 is a stain, the entire specimen 807 is contacted for consistent (e.g., uniform) staining. If the liquid 802 is a wash, full coverage ensures that the entire specimen 807 is thoroughly washed, especially after a reagent treatment. Different stages of the method are discussed in detail below.

FIGS. 16A and 16B are side and top views of the band of liquid 802 between the opposable 810 held by the opposable actuator (not shown) and the mounting area end 732 at time 0 in FIG. 15. The opposable 810 and slide 243 form a band of liquid 802 (e.g., a fluidic layer, a thin film, or the like). The band of liquid 802 of FIG. 16B is shown in phantom line. A gap 930 (e.g., a capillary gap) can have a minimum holding capacity of about 30 microliters to about 350 microliters. Other minimum and maximum holding capacities are possible, if needed or desired and are dependent upon the gap height, opposable radius, fluid properties, and movement speed. The minimum holding capacity can be the smallest volume of liquid that can be contained in the gap 930 and effectively applied to the specimen 807, which may be located anywhere on the staining area 671. The maximum holding capacity is the largest volume of liquid that can be contained in the gap 930 without loss of fluid control, e.g., spilling of fluid over the side edge or outside of the fluid target areas. The varying height gap 930 can accommodate a wider range of liquid volumes than a uniform height gap because the narrowed region of the gap 930 can accommodate a small liquid volume.

The opposable 810 is rolled along the slide 243 to displace the band of liquid 802 (indicated by an arrow 961) in the direction of a longitudinal axis 951 of the slide 243. In FIGS. 17A and 17B, the band of liquid 802 has been spread by moving a side 958 of the band of liquid 802 in the direction of the longitudinal axis 951 (corresponding to 0.25 seconds in FIG. 15). A side 956 of the band of liquid 802 can remain at an edge 960 of the slide 243. In some embodiments, the band of liquid 802 can be spread from a narrowed width $W_{N1}$ (FIG. 16B) to a spread width $W_S$.

The widths $W_{N1}$, $W_S$ can be substantially parallel to the longitudinal axis 951 of the slide 243, and the length L of the band of liquid 802 can be substantially perpendicular to the longitudinal axis 951.

FIGS. 18A and 18B show the band of liquid 802 after it has moved along the slide 243, corresponding to 0.5 second in FIG. 15. The band of liquid 802 is displaced using capillary action. Capillary action can include, without limitation, movement of the band of liquid 802 due to the phenomenon of the liquid spontaneously creeping through the gap 930 due to adhesive forces, cohesive forces, and/or surface tension. In some embodiments, the width $W_S$ can be generally maintained while displacing the band of liquid 802. In other embodiments, the width $W_S$ may be increased or decreased less than 5% while moving the band of liquid 802. In some embodiments, the opposable 810 can have a non-uniform curvature or configuration to have a variable width $W_S$ as the band moves across the slide.

FIGS. 19A and 19B show the band of liquid 802 positioned at the end 735, corresponding to 0.75 second in FIG. 15. The side 958 of the band of liquid 802 can be captivated between an end 952 of the opposable 810 and the end 735 of the mounting area 671. The label 907 can help captivate the liquid 802. For example, the label 907 can be made, in whole or in part, of a hydrophobic material. As the opposable 810 moves to an over-rolled position of FIG. 20A, the width $W_S$ of the band of liquid 802 can be decreased to a narrowed width $W_{N2}$, corresponding to 1 second in FIG. 15. The width of the band of liquid 802 can be reduced while captivating substantially all of the liquid 802 at an end 970 of the gap 930. For example, at least 90% by volume of the liquid 802 can remain captivated. In some embodiments, at least 95% by volume of the liquid 802 can remain captivated. In yet further embodiments, substantially all of the liquid 802 can remain captivated as the width of the band of liquid 802 is decreased.

The compressed width $W_{N2}$ can be substantially less than the width $W_S$ such that the entire narrowed band of liquid 802 is spaced apart from the specimen 807. In some embodiments, the narrowed width $W_{N2}$ can be equal to or less than about 50%, 25%, or 10% of the width $W_S$. Such embodiments may be especially well suited to process slides carrying one or more specimens. A relatively large area of the staining area 671 is uncovered by the narrowed band while preventing wicking or escape of the liquid. In some embodiments, the width $W_{N2}$ can be equal to or less than about 40%, 30%, or 20% of the width $W_S$. The width $W_{N1}$ can be generally equal to the width $W_{N2}$. Advantageously, the opposable actuator 525 can be operated to increase or decrease to provide variable narrowing of the band of liquid 802.

The opposable 810 of FIGS. 20A and 20B can be rolled back across the slide 243 to move the band of liquid 802 to the position shown in FIG. 16A. The opposable 810 can be rolled back and forth any number of times at a variable rate or constant rate to move the liquid 802 back and forth across the slide 243. If the liquid 802 is a washing liquid, the washing liquid can be rapidly passed back and forth across the specimen 807 to provide thorough washing. If the liquid 802 is a stain, the band of liquid 802 can be passed back and forth across the specimen 807 to provide uniform staining across an entire width $W_{spec}$ (measured in a direction parallel to the longitudinal axis 951 of the slide 243) of the specimen 807. One or more wash cycles can be performed between staining cycles. On-slide mixing can also be performed, if needed or desired.

Processing protocols may require different rolling speeds and different liquid volumes in order to meet various processing criteria (e.g., chemical requirements, uptake requirements, solubility limitations, viscosity, or the like). If the specimen 807 is a paraffin embedded specimen, a relatively small volume of de-waxing solution (e.g., 12 microliters of xylene) can be delivered into the gap 930. The opposable 810 can be rolled (e.g., rolled along an imaginary plane spaced apart from the upper surface of the slide 243, rolled along the upper surface, rolled sideways, rolled longitudinally, or the like) or otherwise manipulated (e.g., rotated, translated, or both) to apply the liquid 802. After dewaxing, a relatively large volume of reagent can be delivered into the gap 930. For example, a volume of about 50 microliters to about 500 microliters of stain can be delivered into the gap 930. The stain is delivered to the specimen 807 and then subsequently removed.

The method shown in FIGS. 16A-20B can be used to perform assay steps (e.g., antibody and chromogen assays). The assay steps can be performed at relatively low temperatures. The slide holder platen 601 can keep the specimen and/or processing liquid at a temperature in a range of about 35° C. to about 40° C. In one embodiment, the liquid and/or specimen is kept at a temperature of about 37° C. The dispenser (e.g., dispenser 622 of FIG. 13) or other onboard reagent dispensing means for opposables incorporating onboard reagents can deliver supplemental liquid to maintain a target volume of about 30 to about 350 microliters. In some protocols, the dispenser delivers supplemental liquid at a rate of about 4 to about 5.1 microliters per minute to about 5.6 microliters per minute. In such embodiments, the volume of the liquid (e.g., liquid 802 of FIG. 10) can be kept in a range of about 90 microliters to about 175 microliters over about a 15 minute period based on a relative humidity of about 10%-90%, an ambient temperature of about 15° C. to about 32° C., with an average slide temperature tolerance of about ±1° C., and an opposable rolling speed of about 25 to 60 millimeters per second. The evaporation rate may be generally proportional to the rolling speed. If the rolling speed is about 20 millimeters per second, a replenish rate of about 3.8 microliters per minute to about 4.2 microliters per minute can maintain a volume of about 115 microliters to about 200 microliters. If the rolling speed is about 40 millimeters per second, a replenish rate of about 5.1 microliters per minute to about 5.6 microliters per minute can maintain a volume of the liquid 802 of about 115 microliters to about 200 microliters. At a high rolling speed of about 90 millimeters per second, the replenish rate can be about 7.6 microliters per minute to about 8.4 microliters per minute to maintain a volume of about 110 microliters to about 200 microliters. Higher speed may be possible but are dependent upon the gap height, opposable radius, and fluid properties. Humidity and ambient temperatures can impact evaporation rates at low temperatures but may not have a significant impact at elevated temperatures of, for example, temperatures greater than 72° C. In some embodiments, the capillary gap can be effectively used for 300 microliter slide volumes with minimum rolls per minute for full coverage and with minimal replenishment.

For targeted retrieval, the rolling speed can be about 100 millimeters per second and the replenish rate can be 72 microliters per minute. For antigen retrieval, the rolling speed can be about 180 millimeters per second and the replenish rate can be about 105 microliters per minute. Other replenish rates can be selected based on the processing conditions.

As discussed above, opposables or opposable elements can be moved relative to a stationary slide to manipulate a fluid. In other embodiments, a slide is moved relative to a stationary opposable element to manipulate a fluid. In yet other embodiments, both a slide and an opposable element are moved to manipulate a fluid. The opposable 100 (FIG. 39C), 810 (FIGS. 16A and 16B) and opposable 2012 (FIG. 28) are a non-limiting exemplary opposable elements and are discussed in detail in connection with FIGS. 21-42.

FIGS. 21-34 shows one embodiment of the opposable 810. The skilled artisan will appreciate that the features referred to for opposable 810 in FIGS. 21-34 can be applied equally to the opposable 100 featured in FIGS. 33B or FIGS. 39-42, i.e. an opposable including on-board reagents. The opposable 810 can include a body 1459, a port 1374, and a slot 1356. The body 1459 includes a first row of gapping elements 1450, a second row of gapping elements 1452, and a specimen processing region 1453. When the specimen processing region 1453 faces a slide and interfaces with or engages a liquid, the liquid can be removed via the port 1374. The slot 1356 can receive a feature of an opposable actuator. The body 1459 can also include keying features 1362, 1364 (e.g., holes, protrusions, etc.) used to align the opposable 810. The illustrated features 1362, 1364 are holes.

FIG. 21 shows the specimen processing region 1453 between the two rows of gapping elements 1450, 1452. The opposable 810 (or opposable 100 of FIG. 39C) has edges 1454, 1456 that can be dimensioned with respect to the slide to provide the desired processing region 1453 (e.g., the entire surface 1460 of the opposable 810, most of the upper surface 1460 of the opposable 810, the region between the gapping elements 1450, 1452, or the like).

FIG. 22 shows en exemplary band of liquid 802 (illustrated in phantom line) positioned between the gapping elements 1450, 1452. The band of liquid 802 can move along the length of the opposable 810 (or opposable 100 of FIG. 39C) without contacting the gapping elements 1450, 1452. The band of liquid 802 can be displaced without accumulation of liquid about any of the gapping elements 1450, 1452.

The gapping elements 1450, 1452 can help process a specimen with a desired amount of fluid (e.g., a minimal amount of fluid). The gapping elements 1450, 1452 can also be spaced apart from one another to reduce, limit, or substantially prevent wicking between adjacent elements. If the liquid 802 reaches one of the gapping elements 1450, 1452, the liquid 802 can reside at the contact interface between that gapping element and the slide without flowing to an adjacent gapping element. The gapping elements 1450, 1452 are spaced apart from the edges 1454, 1456 of the opposable 810 to keep the liquid proximate to the processing region 1453. Additionally, the liquid 802 is kept far enough away from the edges 1454, 1456 to prevent wicking out from underneath the opposable 810 even if another object contacts the edges 1454, 1456.

Figure 39B:
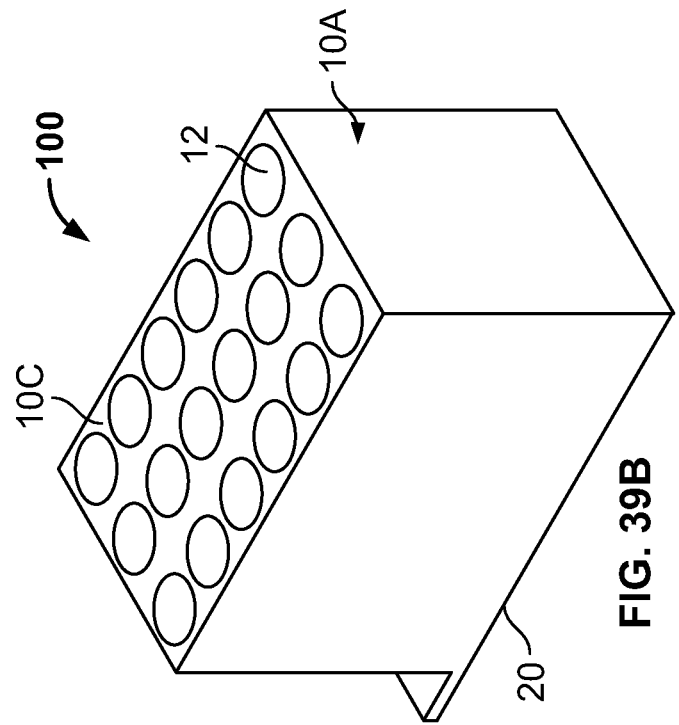
FIGS. 39A, 39B, and 39C provide various views of an opposable incorporating onboard reagents.
Figure 39A:
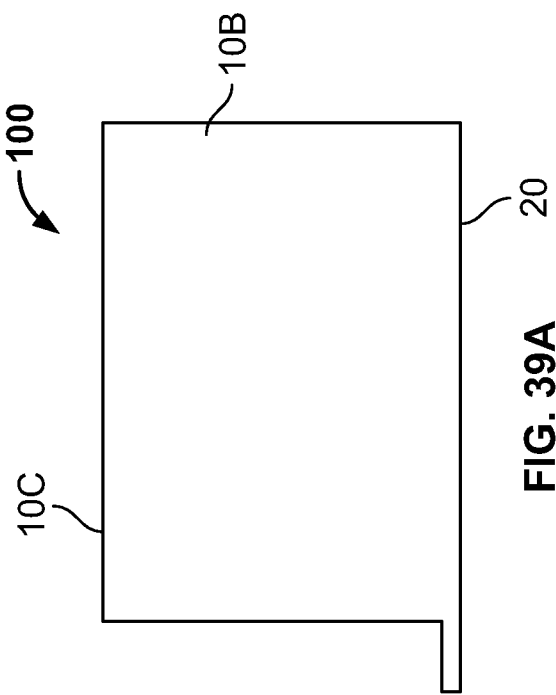
Figure 39C:
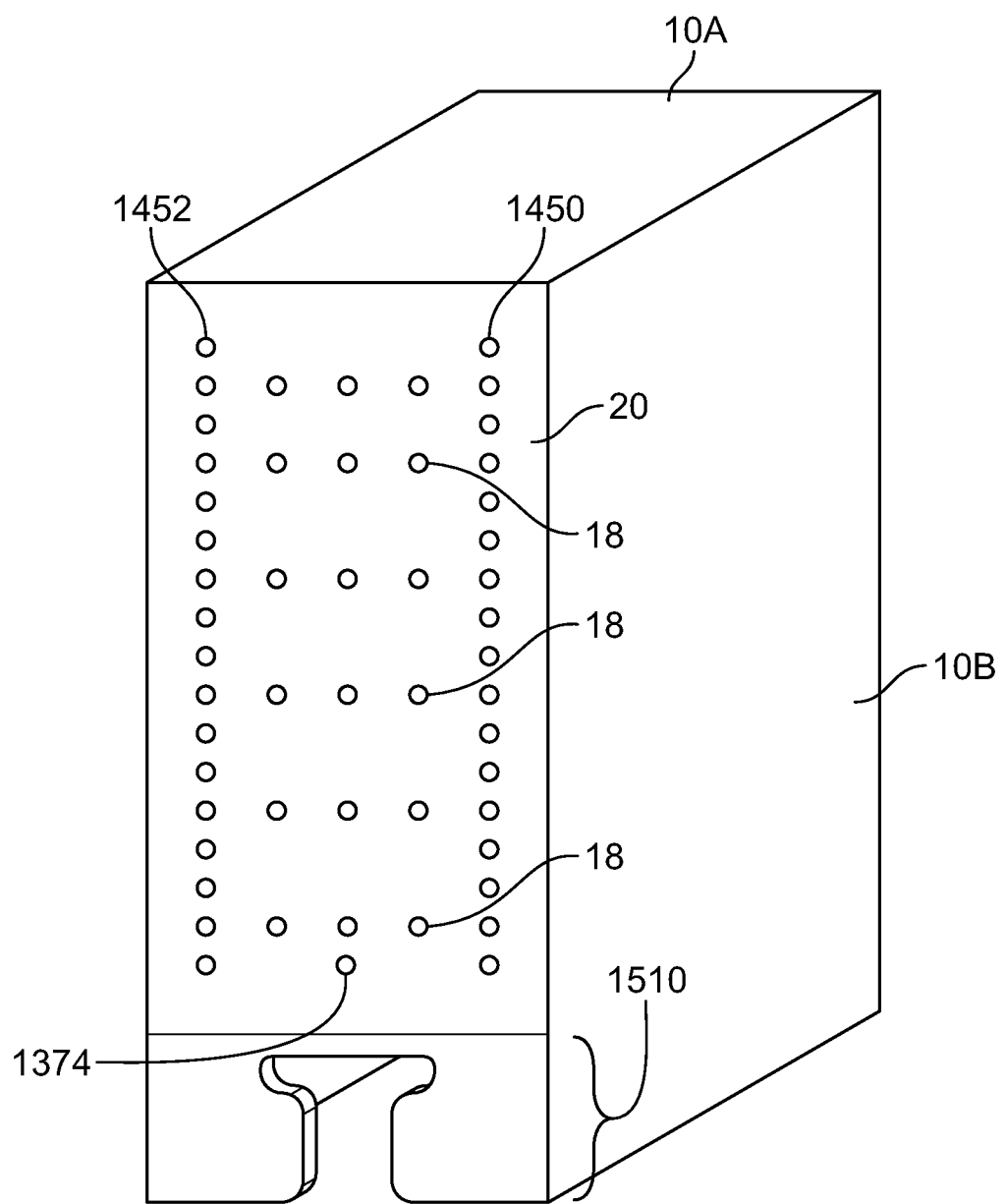

The rows of gapping elements 1450, 1452 extend longitudinally along a length of the opposable 810 (see also, FIG. 39C which depicts gapping elements 1450, 1452 with reference to opposable 100). Opposing gapping elements of each row of gapping elements 1450, 1452 are generally laterally aligned such that a slide can contact laterally aligned gapping elements 1450, 1452. As the opposable 810 (or 100 of FIG. 39C) is moved along the slide, the slide is successively brought into contact with laterally aligned gapping elements 1450, 1452.

Each of the rows of gapping elements 1450, 1452 can be generally similar to one another. Accordingly, the description of one of the rows of gapping elements 1450, 1452 applies equally to the other, unless indicated otherwise. The row of gapping elements 1450 can include about 5 gapping elements to about 60 gapping elements with an average distance between adjacent gapping elements in a range of about 0.05 inch (1.27 mm) to about 0.6 inch (15.24 mm). In some embodiments, including the illustrated embodiment of FIGS. 21 and 22, the row of gapping elements 1450 includes 19 gapping elements that protrude outwardly from the entire surface 1460. In other embodiments, the row of gapping elements 1450 includes about 10 gapping elements to about 40 gapping elements. As viewed from above (see FIG. 22), the row of gapping elements 1450 has a generally linear configuration. In other embodiments, the row of gapping elements 1450 has a zigzag configuration, serpentine configuration, or any other configuration or pattern.

The gapping elements 1450 can be evenly or unevenly spaced from one another. The distance between adjacent gapping elements 1450 can be greater than the heights of the gapping elements 1450 and/or less than a thickness T (FIG. 24) of the body 1459 of the opposable 810. Other spacing arrangements are also possible, if needed or desired. In some embodiments, the thickness T is about 0.08 inch (2 mm). A width W between the edges 1454, 1456 can be in a range of about 0.6 inch (15.24 mm) to about 1.5 inch (38 mm). In some embodiments, the width W is about 1.2 inches (30 mm) and the edges 1454, 1456 can be substantially parallel. Other widths are also possible.

Referring to FIG. 22, a distance D between the rows 1450, 1452 can be selected based on the dimensions of the specimen and the dimensions of the slide. In some embodiments, the distance D is in a range of about 0.25 inch (6.35 mm) to about 1 inch (25 mm). If the slide is a standard microscope slide, the distance D can be less than about 0.5 inch (12.7 mm).

FIG. 24 shows one of the gapping elements 1450. The height H of the gapping element 1450 can be selected based on the ability to manipulate fluid. The gapping element 1450 can have a height H equal to or less than about 0.0015 inch (0.038 mm) if the specimen is a tissue section with a thickness that is less than about 0.0015 inch (0.038 mm). The minimum height of the capillary gap (e.g., gap 930 of FIGS. 16A-16B) can be equal to 0.0015 inch (0.038 mm) if the gapping elements 1450 contact the slide. In some embodiments, the height H is in a range of about 0.001 inch (0.025 mm) to about 0.005 inch (0.127 mm). In certain embodiments, the height H is about 0.003 inch (0.076 mm) (e.g., 0.003 inch±0.0005 inch) to process thin tissue sections with a thickness less than about 30 microns, 20 microns, or 10 microns.

The pattern, number, dimensions, and configurations of the gapping elements 1450, 1452 can be selected based on the desired interaction between the specimen and the liquid. If the opposable 810 includes a field of gapping elements, the gapping elements can be distributed evenly or unevenly across the opposable 810 (or opposable 100 of FIG. 39C) to form different patterns that may include, without limitation, one or more rows, arrays, geometric shapes, or the like.

The gapping element 1450 can be a partially spherical dimple, partially elliptical dimple, or the like. The illustrated gapping element 1450 is a substantially partially spherical dimple. If the specimen is sufficiently large or moves towards one side of the slide, the gapping element 1450 in the form of a dimple can slide over the specimen without damaging or dislodging the specimen to the slide. In other embodiments, the gapping element 1450 can be in the form of a polyhedron protrusion, a conical protrusion, a frusto-conical protrusion, or another combination of polygonal and arcuate shapes.

The body 1459 of FIG. 23 is in the shape of a simple arc with a radius of curvature R in a range of about 2 inches (5 cm) to about 30 inches (76 cm). In some embodiments, the radius of curvature R is about 15 inches (38 cm) or about 20 inches (74 cm). The nominal radius of the profile deviation can be equal to or less than about 0.1 inch. The actual radius of the profile can deviate less than about 0.01 inch. Such embodiments are well suited to produce a liquid band having a generally rectangular shape, as viewed from above, and also spanning the width of the slide and, for a particular volume, having a low variance in length along the slide. The radius of curvature R can be selected based on the number of specimens to be processed, the amount of fluid agitation, the properties of the processing liquids, the height of gapping elements 1450, 1452, and the like. In other embodiments, the opposable 810 is in the shape of a complex arc (e.g., an elliptical arc), a compound arc, or the like. In yet other embodiments, the opposable 810 can be substantially planar. The surface across the width W can be generally straight.

FIGS. 39-42 illustrate alternative embodiments of an opposable 100. In some embodiments, an opposable of the present disclosure includes or incorporates one or more onboard reagents. For example, and as described more fully herein, the opposable may comprise one or more reagents pre-loaded into cavities or reagent chambers within the body of the opposable. As will be appreciated by those of ordinary skill in the art, such an opposable including one or more pre-loaded reagents may allow for processing of specimens with increased through-put and/or efficiency (simply because reagents can be directly dispensed from the opposable, rather than having to introduce reagents from an external source, such as dispenser 622 or wetting module). In addition, specimen-processing systems utilizing such opposables may mitigate, reduce, or prevent cross-contamination as compared with specimen-processing systems which utilize stand-alone opposables where reagents and/or fluids are introduced from an external source, such as a dispenser 622. Moreover, it is believed that by incorporating on-board reagents within the opposable itself, any specimen-processing system utilizing such an opposable would require less mechanical components, e.g. dispenser 622, pipettes, wetting modules, or other fluid delivery means could be eliminated, and thus the complexity, costs, and control over such device could be reduced, as compared with systems that utilize standard opposables.

In some embodiments, the opposable 100 includes a body or housing having a first wall 10A defining the width of the opposable 100; and a second wall 10B defining the length of the opposable 100. In some embodiments, such as those depicted in FIGS. 39A and 40A, the surface 20 of the opposable is substantially planar and parallel to a top surface 10C of the opposable.

Alternatively, and while not depicted, the skilled artisan will appreciate that the fluid-manipulation surface 20 of the opposable may have a curved shape or an arcuate shape. In embodiments where the fluid-manipulation surface 20 is curved or arcuate, the skilled artisan will appreciate that the top surface 10C of the opposable may also have a curved or arcuate shape that is planar (such as in FIG. 39A), or one that substantially matches the curved arcuate shape of the fluid-manipulation surface 20.

With reference to FIG. 39A, the fluid-manipulation surface 20 of the opposable, like the other opposables described herein, may be the same size as, larger, or smaller than any slide used in specimen processing. Indeed, the fluid-manipulation surface 20 may be smaller or larger than the slide in any dimension. In some embodiments, the surface area of the fluid-manipulation surface 20 is larger than the surface area of a slide used in specimen processing.

In some embodiments, the opposable 100 comprises a plurality of cavities 12. The cavities 12 may have any size and/or shape. For example, as depicted in FIG. 33B, the cavities may have a circular shape or circular opening. In yet other embodiments, the cavities have an oval shape or opening, a square shape or opening, a rectangular shape or opening, a polygonal shape or opening, or a triangular shape or opening. In other embodiments, the cavities 12 may be spherical, but have a circular opening. In other embodiments, the cavities may be cylindrical with a circular opening. Of course, the skilled artisan will appreciate that the opposable 100 may have some cavities having a first size and/or shape and other cavities having a different size and/or shape, or any combination thereof.

The opposable 100 may contain any number of cavities 12 in any arrangement. For example, and as depicted in FIG. 39B, the cavities 12 may be arranged in parallel rows (e.g. 2, 3, 4, or more rows of cavities). In some embodiments, such as depicted in FIG. 39B, there may be an equal number of cavities 12 in each of the parallel rows of cavities. Alternatively, each row may contain a different number of cavities (not depicted). In some embodiments, the cavities 12 may be present in a staggered arrangement. In some embodiments, the opposable 100 comprises between about 4 and about 60 cavities. In some embodiments, the opposable 100 comprises between about 4 and about 30 cavities. In some embodiments, the opposable 100 comprises between about 4 and about 25 cavities. In other embodiments, the opposable 100 comprises between about 6 and about 27 cavities. In yet other embodiments, the opposable 100 comprises between about 6 and about 12 cavities. In yet further embodiments, the opposable 100 comprises about 10 cavities. Of course, the skilled artisan will recognize that the spacing, arrangement, configuration, and selection of cavities 12 is variable and depends, for example, on the size of the opposable 100, the slide used in conjunction therewith, and any resulting capillary space. Moreover, any configuration may also be dependent upon the chemical characteristics of the reagents, liquids, or fluids intended to be dispensed from the opposable 100 and the particular assay in which the opposable 100 is being used. The skilled artisan will also recognize that an opposable 100 incorporating such cavities may be produced by any technique commonly used in the art including molding to form an opposable including the desired number of cavities 12, or by machining or milling a solid opposable to form the desired number of cavities 12.

As depicted in FIG. 39C, the fluid-manipulating surface 20 of the opposable 100 comprises spacers or gapping elements 1450, 1452 positioned along the edges or periphery of opposable 100 (see, e.g. FIGS. 21 to 28). The spacers or gapping elements 1450, 1452 may have any configuration, size, and/or shape, such as those described herein. The fluid manipulating surface 20 further comprises a series of fluidic openings 18 which are in fluidic communication with interior compartments 17 of reagent chambers 16, as described further below. It is through the fluidic openings 18 that reagents, liquids, or fluids are allowed to flow from the interior compartments 17 of the reagent chambers 16 to the fluid-manipulating surface 20 or fluid-carrying gap between the opposable and slide.

Each interior compartment 17 (or cavity 12) may have one or more fluidic openings 18 in communication therewith. In some embodiments, each interior compartment 17 (or cavity 12) has only a single fluidic opening in communication therewith. The skilled artisan will recognize that the fluidic openings 18 will be arranged according to the arrangement of cavities 12 within the opposable 100 (e.g. if the cavities 12 are arranged in parallel rows, the fluidic openings 18 will likewise be arranged in the same manner).

The fluidic opening 18 may be any size and/or shape, provided that the size or shape is sufficient to allow for reagent, liquid, or fluid to enter the fluid-carrying gap. In some embodiments, the size and/or shape of the fluidic opening 18 may be varied to allow reagents, liquids, or fluids to be dispensed at a predetermined rate. Likewise, of course, the size and/or shape may be varied depending on the type of reagent, liquid, or fluid dispensed, its viscosity, or its reactivity. Moreover, it may be desirable to alter the size and/or shape of the fluidic opening such that reagent, liquid, or fluid may be dispensed at a rate that is at least equal to the rate of evaporation from the fluid-carrying gap, or at any other rate, such as a rate of replenishment as described herein.

Figure 40A:
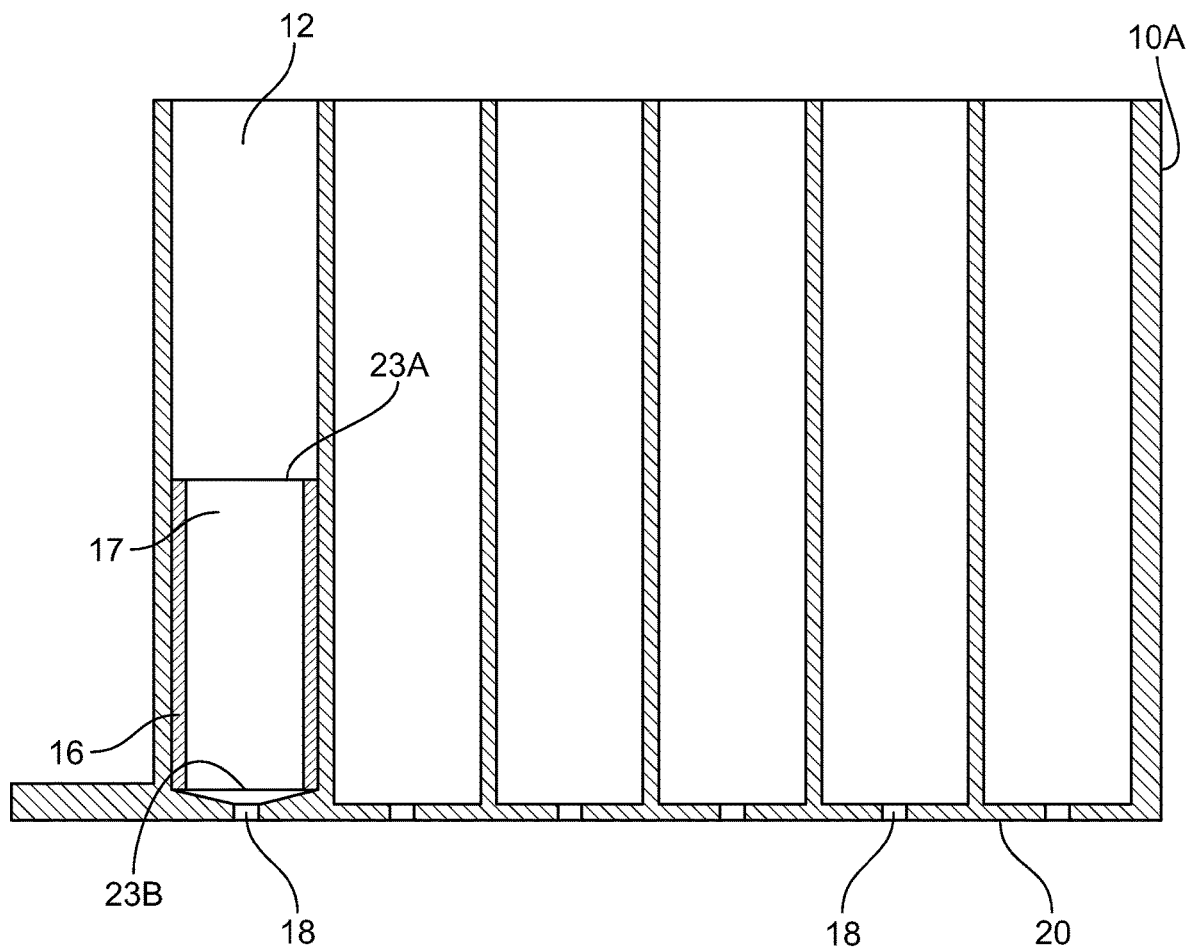
FIGS. 40A and 40B illustrate cross-sections of an opposable incorporating onboard reagents, and specifically showing one or more reagent chambers housed in a cavity.
Figure 40B:
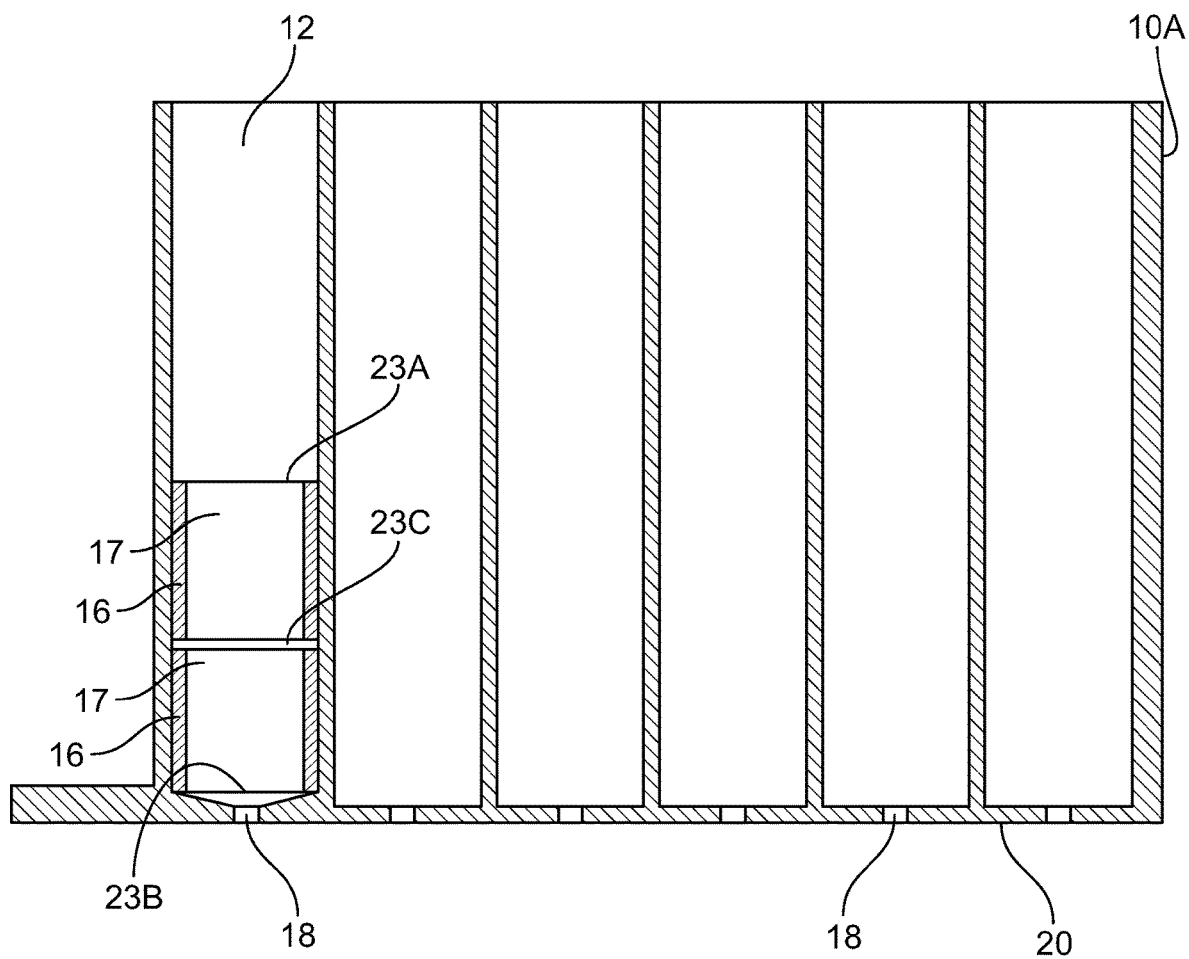

Each cavity 12 is configured to house one or more reagent chambers 16 as depicted in FIGS. 40A and 40B. In some embodiments, the cavities may comprise a single reagent chamber 16, such as depicted in FIG. 40A. The single reagent chamber may comprise the entire volume of the cavity or less than the entire volume of the cavity. In other embodiments, the cavities may comprise multiple reagent chambers 16, such as depicted in FIG. 40B. The skilled artisan will appreciate that the aggregate of the multiple reagent chambers in any single cavity may comprise the entire volume of the cavity or less than the entire volume of the cavity.

While FIG. 40B depicts an opposable comprising two reagent chambers 16 in a single cavity 12, the skilled artisan will appreciate that each cavity may have 3, 4, or "n" reagent chambers (where "n" is an integer) and any opposable may be designed to have cavities 12 sized appropriately to encompass such "n" number of reagent chambers 16. The reagent chambers may assume the shape of the cavity 12 in which they are placed or may have a different shape or size. For example, a cylindrical cavity may comprise a cylindrical reagent chamber. Alternatively, a cylindrical cavity may comprise a reagent chamber that is spherical.

Referring to FIG. 40A, each reagent chamber 16 comprises an interior compartment 17 defining a particular volume. Where multiple reagent chambers 16 are present in a single cavity 12, such as depicted in FIG. 40B, each reagent chamber comprises an interior compartment 17 defining a particular volume. Each interior compartment 17 may have the same or different volumes. For example, a reagent chamber may have a first interior compartment having a first volume, whereas a second reagent chamber may have a second interior compartment having a second volume, the second volume being smaller than the first volume.

Any of the interior compartments 17 and/or reagent chambers 16 may be treated with a coating to alter the chemical properties of the interior compartments or reagent chambers, such as to encourage or facilitate the dispensing of the entire amount, volume, or aliquot of reagent, liquid, or fluid from the chamber. For example, a coating may be applied that renders the interior of the compartment or reagent chamber more or less hydrophobic or hydrophilic depending, of course, on the reagent, liquid, or fluid contained therein. Moreover, it is entirely possible that some reagent chambers or interior compartments will be comprised of one material or have one coating, while other reagent chambers or interior compartments will be comprised of different materials or have different coatings (such as to enhance dispersion or the reagent, liquid, or fluid).

Each reagent chamber 16 comprises one or more seals, where the seals serve to substantially maintain (e.g. prevent evaporation, leakage, or contamination) the contents of any reagent, liquid, or fluid within the reagent chamber. The seals may be comprised of any material, provided that such material does not introduce contaminants or leach materials into the reagent or fluid contained within the reagent chamber. In some embodiments, the material for the seal may be selected from polyurethanes, polytetrafluoroethylene, polyamines, rubbers, nitrile butadiene rubbers, latexes, silicones, and foils (e.g. metal foils, including aluminum foils; Mylar® foils). In some embodiments, a material for the seal is selected such that after a seal is punctured or pierced, any puncture or piercing will substantially "self seal," i.e. any opening in the seal will close to an extent such that substantially no further reagent or fluid could pass through the punctured or pierced seal. Moreover, the the skilled artisan will recognize that the material for any of the seals and/or the thickness of the seal itself should be selected such that one or more seals of any reagent chamber may be punctured or pierced by a seal piercing means.

As depicted in at least FIG. 40A, reagent chamber 16 comprises a seal 23A at a top of the chamber and a seal 23B at the bottom of the reagent chamber. Seals 23A and 23B may comprise the same or different materials. When two or more reagent chambers are present in a single cavity, each reagent chamber is separated by an inter-chamber seal 23C. For example, as illustrated in FIG. 40B, a first reagent chamber 16 comprises a top seal 23A, and a second reagent chamber 16 comprises a bottom seal 23B. Separating the two individual chambers 16 is an inter-chamber seal 23C, which serves to isolate the contents of the two interior compartments 17 from each other. Once again, seals 23A, 23B, and 23C may comprise the same or different materials. As will be appreciated by the skilled artisan, the seal 23B at the bottom of any reagent chamber prevents any reagents or fluid from escaping the reagent chamber through the fluidic opening 18 on the fluid manipulation surface 20 of the opposable 100. While FIGS. 40A and 40B depict only one cavity having a reagent chamber, the skilled artisan will recognize that any of the cavities may comprise one or more reagent chambers.

The seals of any reagent chamber may be independently punctured or pierced by any means known to those of ordinary skill in the art, e.g. with a plunger, syringe, needle, or a jet of compressed air or other fluid, and as described previously herein. In some embodiments, the seal piercing means may be included within the cavities of the opposable itself. In other embodiments, the seal piercing means may be external to the opposable and may be included as part of any specimen-processing system (such as the onboard reagent dispensing means disclosed herein). As such any seal piercing means may be used to dispense the onboard reagent, liquid or fluid from the one or more reagent chambers 16 of the opposable 100 to the fluid-manipulation surface 20 or any fluid-carrying gap between the opposable and a slide.

In some embodiments where one or more spherical reagent chambers are placed in a cavity (e.g. a cylindrical cavity), the spherical reagent chambers may be configured as beads comprising reagents. The outer shell of any bead may be punctured by a puncturing means and the contents of that bead may be dispersed through the fluidic opening 18.

Figure 41B:
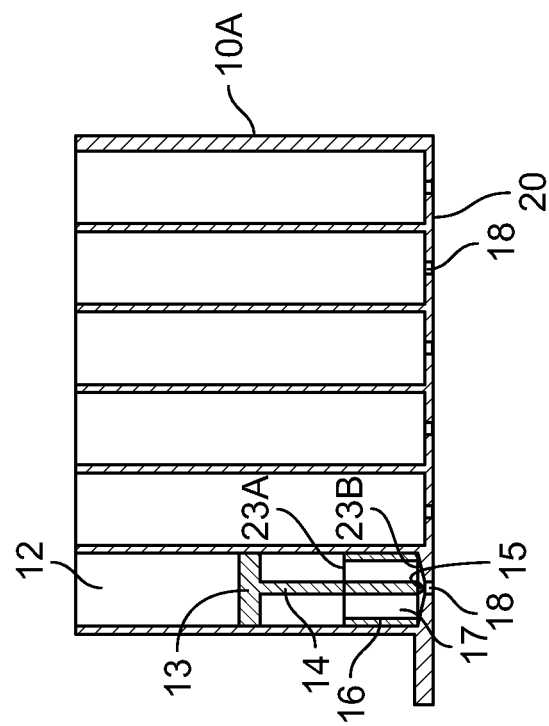
FIGS. 41A and 41B provide cross-sections of an opposable incorporating onboard reagents, where a plunger is moved from a stored position to a deployed position in a single reagent chamber.
Figure 41A:
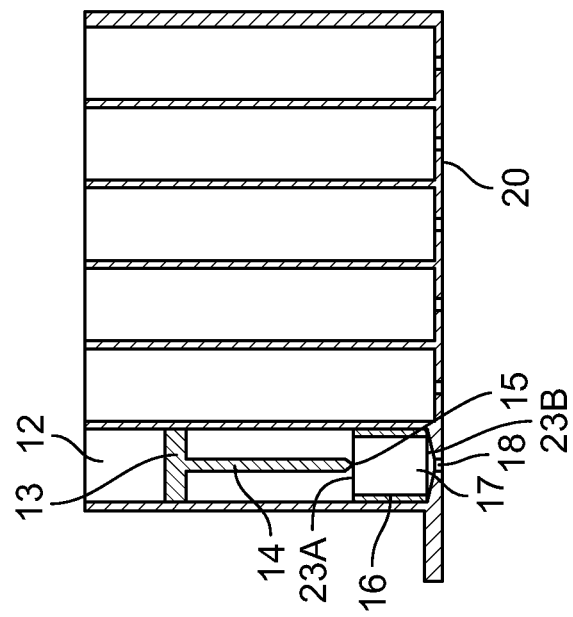

With reference to FIGS. 41A and 41B, in some embodiments, the seal piercing means is a plunger 13 having a shaft 14 and a tip 15 (e.g. blunt or pointed tip). The plunger 13 is, of course, sized and shaped to fit with the dimensions of any cavity 12 and provided in an initial (stored) position above (inter or external to the cavity itself) the top seal of any reagent chamber contained therein. Without wishing to be bound by any particular theory, it is believed that the incorporation of a discrete plunger 13 in or around each cavity 12 mitigates the chance of cross contamination as compared with methods where an external plunger, syringe, or needle is passed over a cavity to puncture or pierce the one or more seals 23A, 23B, and/or 23C. Moreover, again without wishing to be bound by any particular theory, using a discrete plunger 13 in each cavity 12 allows for increased throughput since, it is believed, that any external plunger, syringe, or needle would need to be washed and/or decontaminated between successive seal piercings (see, e.g., FIG. 41B). Further, it is believed that the use of a discrete plunger allows for the fluidic opening 18 to the fluid manipulation surface 20 to be sealed by insertion of the tip of the plunger 15 into the fluidic opening 18. In some embodiments, the plunger 13 incorporated within each cavity is moved or actuated via an external means, e.g. an external actuator positioned over the cavity openings.

FIGS. 41A and 41B illustrate the operation of a plunger 13 in a cavity having only a single reagent chamber 16. In an initial position (stored), the tip 15 of the plunger 13 is positioned over the top seal 23A of the reagent chamber 16. The plunger 13 is then actuated or moved to a "deployed" position by an external means (e.g. a three-dimension (x,y,z) actuator) such that it is moved from the initial, stored position to a deployed position where the tip 15 pierces the seal 23A and enters the interior compartment 17 of the reagent chamber 16. The plunger 13 is then further actuated such that the tip 15 pierces the second seal 23B of reagent chamber 16. Following the piercing of both seals, fluid is allowed to pass from the fluidic opening 18 to an outside environment. The plunger 13 may be even further actuated such that the tip remains within the fluidic opening 18 such that reagents, liquids, or fluids from the outside environment (such as those within any fluid-carrying gap between the opposable and the slide) do not enter the opening 18 and enter the interior compartments of reagent chambers, ensuring that all reagents and/or fluids deposited between the opposable and a slide remain positioned between the opposable and slide for specimen processing. These steps are repeated for all cavities comprising a reagent chamber. While FIGS. 41A and 41B depict only one cavity having a reagent chamber, the skilled artisan will recognize that any of the cavities may comprise one or more reagent chambers.

FIGS. 42A, 42B, 42C illustrate the operation of the plunger 13 in a cavity having two reagent chambers 16. In an initial position, the tip 15 of the plunger 13 is posited over the top seal 23A of a first reagent chamber 16 (FIG. 42A). The plunger is then actuated by an external means (see, e.g. the dispensing means 2036A of FIG. 33B) such that it is moved from the initial, stored position to a deployed position where the tip pierces the seal 23A and enters the interior compartment 17 of the first reagent chamber 16. The plunger is further actuated such that the tip 15 pierces the second seal 23C and enters the interior compartment 17 of the second reagent chamber 16 (FIG. 42B); and then further actuated such that the tip pierces the third seal 23B of the reagent chamber 16 (FIG. 42C). Following the piercing of all three seals, the fluid is allowed to pass from the fluidic opening 18 to an outside environment. The tip 15 of the plunger 13 is allowed to remain within the fluidic opening 18 to prevent or mitigate fluid from the outside environment (e.g. such as within the fluidic-carrying gap) entering the interior compartment of any reagent chamber. These steps are repeated for all cavities comprising two or more reagent chambers. Again, while FIGS. 42A, 42B, and 42C depict only one cavity having a reagent chamber, the skilled artisan will recognize that any of the cavities may comprise one or more reagent chambers.

In some embodiments, the opposables 100 comprising one or more pre-loaded reagents may be configured for use in particular assays or protocols. For example, the opposable may include all of the reagents in appropriate quantities for a particular IHC or ISH assay. Indeed, such an opposable may comprise all reagents for performing a particular IHC assay, including all of the buffers, antibodies, enzymes, chromogens, washes etc. in the quantities appropriate for the particular assay, where each each reagent is housed in a different cavity of the opposable. The skilled artisan will also appreciate that the opposable may incorporate all of the necessary reagents for performing multiplex assays, e.g. two or more IHC or ISH assays, in any combination. By way of example, an opposable for a multiplex IHC assay may comprise the following components: (1) a buffer housed in a reagent chamber in a first cavity, (2) a first antibody housed in a reagent chamber in a second cavity; (3) detection reagents for detecting the first antibody, housed in a reagent chamber in a third cavity; (4) a second antibody housed in a reagent chamber in a fourth cavity; and (5) detection reagents for detecting the second antibody, housed in a reagent chamber in a fifth cavity. Of course, any of the reagents may be arranged in any cavity in the opposable.

In some embodiments, each of the reagent chambers 16 in a single cavity comprise different reagents. For example, and with reference to FIG. 40B, the first reagent chamber 16 may comprise a first reagent, while the second reagent chamber 16 comprises a second different reagent. When the seal 23C between the first and second reagent chambers 16 is pierced, the first and second reagents are allowed to mix, and sufficient time for mixing may be allowed prior to piercing of the third seal 23B and subsequent dispersion of reagent, liquid, or fluid. By way of example, the first reagent chamber 16A may comprise a buffer and the second reagent chamber 16B may comprise a solid (e.g. a lyophilized powder), such that when the seal 23C is pierced, the buffer may reconstitute the solid. In other embodiments, the first and second reagents in the first and second reagent chambers 16A and 16B are both fluids that are allowed to mixed upon puncturing of the seal 23C.

The person of ordinary skill in the art will recognize that any reagents, liquids, fluids, or powders may be contained within the reagent chambers of the opposables. In some embodiments, the same reagent may be contained in more than one reagent chamber. In other embodiments, the same reagent may be contained in more than one reagent chamber, but the quantities and/or concentrations of the reagent may differ. In this manner, it is possible that should an assay require a specific quantity or concentration of a reagent, that the appropriate reagent in the appropriate quantity or concentration may be dispensed. Similarly, if an assay requires, for example, 200 microliters of reagent, and each reagent chamber comprises 100 microliters of the reagent, reagent may be dispensed from two of the reagent chambers to provide the needed 200 microliters of reagent.

The opposable 100 and 810 can be made, in whole or in part, of polymers, plastics, elastomers, composites, ceramics, glass, or metals, as well as any other material that is chemically compatible with the processing fluids and specimen. Exemplary plastics include, without limitation, polyethylene (e.g., high density polyethylene, linear low density polyethylene, blends, or the like), polyvinylidene fluoride (PVDF), polytetrafluoroethylene (PTFE), perfluoroalkoxy (PFA), polyethylenimine (PEI) or combinations thereof. In some embodiments, the opposable 810 can be made of a single material. In other embodiments, different portions of the opposable 810 are made of different materials. If the opposable 810 is disposable, it can be made, in whole or in part, of a relatively inexpensive material. If the opposable 810 is rigid, it can be made, in whole or in part, of polycarbonate, urethane, polyester, a metal coated plate, or the like.

Referring again to FIGS. 23 and 39C, the end 952 of the opposable includes a captivation feature in the form of a tapered region 1461 or 1510. The tapered region 1461 or 1510 is positioned to captivate the band of liquid. As the opposable 100 or 810 is over-rolled, the band of liquid can contact and cling to the tapered region 1461 or 1510. A curved surface 1463 provides a large surface area to which the liquid can cling. The illustrated tapered region 1461 has a radius of curvature equal to or less than about 0.08 inch to cooperate with a standard microscope slide to captivate a band of liquid. Other radii of curvature can also be used, if needed or desired. In some embodiments, the curvature of the rounded edge 1461 is uniform across the width W of the opposable 810. In other embodiments, the curvature of the rounded edge varies across the width W of the opposable 810.

The opposable 100 and 810 can be disposable to prevent cross-contamination. As used herein, the term "disposable" when applied to a system or component (or combination of components), such as an opposable element, a processing liquid, or the like, is a broad term and generally means, without limitation, that the system or component in question is used a finite number of times and is then discarded. Some disposable components, such as an opposable element, are used only once and are then discarded. In some embodiments, multiple components of a processing apparatus are disposable to further prevent or limit carryover contamination. In other embodiments, the components are non-disposable and can be used any number of times. For example, opposable elements that are non-disposable may be subjected to different types of cleaning and/or sterilization processes without appreciably altering the characteristics of the opposable element.

It is expected that when a volume of fluid on the surface of a slide advances longitudinally in response to capillary forces, currents within the fluid will predominantly align with the direction of movement rather than become randomly oriented. As such, the relevant fluid dynamics may correspond more to a laminar flow regime than to a turbulent flow regime. In a laminar flow regime, lateral mixing (e.g., mixing generally perpendicular to the direction of movement) may be relatively limited. When a volume of fluid is advanced at relatively high speed along a slide using the opposable, the fluid's inertia can cause some of the fluid to flow past the edges of the slide. Although a rough or a textured surface in contact with the fluid can also induce some increased turbulence and increased lateral mixing, it can also cause bubbles to form in the fluid, which can be undesirable, especially in the context of staining reactions. Without wishing to be bound by any particular theory, it is believed that a rough or textured surface will tend to "hold onto" reagents more tightly and reduce rinsing efficiency.

Moreover, it is desirable to maintain the fluid within the specimen processing region 1453 or 802 during processing. Under certain conditions, however, fluid may flow beyond the specimen processing region 1453 or 802 and this may be caused by certain movements of the opposable and the forces generated and transferred to the fluid. In some embodiments, the fluid's local inertia can cause a portion of the fluid to be driven outward along the edges of the capillary space between the opposable and the slide. In some embodiments, this could result in "blebbing," which is an extension of an edge (or a meniscal surface) of the fluid beyond the visual slide boundary. In some instances, the fluid could wick out from the capillary space. In each of these situations, it would be desirable to maintain the fluid substantially in the specimen processing region 1453 or 802 during any processing steps.

When a volume of fluid advanced over a slide includes a reactant (e.g., an oxidizing agent, a chromogen, or another suitable histochemical reactant) that is consumed via interaction with a specimen, limited lateral mixing within the fluid may cause undesirable inhomogeneities in the concentration of the reactant. For example, a specimen can have a non-uniform surface area or density of reaction sites across the width of a slide, which can cause a reactant to be depleted at different rates within different regions of a volume of fluid advanced over the slide. Diffusional mixing alone may be inadequate to equilibrate these inhomogeneities. For example, many reactants have relatively high molecular weights and diffuse relatively slowly such that lateral diffusion may be insufficient to equilibrate the concentration of such reactants. Some specimen-processing reactions are highly dependent on reactant concentration. In dynamic fluid protocols, when different regions of a volume of fluid (e.g., a packet of fluid, a thin film of fluid, etc.) advanced over a specimen have different reactant concentrations, corresponding regions of the specimen can be processed at different rates, resulting in non-uniform specimen processing (e.g., non-uniform staining of a specimen). This can be problematic when relatively uniform specimen processing is desirable. The non-uniform staining is often in the form of a non-random pattern (e.g., a striped pattern) associated with directionality of the fluid movement. In static fluid processing (e.g., incubation), variations in tissue characteristics may lead to processing irregularities. However, such irregularities may result in processing inconsistencies that are significantly less than processing inconsistencies associated with dynamic fluid staining protocols.

Figure 25:
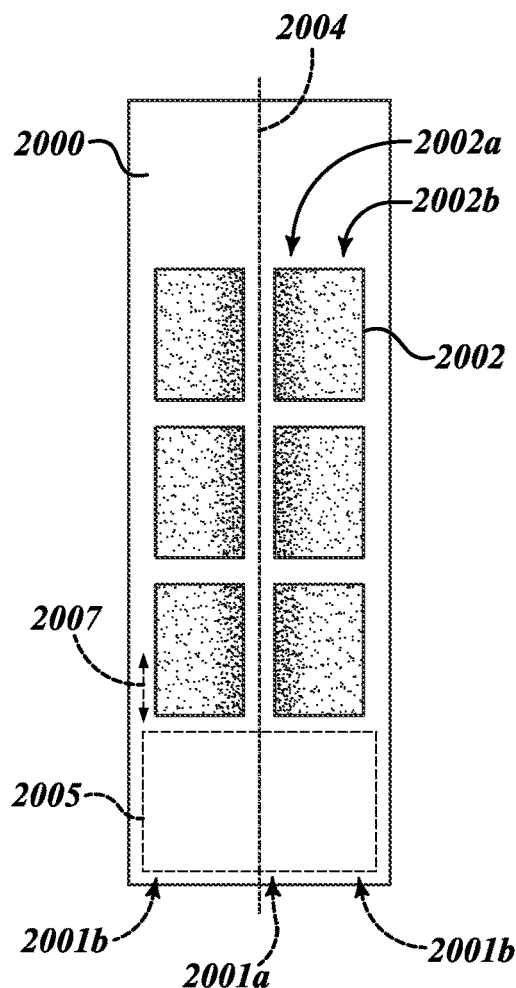
FIG. 25 is a plan view of a specimen-bearing slide illustrating an example of stain non-uniformity.

One example of non-uniform staining is illustrated in FIG. 25, which is a plan view of a slide 2000 and six rectangular specimens 2002 (one identified) positioned on a surface of the slide 2000. The specimens 2002 are spaced apart from one another and generally symmetrically distributed relative to a bisecting plane 2004. The bisecting plane 2004 extends along the centerline of the slide 2000 and is generally parallel to the length of the slide 2000. Inner regions 2002a (one identified in FIG. 25) of the specimens 2002 are closer to the bisecting plane 2004 than outer regions 2002b (one identified) of the specimens 2002. A volume of fluid 2005 (shown in dashed line) can be moved over the slide 2000. For example, the volume of fluid 2005 can be moved longitudinally (indicated by arrow 2007) along the slide 2000. The inner regions 2002a may develop greater stain intensities than the outer regions 2002b. Without wishing to be bound by theory, it is possible that a lack of reaction sites around the bisecting plane 2004 (e.g., the lack of reaction sites in the gaps between laterally adjacent specimens 2002) can cause a localized increase in reactant concentration in a portion of the volume of fluid proximate the bisecting plane 2004 relative to portions of the fluid 2005 further from the bisecting plane 2004. For example, a concentration of the reactant at an inner region 2001a of the fluid 2005 can be greater than a concentration of the reactant at outer regions 2001b of the fluid 2005. This concentration difference can cause the non-uniform staining illustrated in FIG. 25.

Figure 26:
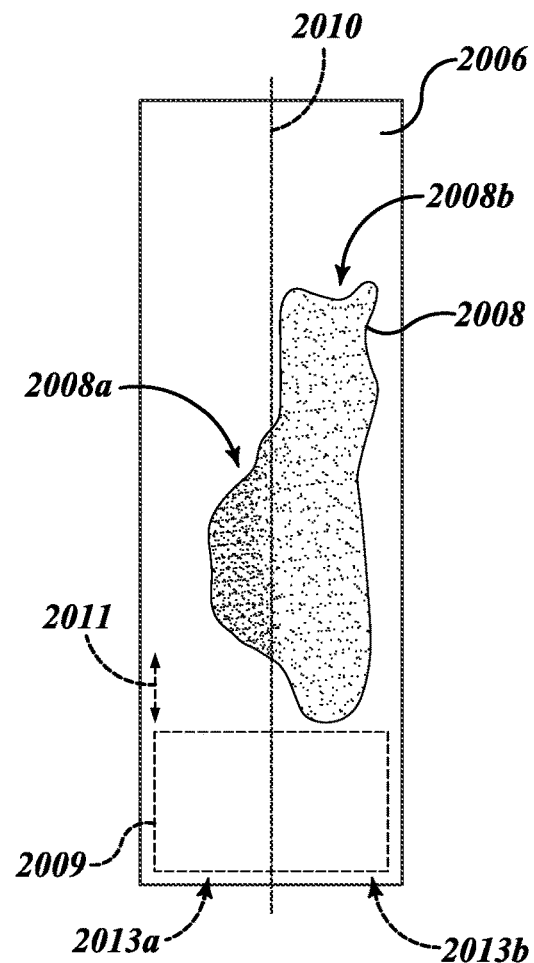
FIG. 26 is a plan view of a specimen-bearing slide illustrating another example of stain non-uniformity.

Another example of non-uniform staining is illustrated in FIG. 26, which is a plan view of a slide 2006 and one irregularly shaped specimen 2008 positioned on a surface of the slide 2006. The specimen 2008 is not symmetrical relative to a bisecting plane 2010. In particular, a first region 2008a of the specimen 2008 on one side of the bisecting plane 2010 is smaller than a second region 2008b of the specimen 2008 on the other side of the bisecting plane 2010. After advancing a volume of fluid 2009 (shown in dashed line) longitudinally over the slide 2006 in the directions indicated by arrow 2011, the first region 2008a may develop greater stain intensity than the second region 2008b. Again, without wishing to be bound by theory, it is possible that a smaller number of reaction sites associated with the first region 2008a relative to the second region 2008b can cause a portion 2013a of the fluid 2009 advanced over the first region 2008a to develop a higher reactant concentration than a portion 2013b of the fluid advanced over the second region 2008b, and that this concentration difference can cause the non-uniform staining illustrated in FIG. 26. In still other examples, natural variation in the number and/or type of reaction sites associated with a specimen can cause non-uniform staining even when the specimen is symmetrical relative to a bisecting plane or other reference plane. Other phenomena can also lead to non-uniform staining similar to or different than the non-uniform staining illustrated in FIGS. 25 and 26.

Figure 27:
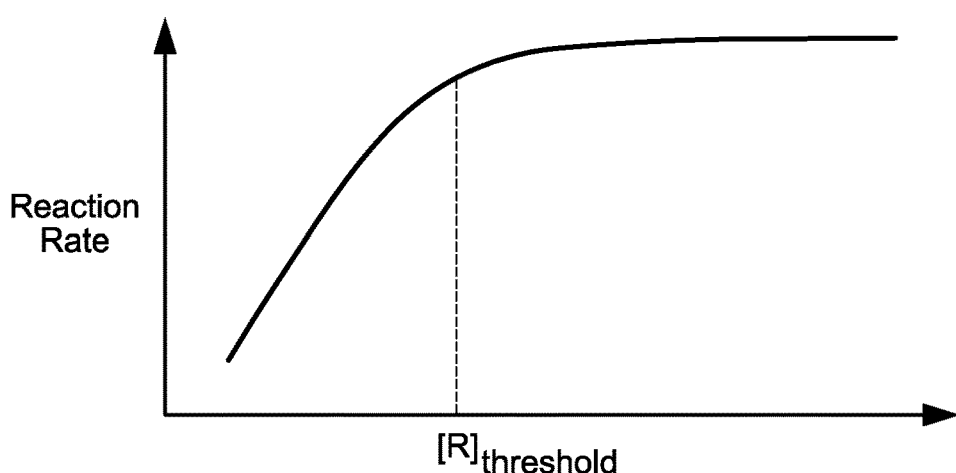
FIG. 27 is a plot of average real-time reactant concentration on the x-axis versus reaction rate on the y-axis for one example of a specimen-processing reaction during a processing period.

FIG. 27 is a plot of average real-time reactant concentration on the x-axis versus reaction rate on the y-axis for one example of a specimen-processing reaction during a processing period (e.g., while a volume of fluid including a reactant is advanced over a specimen). During the processing period, the specimen-processing reaction gradually consumes the reactant. With many specimen-processing reactions, there is a threshold reactant concentration ($[R]_{threshold}$) above which the reaction is zero order (i.e., generally independent of the reactant concentration) and below which the reaction is not zero order (e.g., first or second order). Thus, in some cases, even if a reactant concentration is depleted to produce varying concentration levels within different portions of a volume of fluid, the reaction rate at different regions of the specimen can remain generally the same so long as the depleted levels remain above $[R]_{threshold}$. Various factors, however, such as reactant cost, solubility, poisoning (e.g., enzyme poisoning), and selectivity, among others, can make it technically challenging and/or undesirable to use relatively high initial reactant concentrations. Thus, the initial reactant concentration within a volume of fluid is often insufficient to prevent the real-time reactant concentration in different portions of the fluid from falling below $[R]_{threshold}$ during a processing period. Furthermore, the number of reaction sites associated with a specimen, the size of the specimen, the distribution of the reaction sites, and other factors that affect reactant depletion often vary widely between specimens and may be impractical to control. Specimens can vary, for example, from a single needle biopsy having an area of about 0.01 square centimeters and relatively low antigen loading to a slice of tissue having an area of about 10 square centimeters and relatively high antigen loading. Lateral mixing of a volume of fluid can facilitate generally uniform processing of single needle biopsies, slices of tissue, and other types of specimens. Opposables can be configured to laterally mix a volume of fluid.

Figure 28:
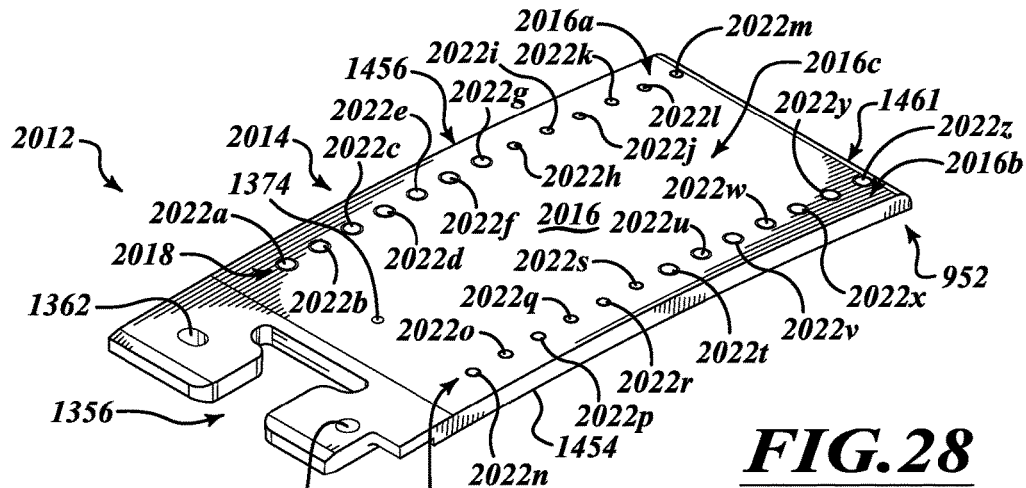
FIG. 28 is an isometric view of an opposable in accordance with an embodiment of the disclosed technology. In some embodiments, one or more fluid control elements are incorporated into the opposable such that fluid is maintained within the fluid-carrying gap or on the fluid-manipulation surface.
Figure 29:
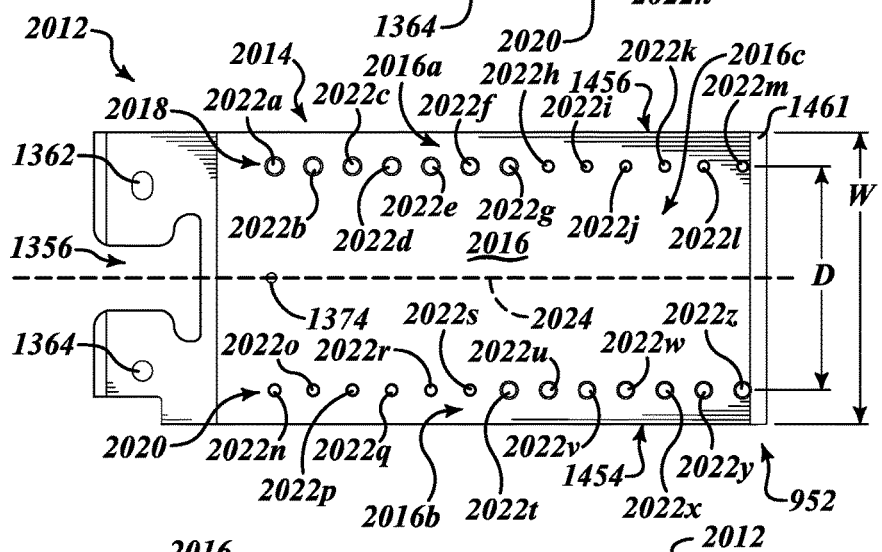
FIG. 29 is a top plan view of the opposable of FIG. 28. In some embodiments, one or more fluid control elements are incorporated into the opposable such that fluid is maintained within the fluid-carrying gap or on the fluid-manipulation surface.
Figure 30:
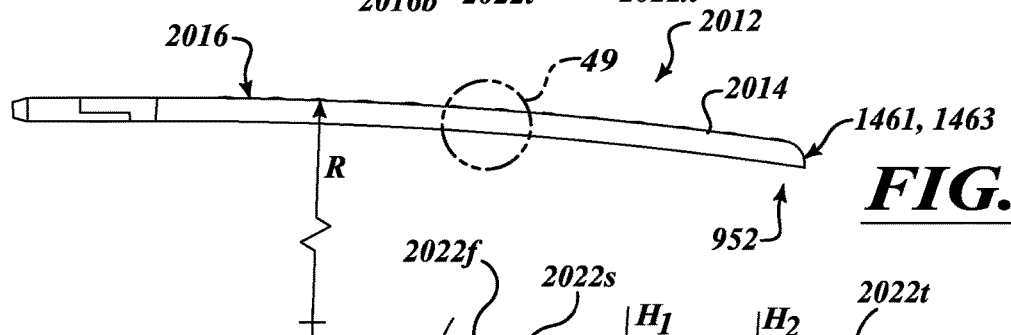
FIG. 30 is a side elevation view of the opposable of FIG. 28.
Figure 31:
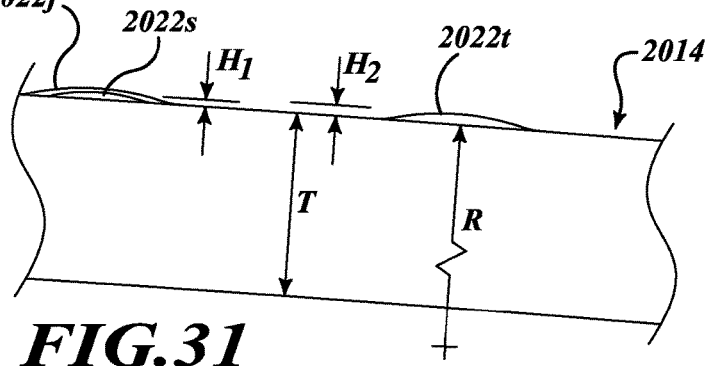
FIG. 31 is a detailed view of a portion of the opposable of FIG. 30.

FIGS. 28, 29, and 30 are, respectively, an isometric view, a top plan view, and a side elevation view of an opposable 2012 configured in accordance with an embodiment of the present technology. FIG. 31 is a detailed view of a portion of the opposable 2012. In some cases, the opposable 2012 can provide lateral mixing to at least partially compensate for one or more of the phenomena described above and/or other phenomena associated with non-uniform staining. For example, enhanced lateral mixing in accordance with some embodiments of the present technology can facilitate generally even distribution of a reactant throughout a volume of fluid before, during, or after performing a specimen-processing reaction. Furthermore, enhanced lateral mixing can be useful for achieving uniform temperatures, see Table 1) and concentration profiles throughout a volume of liquid, for increasing rinsing efficiency, for increasing homogenization of fluids after replenishing (e.g., after supplementing the fluids to at least partially compensate for evaporation), and/or for enhancing other suitable processes.

TABLE 1

| 30 Second Intervals | | Slide Temp Variation (Degrees C.) Point 1 | Slide Temp Variation (Degrees C.) Point 2 |
| --- | --- | --- | --- |
| Opposable with Uniform Spacer Height | Std Dev | 0.6 | 0.7 |
| | % CV | 0.6 | 0.8 |
| Opposable with Varying Spacer Height | Std Dev | 0.3 | 0.3 |
| | % CV | 0.4 | 0.3 |

Referring to FIGS. 28-31, the opposable 2012 can include a non-planar (e.g., arcuate and/or cambered) body 2014 having a fluid-manipulating surface 2016. The opposable 2012 can further include a first spacer 2018 at a first side portion 2016a of the fluid-manipulating surface 2016, and a second spacer 2020 at a second side portion 2016b of the fluid-manipulating surface 2016. In some embodiments, the first and second spacers 2018, 2020 include, respectively, first and second pluralities of discrete protrusions 2022 (individually identified as 2022a-z). The protrusions 2022, for example, can be spaced-apart gapping elements, bumps, points, ridges, dams, walls, or other suitable spacing structures. Likewise, and as noted above, the opposable 100 can include a non-planar body or fluid-manipulation surface 20, and again include spacers on the edges or periphery of the opposable 100. Indeed, the skilled artisan will recognize that the embodiments disclosed in FIGS. 38-31 could be applied to the opposable 100 which incorporates one or more onboard reagents in one or more reagent chambers.

The fluid-manipulating surface 2016 can include a central or processing region 2016c between the first and second side portions 2016a, 2016b. For example, the first and second side portions 2016a, 2016b can be spaced apart from one another on either side of a bisecting plane 2024 (FIG. 29). The bisecting plane 2024 can extend through the central region 2016c, be centrally positioned relative to the width of the fluid-manipulating surface 2016, and be generally parallel to the length of the opposable 2012. In some embodiments, the width of the fluid-manipulating surface 2016 extends across generally the entire distance between the edges 1454, 1456. In other embodiments, the width of the fluid-manipulating surface 2016 can extend across only a portion of the distance between the edges 1454, 1456. The body 2014 can be flexible or rigid at the fluid-manipulating surface 2016, and can be made of a molded polymer or another suitable molded or non-molded material.

Figure 32:
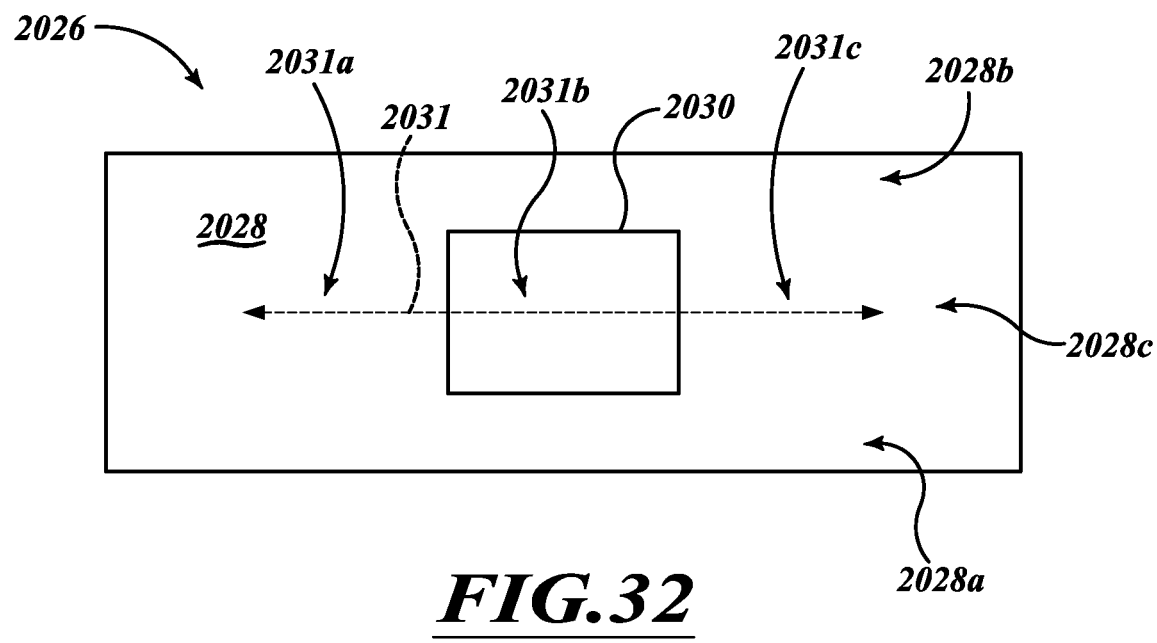
FIG. 32 is a plan view of a slide suitable for use with the opposable of FIG. 28.

FIG. 32 is a plan view of a slide 2026 suitable for use with the opposable 2012 or with opposable 100. The slide 2026 can include a specimen-bearing surface 2028 having a first side portion 2028a generally corresponding to the first side portion 2016a of the fluid-manipulating surface 2016, a second side portion 2028b generally corresponding to the second side portion 2016b of the fluid-manipulating surface 2016, and a central region 2028c generally corresponding to the central region 2016c of the fluid-manipulating surface 2016. A specimen 2030 can be positioned on the central region 2028c of the specimen-bearing surface 2028. With reference to FIGS. 28-32 together, the opposable 2012 and the slide 2026 can be configured to be positioned proximate to one another with the first spacer 2018 at least partially in contact with the first side portion 2028a, and the second spacer 2020 at least partially in contact with the second side portion 2028b. Likewise, opposable 100 (including spacers along each edge of the opposable) and the slide 2026 may be configured to be positioned proximate to one another (such as to form a fluid-carrying gap between opposable 100 and slide 2026—see FIG. 33B).

The opposable 100 (FIG. 33B) or 2012 and the slide 2026 can be configured to form a fluid-carrying gap (not shown) between a portion of the central region 2016c of the fluid-manipulating surface 2016 and a corresponding portion of the central region 2028c of the specimen-bearing surface 2028. The central region 2016c can be curved to facilitate controlled manipulation of a fluid (not shown) within the fluid-carrying gap by rolling action (e.g., rolling capillary action). In this way, fluid can be advanced along a processing path 2031 (FIG. 32) extending over the specimen 2030. The fluid can be advanced cyclically, such as from a first end portion 2031a of the processing path 2031, over a middle portion 2031b of the processing path 2031, to a second end portion 2031c of the processing path 2031, and then back over the middle portion 2031b to the first end portion 2031a. The central region 2016c can have a radius of curvature R (FIGS. 30 and 31) from about 2 inches (5.2 cm) to about 30 inches (76.2 cm), from about 10 inches (25.4 cm) to about 20 inches (50.8 cm), or within another suitable range. In some embodiments, R is about 15 inches (38.1 cm). The portions of the central regions 2016c, 2028c forming the fluid-carrying gap can be centered or off-center relative to the bisecting plane 2024. In some embodiments, the fluid-carrying gap is spaced apart from the first spacer 2018 and/or the second spacer 2020. In other embodiments, the fluid-carrying gap can extend to, through, or past the first spacer 2018 and/or the second spacer 2020.

Figure 33A:
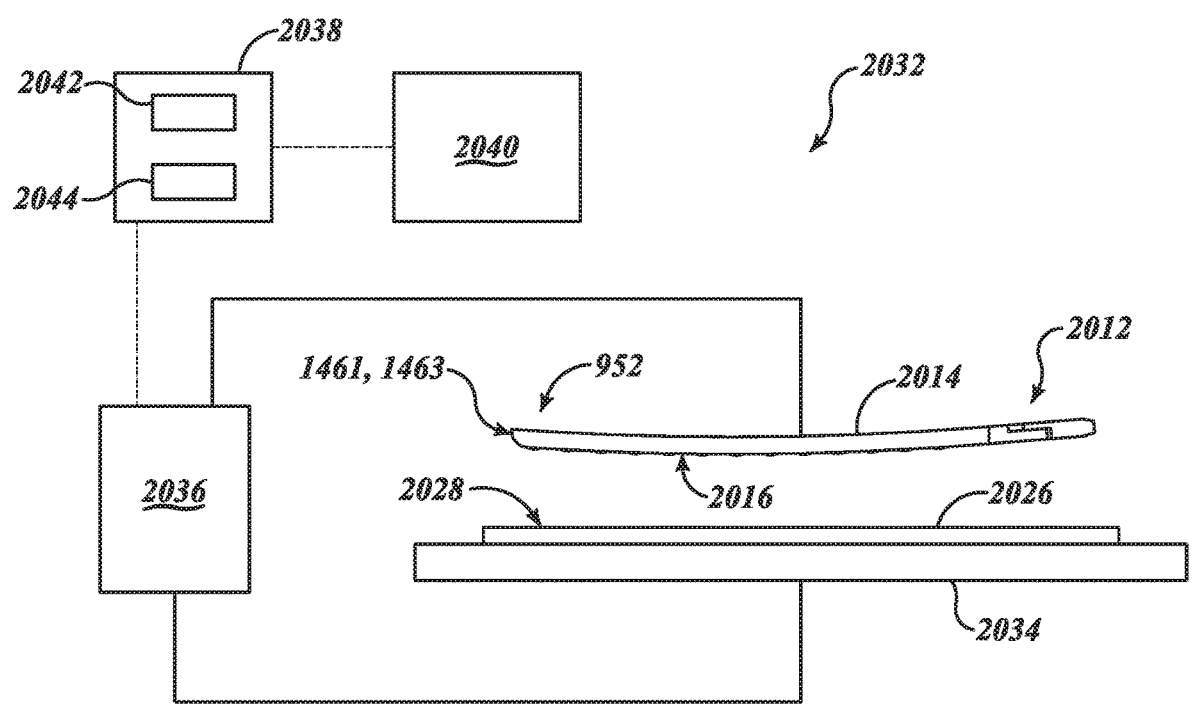
FIGS. 33A and 33B are partially schematic side elevation views of a specimen-processing assembly including the opposable of FIG. 28 and loaded with the slide of FIG. 32 in accordance with an embodiment of the disclosed technology.
Figure 33B:
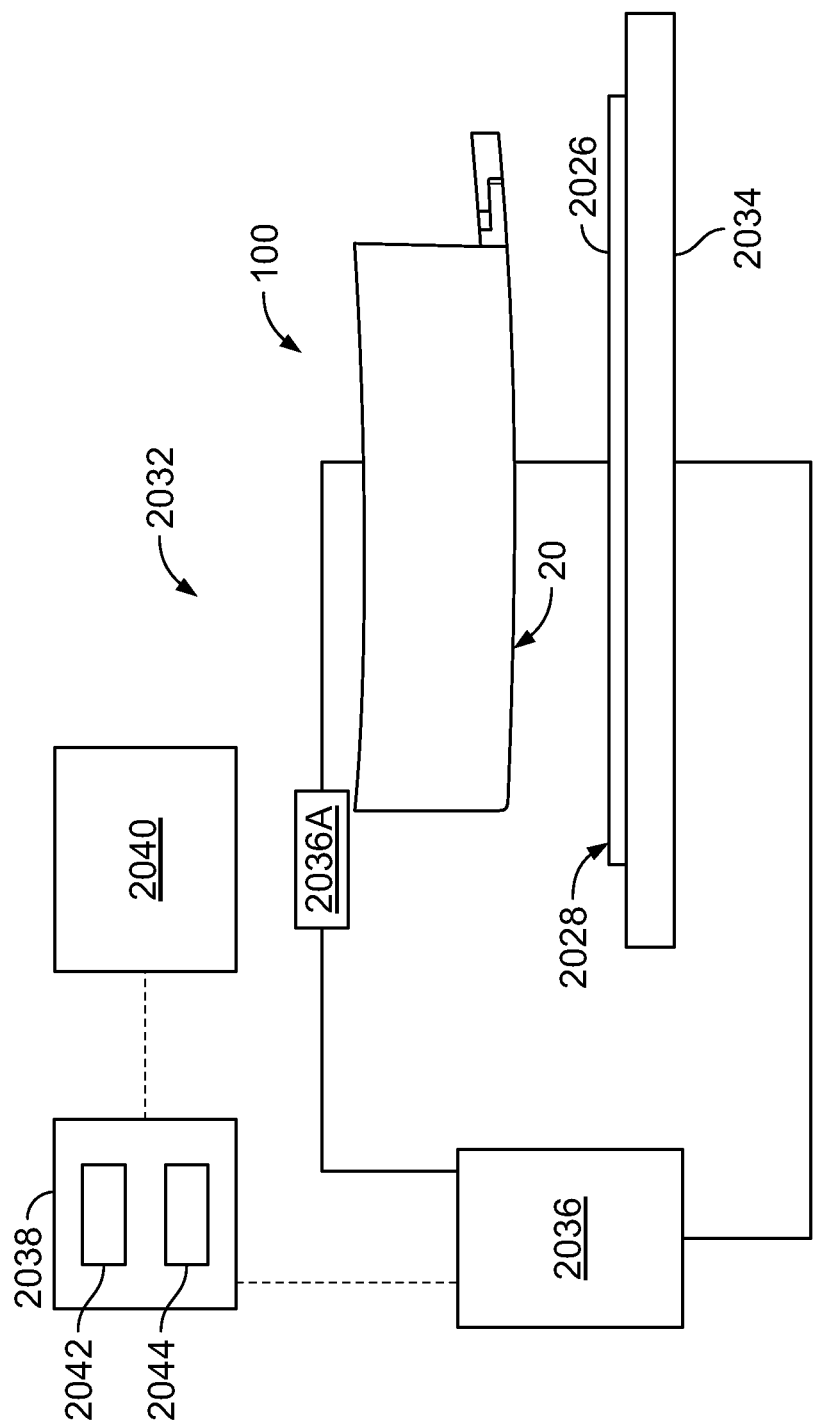

FIGS. 33A and 33B are a partially schematic side elevation views of a specimen-processing assembly 2032 including the opposable 100 or 2012 and a platen 2034 configured to support the slide 2026. The opposable 100 2012 and the slide 2026 (e.g., via the platen 2034) can be configured to interact via a fluid-manipulating action to change the portions of the central regions 2016c, 2028c forming the fluid-carrying gap (e.g., to advance the fluid-carrying gap over the length of the slide 2026). The fluid-manipulating action can include, for example, rotating the opposable 2012 relative to the slide 2026, rotating the slide 2026 relative to the opposable 2012, or both, in an axis of rotation (not shown).

The specimen-processing assembly 2032 can include an actuator 2036 operably connected to the opposable 100 or 2012 or and to the platen 2034. In other embodiments, the actuator 2036 can be operably connected to the opposable 100 or 2012 only, to the platen 2034 only, or have another suitable configuration. The actuator 2036 can be configured to move (e.g., rotate or tilt) the opposable 100 or 2012 relative to the platen 2034, to move (e.g., rotate, tilt, etc.) the platen 2034 relative to the opposable 100 or 2012, or both, in the axis or plane of rotation. The plane of rotation can be, for example, a plane generally parallel to (e.g., the same as) the bisecting plane 2024 (FIG. 29). The specimen-processing assembly 2032 can further include a controller 2038 operably connected to the actuator 2036, and a user interface 2040 operably connected to the controller 2038. The controller 2038 can include a processor 2042 and memory 2044 and can be programmed with instructions (e.g., non-transitory instructions, a sequence of instructions, etc.) that, when executed, cause the actuator 2036 to carry out the fluid-manipulating action.

In some embodiments, the specimen-processing assembly 2032 includes an onboard dispensing means 2036A (e.g. an external actuator used to facilitate dispensing or deployment of the onboard reagents from the reagent chambers of opposable 100). As noted herein, the onboard dispensing means may be an actuator used to manipulate a plunger, syringe, or jet of compressed air/fluid.

With reference to FIGS. 28-33 together, the first and second spacers 2018, 2020 can be configured to vary the profile or cross section of the fluid-carrying gap (e.g., a profile or cross section of the fluid-carrying gap in a direction transverse to the length of the slide 2026) to provide enhanced lateral mixing. In some embodiments, the first and second spacers 2018, 2020 change the orientation of the fluid-manipulating surface 2016 relative to the slide 2026 to produce lateral flows in the volume of fluid. Pairs of protrusions 2022 on opposite sides of the opposable 2012 can have different heights to alter the tilt of at least a portion of the opposable 2012 relative to the slide 2026. In this or another suitable manner, the first and second spacers 2018, 2020 can differentially space apart the first and second side portions 2016a, 2016b of the fluid-manipulating surface 2016 from the first and second side portions 2028a, 2028b of the specimen-bearing surface 2028, respectively, during the fluid-manipulating action. The first spacer 2018 can have a first height profile parallel to the axis of rotation and the second spacer 2020 can have a second height profile parallel to the axis of rotation different than the first height profile. As different protrusions 2022 come into contact with the first and second side portions 2028a, 2028b, respectively, the difference between the first and second height profiles can change the shape of the fluid-carrying gap and thereby cause fluid within the fluid-carrying gap to move laterally. This lateral movement can cause, for example, chaotic advection that can at least partially mitigate the poor lateral mixing often associated with laminar flow regimes.

In some embodiments, the first and second height profiles can include a step down and a step up, respectively, toward the edge 1461 (FIG. 28). For example, the protrusions 2022h-s can have a first height $H_1$ (FIG. 31) and the protrusions 2022a-g and 2022t-z can have a second height $H_2$ (FIG. 31), with $H_1$ being less than $H_2$. $H_1$ can be, for example, from about 0.001 inch to about 0.004 inch, from about 0.002 inch to about 0.0035 inch, or within another suitable range. In some embodiments, $H_1$ is about 0.003 inch. $H_2$ can be, for example, from about 0.004 inch to about 0.008 inch, from about 0.005 inch to about 0.007 inch, or within another suitable range. In some embodiments, $H_2$ is about 0.006 inch. A ratio of $H_1$ to $H_2$ can be, for example, from about 1:1.25 to about 1:3, from about 1:1.5 to about 1:2.5, or within another suitable range. In some embodiments, the ratio of $H_1$ to $H_2$ is about 1:2. Other suitable values for $H_1$, $H_2$, and the ratio of $H_1$ to $H_2$ are also possible. Furthermore, other suitable height profiles are possible. For example, the first height profile, the second height profile, or both can change gradually rather than abruptly. As another example, the first height profile, the second height profile, or both can include more than one height gradient. As yet another example, the first height profile, the second height profile, or both can allow the first side portions 2016a, 2028a to touch while second side portions 2016b, 2028b are spaced apart and/or allow the second side portions 2016b, 2028b to touch while first side portions 2016a, 2028a are spaced apart during at least a portion of the fluid-manipulating action.

Figure 34A:
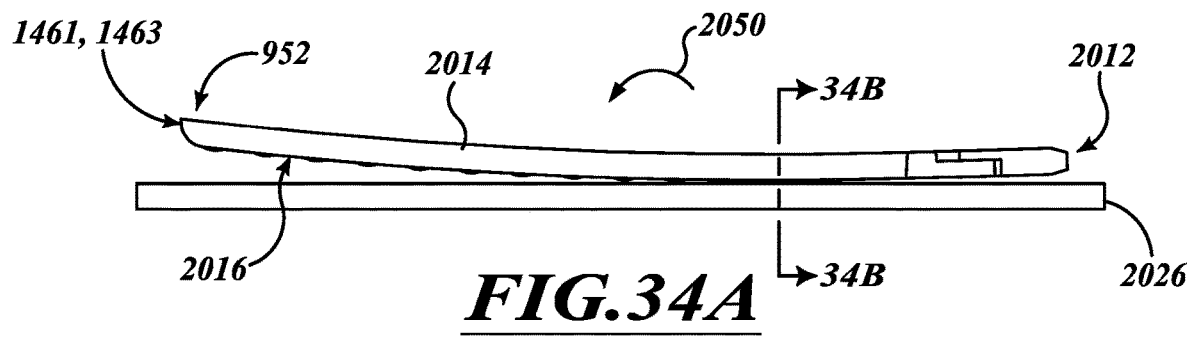
FIG. 34A is a side elevation view of the opposable of FIG. 28 and the slide of FIG. 32 in a first end state.
Figure 34B:
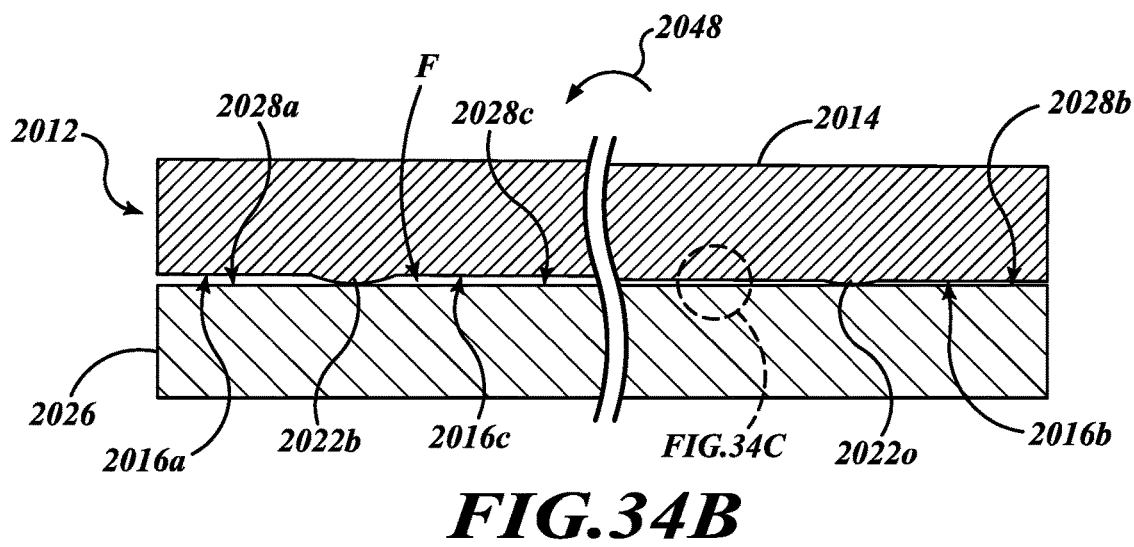
FIG. 34B is a cross-sectional view taken along line 34B-34B in FIG. 34A.
Figure 34C:
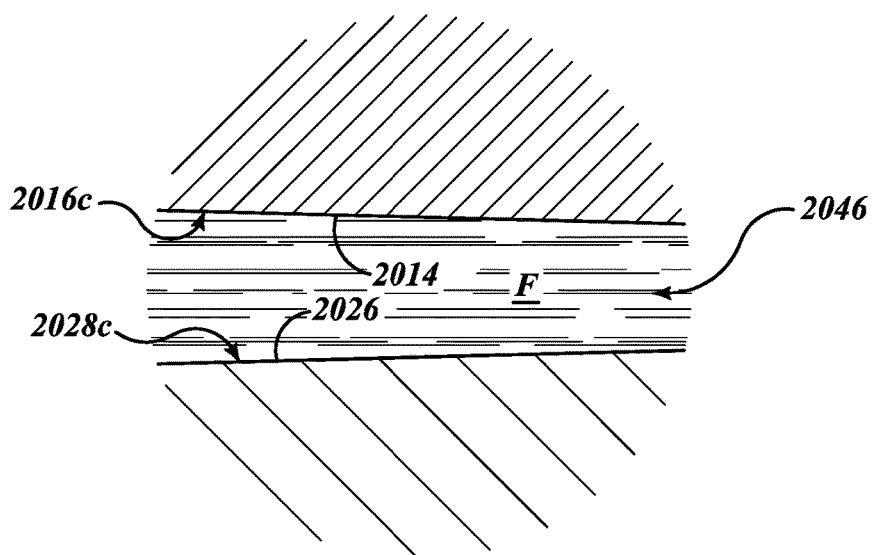
FIG. 34C is an enlarged view of a fluid-carrying gap of FIG. 34B with exaggerated slope.
Figure 35A:
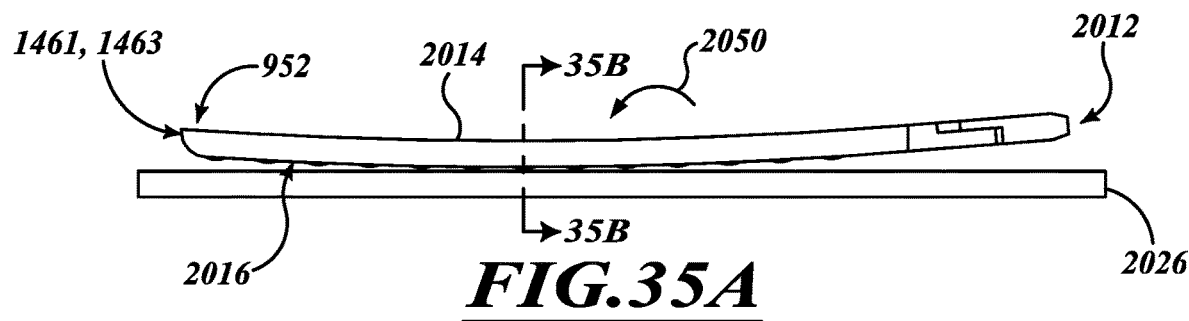
FIG. 35A is a side elevation view of the opposable of FIG. 28 and the slide of FIG. 32 in an intermediate state.
Figure 35B:
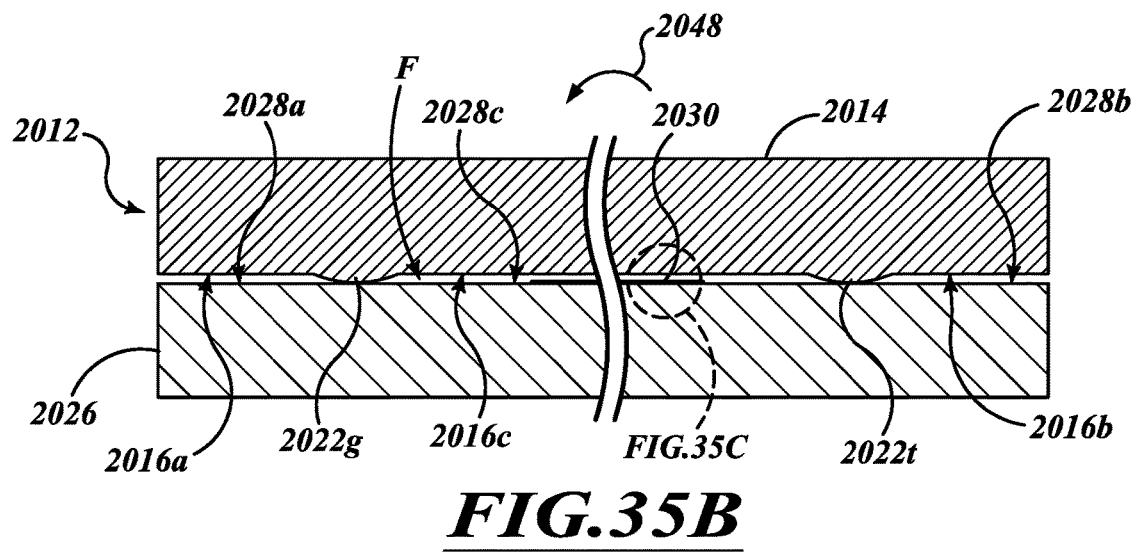
FIG. 35B is a cross-sectional view taken along line 35B-35B in FIG. 35A.
Figure 35C:
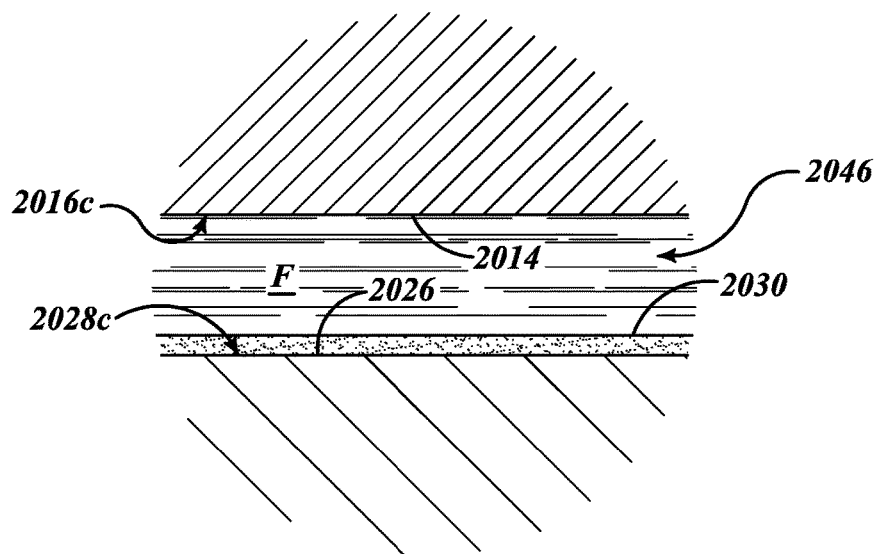
FIG. 35C is an enlarged view of a fluid-carrying gap of FIG. 35B.
Figure 36A:
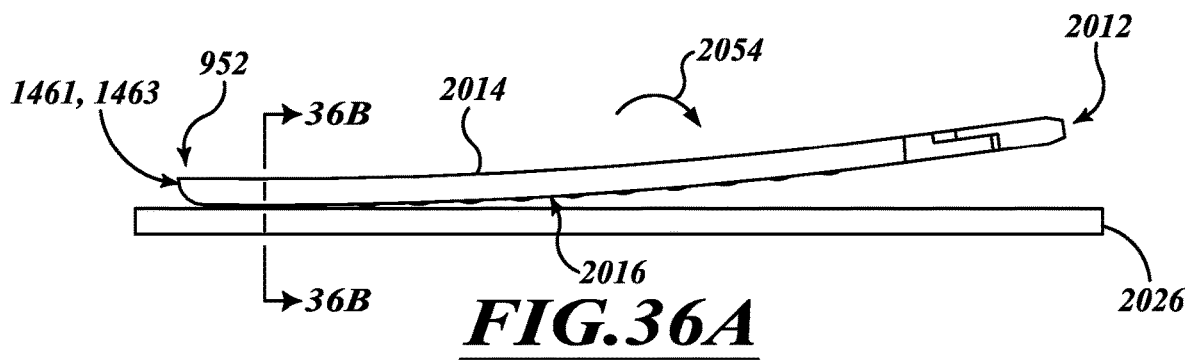
FIG. 36A is a side elevation view of the opposable of FIG. 28 and the slide of FIG. 32 in a second end state.
Figure 36B:
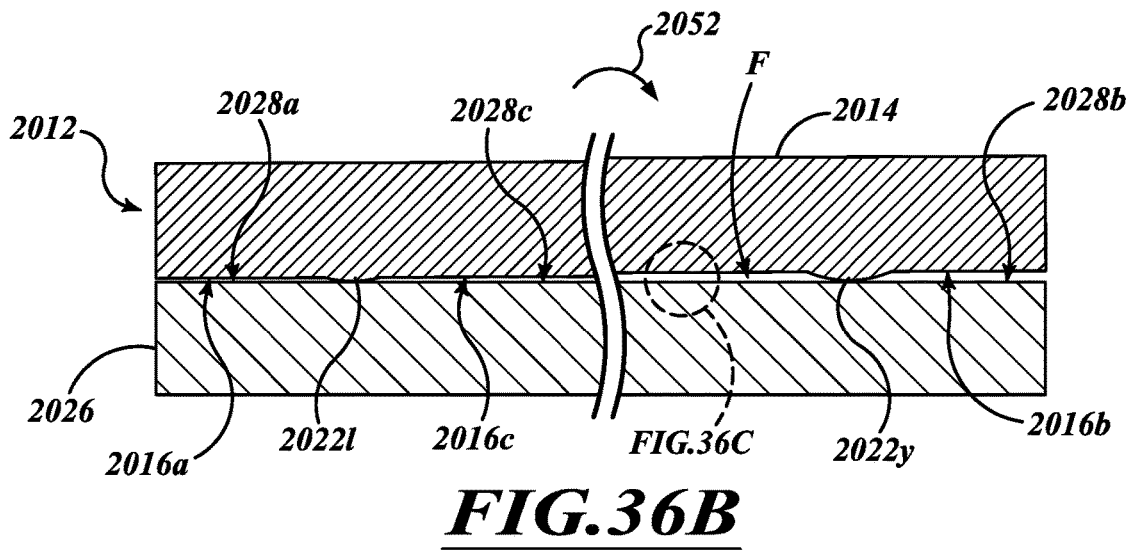
FIG. 36B is a cross-sectional view taken along line 36B-36B in FIG. 36A.
Figure 36C:
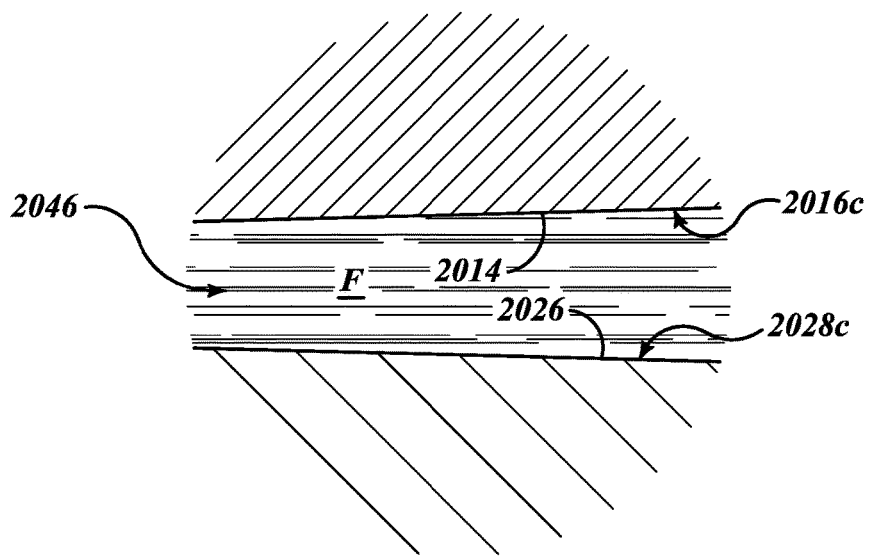
FIG. 36C is an enlarged view of a fluid-carrying gap of FIG. 36B with exaggerated slope.

The opposable 100 or 2012 and the slide 2026 can be moved from a first end state to a second end state and through a range of intermediate states between the first and second end states. FIGS. 34A, 35A, and 36A are side elevation views of the opposable 2012 and the slide 2026 at the first end state, at an intermediate state within the range of intermediate states, and at the second end state, respectively. FIGS. 34B, 35B, and 36B are cross-sectional views taken along line 34B-34B in FIG. 34A, along the line 35B-35B in FIG. 35A, and along the line 36B-36B in FIG. 36A, respectively. FIGS. 34C, 35C, and 36C are enlarged views of a fluid-carrying gap 2046 formed by the opposable 2012 and the slide 2026 in the first end state, the intermediate state, and the second state, respectively, with exaggerated slope shown in FIGS. 34C and 36C. In some cases, the opposable 2012 can be in a rolling position in the intermediate states and in an over roll or turnaround position in one or both of the first and second end states. While the embodiments depicted in FIGS. 34B, 35B, and 36B do not illustrate an opposable 100 incorporating onboard reagents, the skilled artisan will recognize that any of these embodiments may be modified to incorporate such an opposable 100, regardless of whether the opposable 100 is planar, curved, or arcuate.

Referring to FIGS. 34A-36C together, moving from the first end state to the second end state and through the range of intermediate states can cause different portions of the first and second spacers 2018, 2020 come into and out of contact with the first and second side portions 2028a, 2028b of the specimen-bearing surface 2028, respectively. For example, at the first end state (FIGS. 34A-C), a first portion of the first spacer 2018 (e.g., protrusions 2022a-d) and a first portion of the second spacer 2020 (e.g., protrusions 2022n-q) can be in contact with the specimen-bearing surface 2028. At the second end state (FIGS. 36A-C), a second portion of the first spacer 2018 (e.g., protrusions 2022j-m) and a second portion of the second spacer 2020 (e.g., protrusions 2022w-z) can be in contact with the specimen-bearing surface 2028. Within the range of intermediate states (one shown in FIGS. 36A-C), a third portion of the first spacer 2018 (e.g., protrusions 2022e-i) and a third portion of the second spacer 2020 (e.g., protrusions 2022r-v) can be in contact with the specimen-bearing surface 2028. The first and second portions of the first spacer 2018 can be spaced apart along the first side portion 2016a of the fluid-manipulating surface 2016 with the third portion of the first spacer 2018 positioned there between. Similarly, the first and second portions of the second spacer 2020 can be spaced apart along the second side portion 2016b of the fluid-manipulating surface 2016 with the third portion of the second spacer 2020 positioned there between. While the embodiments depicted in FIGS. 34A, 35AB, and 36AB do not illustrate an opposable 100 incorporating onboard reagents, the skilled artisan will recognize that any of these embodiments may be modified to incorporate such an opposable 100, regardless of whether the opposable 100 is planar, curved, or arcuate.

During the fluid-manipulating action, the first and second spacers 2018, 2020 can cause at least a portion of the fluid-manipulating surface 2016 to rotate in a plane that is not parallel to the axis or plane of rotation (e.g., a plane generally perpendicular to the plane of rotation). For example, the opposable 2012 can rock in the lateral direction or tilt from side to side as it is rolled along the slide 2026. In some cases, the fluid-manipulating action includes moving the opposable 2012 and/or the slide 2026 in opposite directions within the plane of rotation. This can reverse the movement of fluid within the fluid-carrying gap 2046 along the processing path 2031 (FIG. 32) as well as reverse lateral movement of the fluid caused by the first and second spacers 2018, 2020. For example, the first and second spacers 2018, 2020 can be configured to cause at least a portion of the fluid-manipulating surface 2016 to rotate in a first direction 2048 (FIGS. 34B and 35B) while the opposable 2012 rotates relative to the slide 2026 in a second direction 2050 (FIGS. 34A and 35A) different than the first direction 2048 and the opposable 2012 and the slide 2026 move from the first end state toward the second end state. Similarly, the first and second spacers 2018, 2020 can be configured to cause at least a portion of the fluid-manipulating surface 2016 to rotate in a third direction 2052 (FIG. 36B) while the opposable 2012 rotates relative to the slide 2026 in a fourth direction 2054 (FIG. 36A) different than the third direction 2052 and the opposable 2012 and the slide 2026 move from the second end state toward the first end state. In some embodiments, the first and third directions 2048, 2052 are generally opposite and/or the second and fourth directions 2050, 2054 are generally opposite.

The transverse cross section of the fluid carrying gap 2046 can vary as the opposable 2012 moves to different positions. The transverse cross sections of the fluid carrying gap 2046 can be wedge shaped, triangular shaped, or have other suitable configurations to provide an asymmetrical flow channel. For example, the flow channel can have an asymmetrical cross section when the opposable 2012 moves towards the over rolled position (FIG. 36A) and a symmetrical cross section when the opposable 2012 is in an intermediate position (FIG. 35A). In some cases, lateral mixing can be performed primarily at one or both turnaround portions of the rolling motion. In other cases, lateral mixing can be performed relatively consistently throughout the rolling motion. The overall geometry of the flow channel (e.g., the three-dimensional space through which the fluid-carrying gap 2046 moves during the fluid-manipulating action) can have various suitable shapes, such as shapes that have generally equal volumes on either side of the bisecting plane 2024 (FIG. 29) and shapes that have different volumes on either side of the bisecting plane 2024. In some embodiments, at least a portion of the flow channel can have a substantially saddle shape, partially spherical shape, partially frusto-conical shape, generally triangular shape or wedge shape, or the like. Different portions of the flow channel can have different shapes. Different portions of the opposable 2012 can have non-planar configurations (e.g., saddle shaped, partially spherical shape, partially frusto-conical shape, etc.), planar configurations, or the like to define such flow channels.

In some embodiments, the first and second spacers 2018, 2020 can be configured to cause a cross section of the fluid-carrying gap 2046 in a first plane perpendicular to the axis of rotation (e.g., a plane corresponding to line 34B-34B in FIG. 34A) to have a first asymmetry relative to the bisecting plane 2024 (FIG. 29) when the opposable 2012 and the slide 2026 are in the first end state. Similarly, the first and second spacers 2018, 2020 can be configured to cause a cross section of the fluid-carrying gap 2046 in a second plane perpendicular to the axis of rotation (e.g., a plane corresponding to line 36B-36B in FIG. 36A) to have a second asymmetry relative to the bisecting plane 2024 when the opposable 2012 and the slide 2026 are in the second end state. The first and second asymmetries can be generally opposite relative to one another. The first asymmetry can correspond to a volumetric taper of the fluid-carrying gap 2046 in a first direction toward the first spacer 2018, and the second asymmetry can correspond to a volumetric taper of the fluid-carrying gap 2046 in a second direction toward the second spacer 2020. The changing volumetric taper of the fluid-carrying gap 2046 can cause fluid (and reactants) within the fluid-carrying gap 2046 to move in a direction opposite to the direction of the volumetric taper due to displacement and/or to move in the direction of the volumetric taper due to capillary action. For clarity purposes, the fluid is not shown in FIGS. 34B, 35B, 36B, although the fluid can be located at fluid gap F. Both types of movement can enhance lateral mixing of the fluid. The changing volumetric taper of the fluid-carrying gap 2046 can also have other additional and/or alternative effects on the fluid within the fluid-carrying gap 2046 that can enhance lateral mixing of the fluid and/or have other benefits.

The height profiles of the spacers 2018, 2020 can be selected to cause generally even lateral mixing of fluid in opposite directions. For example, the height profiles of the spacers 2018, 2020 on opposite sides of the opposable can be different. This can cause a lateral mixing effect that occurs when the opposable 2012 moves from the first state to the second state to be generally reversed when the opposable 2012 and the slide 2026 move from the second state back to the first state. When the first portion of the first spacer 2018 has an average height greater than that of the first portion of the second spacer 2020, and the second portion of the first spacer 2018 has an average height less than that of the first portion of the second spacer 2020, an average height of the first and second portions together of the first spacer 2018 can be about equal to an average height of the first and second portions together of the second spacer 2020. An average height of the third portion of the first spacer 2018 can also be about equal to an average height of the third portion of the second spacer 2020. These attributes can facilitate generally symmetrical volumetric distribution relative to a plane (e.g., a bisecting plane not shown) perpendicular to the bisecting plane 2024 (FIG. 29). Furthermore, they can cause the fluid-carrying gap 2046 to be relatively symmetrical while it passes over the central region of the slide 2026, which carries the specimen 2030. This can increase the volumetric consistency of portions of the fluid proximate different regions of the specimen 2030.

As discussed above, enhanced lateral mixing can facilitate more uniform staining of specimens. For example, in at least some enzymatic staining reactions, enhanced lateral mixing can allow for acceptable levels of stain uniformity across a broad range of specimen variation without using initial reactant concentrations high enough to poison the enzyme. In one illustrative example, the specimen 2030 (FIG. 32) can have different antigen loads on opposite sides of a bisecting plane (not shown) parallel to the processing path 2031. The antigen load on one side of the bisecting plane can be, for example, from about 50% to about 500%, from about 100% to about 300%, or within another suitable range greater than the antigen load on the other side of the bisecting plane.

The opposable 100 or 2012 can be used to advance a fluid including a reactant (e.g., an oxidizing agent, such as hydrogen peroxide) along with another reactant (e.g., a chromogen, such as 3,3'-diaminobenzidine) over the specimen 2030. The fluid can be advanced, for example, at a speed from about 10 millimeters/second to about 40 millimeters/second, from about 20 millimeters/second to about 30 millimeters/second, or within another suitable range. In some cases, the fluid is advanced at a speed of about 25 millimeters/second. The fluid can have a volume, for example, from about 50 microliters to about 500 microliters, from about 50 microliters to about 250 microliters, from about 75 microliters to about 125 microliters, or within another suitable range. In some cases, the fluid has a volume of about 500 microliters. The concentration of one or both of the reactants can be from about 100% to about 300%, from about 100% to about 200%, or within another suitable range of a minimum concentration for generally maintaining an enzymatic staining reaction at zero order. When the reactant is an oxidizing agent (e.g., hydrogen peroxide), higher concentrations of the reactant can, in some cases, poison enzymes (e.g., horseradish peroxidase) bound to the antigens on the specimen 2030 via antibodies.

The opposable 100 or 2012 can also be used to perform on slide mixing, a feature heretofore not possible with flat surface capillary gap systems. In one embodiment, a small volume of a concentrated reagent or reagent in a storage buffer is aspirated into a reagent pipette from a vial. This reagent is transported to, and dispensed on, the slide. A larger volume of a diluent fluid is dispensed through the pipette onto the slide to dilute the reagent and provide the bulk of the fluid to satisfy the target volume requirements. It has also been found that the use of a non-buffered fluid can be added to a wide variety of reagents without changing their chemical dynamics. This process can also be used to modify the ratio of chromogen reagents (or other mix ratios) by selectively diluting some components while leaving others at their starting concentration. This process can also be used to enhance intentional stain intensity. For many steps, final stain intensity can be adjusted by modifying the on-slide concentration on the fly. Once the target reagent and dilution volume is on the slide, the opposable can provide mixing of the laminar reagent and diluent providing even distribution over the surface of the slide. Since the reagents applied in this manner are dropped sequentially onto the slide, they form relatively discrete layers on the slide which promotes mixing via the orthogonal movement of the opposable and opposable actuator assembly.

FIGS. 37 and 38 are plan views of the slides 2000, 2006 with specimens processed with the opposable 2012. In contrast to the stain non-uniformity illustrated in FIGS. 43 and 44, FIGS. 55 and 56 illustrate examples of relatively uniform staining. Due at least in part to enhanced lateral mixing, after staining, the specimens 2002 (FIG. 37) and 2008 (FIG. 38) can have stain-intensity gradients less than about 15%, less than about 10%, or within another suitable range. In some cases, the specimens 2002, 2008 have stain-intensity gradients of about 5% and/or stain-intensity gradients generally undetectable to the naked eye. Other beneficial staining outcomes are also possible. In some embodiments, opposables 2012 can be used with the system 100 to achieve substantially uniform processing across one or more specimen.

The slides disclosed herein can be a 1-inch×3-inch microscope slide, a 25 mm×75 mm microscope slide, a 25 mm×76 mm microscope slide, or another type of flat or substantially flat substrate, or even a tube (e.g. see FIG. 46A). "Substantially flat substrate" refers, without limitation, to any object having at least one substantially flat surface, but more typically to any object having two substantially opposing surfaces on opposite sides of the object, and even more typically to any object having opposed substantially flat surfaces, which opposed surfaces are generally equal in size but larger than any other surfaces on the object. In some embodiments, the substantially flat substrate can comprise any suitable material, including plastics, rubber, ceramics, glass, silicon, semiconductor materials, metals, combinations thereof, or the like. Non-limiting examples of substantially flat substrates include flat covers, SELDI and MALDI chips, silicon wafers, or other generally planar objects with at least one substantially flat surface.

From the foregoing, it will be appreciated that specific embodiments of the invention have been described herein for purposes of illustration, but well-known structures and functions have not been shown or described in detail to avoid unnecessarily obscuring the description of at least some embodiments of the invention. The systems described herein can perform a wide range of processes for preparing biological specimens for analyzing. Where the context permits, singular or plural terms may also include the plural or singular term, respectively. Unless the word "or" is associated with an express clause indicating that the word should be limited to mean only a single item exclusive from the other items in reference to a list of two or more items, then the use of "or" in such a list shall be interpreted as including (a) any single item in the list, (b) all of the items in the list, or (c) any combination of the items in the list. The singular forms "a," "an," and "the" include plural referents unless the context clearly indicates otherwise. Thus, for example, reference to "a specimen" refers to one or more specimens, such as two or more specimens, three or more specimens, or four or more specimens.

The various embodiments described above can be combined to provide further embodiments. The embodiments, features, systems, devices, materials, methods, and techniques described herein may, in some embodiments, be similar to any one or more of the embodiments, features, systems, devices, materials, methods, and techniques described in U.S. patent application Ser. No. 13/509,785; U.S. patent application Ser. No. 13/157,231; U.S. Pat. No. 7,468,161; U.S. patent application Ser. No. 13/509,785; U.S. Patent Application No. 61/746,085, filed on Dec. 26, 2012 and entitled AUTOMATED SPECIMEN PROCESSING SYSTEMS AND METHODS OF USING THE SAME; U.S. Patent Application No. 61/746,087, filed on Dec. 26, 2012 and entitled SPECIMEN PROCESSING SYSTEMS AND METHODS FOR MODERATING EVAPORATION, U.S. Patent Application No. 61/746,089, filed on Dec. 26, 2012 and entitled SPECIMEN PROCESSING SYSTEMS AND METHOD FOR UNIFORMLY HEATING SLIDES; and U.S. Patent Application No. 61/746,091, filed on Dec. 26, 2012 and entitled SPECIMEN PROCESSING SYSTEMS AND METHODS FOR ALIGNING SLIDES; and International App. No. PCT/US2010/056752, all of which are incorporated by reference in their entireties. In addition, the embodiments, features, systems, devices, materials, methods, and techniques described herein may, in certain embodiments, be applied to or used in connection with any one or more of the embodiments, features, systems, devices, materials, methods, and techniques disclosed in the above-mentioned International App. No. PCT/US2010/056752; U.S. patent application Ser. No. 13/509,785; U.S. Patent Application No. 61/746,085, filed on Dec. 26, 2012 and entitled AUTOMATED SPECIMEN PROCESSING SYSTEMS AND METHODS OF USING THE SAME; U.S. Patent Application No. 61/746,087, filed on Dec. 26, 2012 and entitled SPECIMEN PROCESSING SYSTEMS AND METHODS FOR MODERATING EVAPORATION, U.S. Patent Application No. 61/746,089, filed on Dec. 26, 2012 application and entitled SPECIMEN PROCESSING SYSTEMS AND METHOD FOR UNIFORMLY HEATING SLIDES; and U.S. Patent Application No. 61/746,091, filed on Dec. 26, 2012 and entitled SPECIMEN PROCESSING SYSTEMS AND METHODS FOR ALIGNING SLIDES, and U.S. Pat. No. 7,468,161. Aspects of the disclosed embodiments can be modified, if necessary, to employ concepts of the various patents, applications, and publications to provide yet further embodiments.

Additional Embodiments

In another aspect of the present disclosure is an opposable for specimen processing, comprising: a body having a fluid-manipulating surface, the body being configured to form a fluid-carrying gap between a portion of a central region of the fluid-manipulating surface and a corresponding portion of a central region of a specimen-bearing surface of a slide proximate the body; and wherein the opposable further comprises a plurality of cavities, each cavity configured to house at least one reagent, liquid and/or fluid for delivery to the fluid-carrying gap, and wherein each cavity is disposed within the body of the opposable.

In another aspect of the present disclosure is an opposable for specimen processing, comprising: a body having a fluid-manipulating surface, the body being configured to form a fluid-carrying gap between a portion of a central region of the fluid-manipulating surface and a corresponding portion of a central region of a specimen-bearing surface of a slide proximate the body; and wherein the opposable further comprises a plurality of cavities, each cavity configured to house at least one reagent chamber, and wherein each cavity is disposed within the body of the opposable.

In another aspect of the present disclosure is a system comprising: (a) an opposable for specimen processing, comprising: a body having a fluid-manipulating surface, the body being configured to form a fluid-carrying gap between a portion of a central region of the fluid-manipulating surface and a corresponding portion of a central region of a specimen-bearing surface of a slide proximate the body; and a plurality of cavities disposed within the body of the opposable, each cavity configured to house at least one reagent chamber; (b) a slide; (c) a platen configured to support the slide; and (d) an actuator configured to rotate the opposable relative to the platen, to translate or rotate the platen relative to the opposable, or both from a first end state to a second end state and through a range of intermediate states between the first and second end states in an axis of translation or rotation, wherein in the first end state, the first and second spacers or gapping elements are configured to differentially space apart the first and second side portions of the fluid-manipulating surface from the first and second side portions of the specimen-bearing surface, respectively, so as to cause the fluid-carrying gap to volumetrically taper in a second direction, and in the second end state, the first and second spacers are configured to differentially space apart the first and second side portions of the fluid-manipulating surface from the first and second side portions of the specimen-bearing surface, respectively, so as to cause the fluid-carrying gap to volumetrically taper in a third direction different than the first direction. In some embodiments, the second direction and the third direction are generally perpendicular to the axis of translation or rotation; and the second direction is generally opposite to the third direction.

In some embodiments, the system contacts a biological specimen with a liquid by moving an opposable in contact with the liquid. In some embodiments, a distance separating a wetted surface of the opposable and a slide carrying the specimen is sufficient to form a fluidic layer between the opposable and the slide. In some embodiments, the fluidic layer contacts at least a portion of the biological specimen and is moved across the slide using capillary and other manipulative action.

In some embodiments, the fluidic layer may be translated back and forth across the slide, and in some embodiments, may comprise be a relatively thin fluid film, a band of fluid, or the like. In some embodiments, the opposable is movable to different positions relative to the slide and can accommodate different volumes of liquid forming the fluidic layer. In some embodiments, the capillary action can include, without limitation, movement of the fluid layer due to the phenomenon of the liquid spontaneously creeping through the gap between the wetted opposable surface (including those surfaces that are curved or arcuate) and the slide due to adhesive forces, cohesive forces, and/or surface tension. In some embodiments, the opposable can manipulate (e.g., agitate, displace, translate, etc.) the liquid to process the specimen using relatively small volumes of a reagent, liquid, or fluid to help manage waste and provide consistent processing. It is believed that evaporative losses, if any, can be managed to maintain a desired volume of liquid, reagent concentration, or the like. It is also believed that relatively low volumes of liquids can be used to process the specimens for a reduced liquid waste.

In some embodiments, a first edge portion of the opposable element can extend to or beyond the first edge of the slide and a second edge portion of the opposable element can extend to or beyond the opposite edge of the slide. In some embodiments, the opposable element can optionally include a mounting end optionally having at least one slot dimensioned to be received and retained by at least a portion of the opposable actuator. In some embodiments, the opposable element has a captivation end and an arcuate main body extending from the captivation end. In those embodiments employing an opposable where the body is arcuate, the arcuate main body is configured to roll along or above the slide to move a liquid across the surface of the slide. In some embodiments, the captivation end has a radius of curvature equal to or less than about 0.08 inch. In some embodiments, the opposable element can include a first and a second slide contact surface located proximate to each opposable element edge portion respectively. In some embodiments, such slide contact surfaces can comprise intermittent slide contact surfaces with spaces there between to enable fluid to pass there through.

In another aspect of the present disclosure is a specimen-processing assembly, comprising (i) an opposable including a body having a fluid-manipulating surface, the opposable including a plurality of cavities, each cavity configured to house a reagent, liquid, or fluid, (ii) an actuator configured to change a position of the opposable relative to a slide or to change the position of the slide relative to the opposable to move a volume of the reagent in a first and second direction along the slide while the spacer element contacts the slide to vary a cross section of the fluid-carrying gap in a plane that is substantially perpendicular to the first and second directions; and (iii) means for dispensing a reagent, liquid, or fluid from the reagent chamber of the opposable through a fluidic opening on the fluid-manipulating surface to the fluid-carrying gap.

The specimen processing systems can sequentially deliver slides and opposables to specimen processing stations. The specimen processing stations can use opposables to manipulate and direct a series of reagents, liquids, or fluids. The reagents, liquids, and/or fluids may be supplied to the specimens either from an external source or from onboard reagents incorporated within the opposable itself. The liquids can be manipulated over or across the slide surfaces in conjunction with capillary action while the specimen processing stations control the movement of the opposables and the processing temperatures for histology staining, IHC staining, ISH staining, or other specimen processing protocols. In some embodiments, the opposables are surfaces capable of manipulating one or more substances on a slide. Manipulating a substance in the form of a fluid can include spreading the fluid, displacing a thin film of fluid, or otherwise altering a packet of fluid, a band of fluid, or a thin film. In some embodiments, the opposable incorporates one or more onboard reagents, liquids, or fluids.

At least some aspects of the disclosure are directed to a system that contacts a biological specimen with a liquid by moving an opposable incorporating onboard reagents in contact with the liquid. In some embodiments, a distance separating a wetted surface of the opposable and a slide carrying the specimen is sufficient to form a fluidic layer between the wetted surface (opposable) and the slide. In some embodiments, the fluidic layer contacts at least a portion of the biological specimen and is moved across the slide using capillary and other manipulative action.

In some embodiments, the fluidic layer may be translated back and forth across the slide, and in some embodiments, may comprise be a relatively thin fluid film, a band of fluid, or the like. In some embodiments, the opposable is movable to different positions relative to the slide and can accommodate different volumes of liquid forming the fluidic layer. In some embodiments, the capillary action can include, without limitation, movement of the fluid layer due to the phenomenon of the liquid spontaneously creeping through the gap between the wetted opposable surface (including those surfaces that are curved or arcuate) and the slide due to adhesive forces, cohesive forces, and/or surface tension. In some embodiments, the opposable can manipulate (e.g., agitate, displace, translate, etc.) the liquid to process the specimen using relatively small volumes of a reagent, liquid, or fluid to help manage waste and provide consistent processing. It is believed that evaporative losses, if any, can be managed to maintain a desired volume of liquid, reagent concentration, or the like. It is also believed that relatively low volumes of liquids can be used to process the specimens for a reduced liquid waste.

These and other changes can be made to the embodiments in light of the above-detailed description. For example, a seal element can have a one-piece or multi-piece construction and can include any number of retention features. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A specimen-processing assembly, comprising
an opposable comprising a body having a fluid-manipulating surface, wherein the opposable body comprises one or more cavities disposed therein, wherein each cavity of the one or more cavities includes at least one reagent chamber, and wherein the at least one reagent chamber of each cavity is in fluidic communication with an opening within the fluid-manipulating surface; and
at least one spacer element coupled to the body of the opposable and configured to space the fluid-manipulating surface of the body from a slide to define a fluid-carrying gap between the fluid-manipulating surface of the body and the slide;
an actuator configured to change a position of the opposable relative to the slide or to change the position of the slide relative to the opposable to move a volume of the reagent in a first and second direction along the surface of the slide while the spacer element coupled to the body of the opposable contacts the slide to vary a cross section of the fluid-carrying gap in a plane that is substantially perpendicular to the first and second directions; and
means for dispensing a reagent from the at least one reagent chamber of the opposable to the fluid-carrying gap.

2. The specimen-processing assembly of claim 1, wherein the spacer element has a height that varies relative to a length of the opposable.

3. The specimen-processing assembly of claim 1, wherein the spacer element includes a plurality of first gapping elements at a first side portion of the fluid-manipulating surface and a plurality of second gapping elements at a second side portion of the fluid-manipulating surface.

4. The specimen-processing assembly of claim 1, wherein the means for dispensing the reagent from the at least one reagent chamber is selected from the group consisting of a plunger, a syringe, a needle, and a jet of compressed air.

5. The specimen-processing assembly of claim 4, wherein the means for dispensing the reagent from the at least one reagent chamber pierces at least one seal of the reagent chamber.

6. The specimen-processing assembly of claim 5, wherein the means for dispensing the reagent from the at least one reagent chamber is a plunger disposed within a cavity of the opposable.

7. The specimen-processing assembly of claim 1, wherein a portion of the plurality of cavities each comprise at least two reagent chambers.

8. The specimen-processing assembly of claim 7, wherein the at least two reagent chambers each comprise different reagents.

9. The specimen-processing assembly of claim 1, wherein a first portion of the plurality of cavities comprise reagent chambers having reagents for a first assay in a multiplex assay; and wherein a second portion of the plurality of cavities comprise reagent chambers having reagents for a second assay in the multiplex assay.

10. The specimen-processing assembly of claim 1, wherein the fluid-manipulation surface of the opposable is curved or arcuate.

11. The specimen processing apparatus of claim 1, wherein the at least one reagent chamber of each cavity is sealed.

12. A specimen-processing assembly, comprising
an opposable incorporating one or more onboard reagents, wherein the opposable comprises:
a body having a fluid-manipulating surface, wherein the body includes at least one reagent chamber, and wherein the at least one reagent chamber is in fluidic communication with the fluid-manipulating surface; and
at least one spacer element coupled to the body and configured to space the fluid-manipulating surface from a slide to define a fluid-carrying gap between the fluid-manipulating surface and the slide;
an actuator configured to change a position of the opposable relative to the slide or to change the position of the slide relative to the opposable to move a volume of the reagent in a first and second direction along the slide while the spacer element contacts the slide to vary a cross section of the fluid-carrying gap in a plane that is substantially perpendicular to the first and second directions; and
means for dispensing a reagent from the at least one reagent chamber of the opposable to the fluid-carrying gap.

13. The specimen-processing assembly of claim 12, wherein the spacer element has a height that varies relative to a length of the opposable.

14. The specimen-processing assembly of claim 12, wherein the spacer element includes a plurality of first gapping elements at a first side portion of the fluid-manipulating surface and a plurality of second gapping elements at a second side portion of the fluid-manipulating surface.

15. The specimen-processing assembly of claim 12, wherein the means for dispensing the reagent from the reagent chamber is selected from the group consisting of a plunger, a syringe, a needle, and a jet of compressed air.

16. The specimen-processing assembly of claim 15, wherein the means for dispensing the reagent from the reagent chamber pierces at least one seal of the at least one reagent chamber.

17. The specimen-processing assembly of claim 12, wherein the means for dispensing the reagent from the at least one reagent chamber is a plunger disposed within a cavity of the opposable.

18. The specimen-processing assembly of claim 12, wherein the fluid-manipulation surface of the opposable is curved or arcuate.

19. The specimen processing apparatus of claim 12, wherein the at least one reagent chamber of each cavity is sealed.

* * * * *